(12) United States Patent
Merg et al.

(10) Patent No.: US 10,957,125 B2
(45) Date of Patent: Mar. 23, 2021

(54) SYSTEM AND METHOD FOR USING MEASUREMENT MADE BY COMPUTERIZED MEASUREMENT TOOL

(71) Applicant: Snap-on Incorporated, Kenosha, WI (US)

(72) Inventors: Patrick S. Merg, Hollister, CA (US); David Costantino, San Diego, CA (US); Lester B. Johnson, Escondido, CA (US)

(73) Assignee: Snap-on Incorporated, Kenosha, WI (US)

( * ) Notice: Subject to any disclaimer, the term of this patent is extended or adjusted under 35 U.S.C. 154(b) by 44 days.

(21) Appl. No.: 16/283,729

(22) Filed: Feb. 22, 2019

(65) Prior Publication Data

US 2019/0266809 A1 Aug. 29, 2019

Related U.S. Application Data

(63) Continuation of application No. 15/194,525, filed on Jun. 27, 2016, now Pat. No. 10,242,510.

(51) Int. Cl.
  *B23Q 5/00* (2006.01)
  *G07C 5/00* (2006.01)
  (Continued)

(52) U.S. Cl.
  CPC ............. *G07C 5/008* (2013.01); *B60T 17/22* (2013.01); *B60T 17/221* (2013.01);
  (Continued)

(58) Field of Classification Search
  None
  See application file for complete search history.

(56) References Cited

U.S. PATENT DOCUMENTS 5,734,569 A 3/1998 Rogers et al.
6,021,366 A 2/2000 Fieramosca et al.
(Continued)

OTHER PUBLICATIONS

Progressive Automotive Systems, Inc.; How R.O. Writer Works; downloaded from the World Wide Web at http://web.archive.org/web/20160505154649/http://www.rowriter.com/howitworks; archived May 6, 2016; 22 pages.
(Continued)

*Primary Examiner* — Adam D Tissot
(74) *Attorney, Agent, or Firm* — McDonnell Boehnen Hulbert & Berghoff LLP

(57) ABSTRACT

A client computing system (CCS) receives a tool measurement from a measurement tool other than by determining the tool measurement from a vehicle data (VD) message. The CCS generates a VD report including a vehicle identifier of a vehicle associated with the tool measurement and the VD report. The VD report can include temporal and/or spatial identifiers pertaining to the tool measurement. The VD report can be provided to a server computing system (SCS) for storage as part of a VD record associated with the vehicle. The CCS that generated the VD report or another CCS can request the VD report from the SCS. The SCS can determine if the requesting CCS is authorized to receive the VD report to maintain the vehicle owner's privacy. The tool measurement can be selected from a service procedure provided to the CCS from SCS and displayed at the CCS.

22 Claims, 18 Drawing Sheets

(51) Int. Cl.
G07C 5/08 (2006.01)
B60T 17/22 (2006.01)
G06Q 10/00 (2012.01)
H04L 29/06 (2006.01)
G06F 16/25 (2019.01)

(52) U.S. Cl.
CPC ........... *G06F 16/252* (2019.01); *G06Q 10/20* (2013.01); *G07C 5/085* (2013.01); *G07C 5/0816* (2013.01); *H04L 63/10* (2013.01)

(56) References Cited

U.S. PATENT DOCUMENTS

| | | | |
|---|---|---|---|
| 6,363,821 | B1 | 4/2002 | Greenwald et al. |
| 7,113,853 | B2 | 9/2006 | Hecklinger |
| 7,124,058 | B2 | 10/2006 | Namaky et al. |
| 7,182,147 | B2 | 2/2007 | Cutler et al. |
| 7,778,841 | B1 | 8/2010 | Bayer et al. |
| 7,861,625 | B2 | 1/2011 | Greenwald et al. |
| 7,954,557 | B2 | 6/2011 | Cutler et al. |
| 8,180,480 | B2 | 5/2012 | Greenwald et al. |
| 8,245,609 | B1 | 8/2012 | Greenwald et al. |
| 8,281,871 | B2 | 10/2012 | Cutler et al. |
| 8,606,648 | B1 | 12/2013 | Bayer et al. |
| 9,156,148 | B2 | 10/2015 | King et al. |
| 9,242,356 | B2 | 1/2016 | King et al. |
| 10,242,510 | B2 | 3/2019 | Merg et al. |
| 2002/0173142 | A1 | 11/2002 | Vanhaelemeersch et al. |
| 2005/0149566 | A1 | 7/2005 | Baek et al. |
| 2005/0173142 | A1* | 8/2005 | Cutler .................... B25B 21/00 173/181 |
| 2008/0004764 | A1 | 1/2008 | Chinnadurai et al. |
| 2008/0071882 | A1 | 3/2008 | Hering et al. |
| 2013/0304306 | A1 | 11/2013 | Selkirk et al. |
| 2014/0277908 | A1 | 9/2014 | Fish et al. |
| 2015/0121275 | A1 | 4/2015 | Marshall et al. |
| 2017/0372532 | A1 | 12/2017 | Merg et al. |

OTHER PUBLICATIONS

Hunter Engineering Company; Hunter Quick Check System—Two-Minute Inspection Process; Feb. 2, 2016, 20 pages.
Hunter Engineering Company; WinAlign HD—Wheel Alignment Education Guide for Heavy-Duty Trucks; Nov. 24, 2010; 26 pages.
Hunter Engineering Company; Quick Tread—Stand Alone, Surface-Mounted; Feb. 2, 2016; 2 pages.
Hunter Engineering Company; Quick Tread—Drive over tread depth system—at a glance; Feb. 2, 2016; 12 pages.
Hunter Engineering Company; QC71/QC72/QC73 Quick Check System; Hardware / Specification / Features; Feb. 2, 2016; 2 pages.
Winworks Software, Inc.; Winworks Auto Shop Management Software; http://web.archive.org/web/20160601214046/http://winworks.com/; archived from World Wide Web on Jun. 1, 2016; 2 pages.
Boss Software Inc; Boss Software Releases First Ever "Go Paperless" Option to Help Auto Repair Shops "Go Green"; Apr. 20, 2014; 3 pages.
Boss Software Inc.; Auto Mechanic Software—Product features—Shop Boss; downloaded from the World Wide Web at http://shopboss.net/auto-mechanic-software-product-features/; May 21, 2016; 6 pages.
Boss Software Inc; Cutting Edge Software Features for Auto Shop Management; downloaded from the World Wide Web at http://shopboss.net/; Jun. 1, 2016; 5 pages.
Fasttrack Auto Shop Management Systems; Mobile Shop Manager, downloaded from the World Wide Web at http://www.fasttrakauto.com/blog/2013/10/29/fasttrak-mobile-shop-manager-is-available-for-general-release/; Oct. 29, 2013; 2 pages.
Hearst Business Publishing, Inc.; Motor—Selectline; downloaded from the World Wide Web at https://www.motor.com/products/selectline/; Jun. 29, 2015; 6 pages.
Motor Information Systems; Motor and Motoshop Technology(SM) Announce Plan to Launch Integrated Automotive Data Solution; Nov. 19, 2015; 2 pages.

Motor Information Systems; Vehicle Identification & Premium Options, API Reference, V1.4; Jun. 4, 2016; 45 pages.
Motor Information Systems; Data as a Service Development Handbook; V1.5; Feb. 2016; 38 pages.
Motor Information Systems; Wiring Diagrams, API Reference; V1.4; Jun. 4, 2016; 25 pages.
Winworks Software, Inc; Winworks Mobile; downloaded from the World Wide Web at http://winworks.com/winworks-mobile/; Jun. 22, 2014; 3 pages.
Winworks Software, Inc.; Compare Auto Repair Software Features by Winworks; downloaded from the World Wide Web at http://web.archive.org/web/20160430224501/http://winworks.com/products/winworks-autoshop/compare-auto-repair-software-features-by-winworks/; archived Apr. 30, 2016; 3 pages.
MAM Software Group, Inc.; downloaded from the World Wide Web at http://web.archive.org/web/20160610012319/http://www.mamsoftware.com/en/autowork-online; archived Jun. 10, 2016; 6 pages.
MITCHELL1 downloaded from the World Wide Web at http://web.archive.org/web/20160113154820/http://mitchell1.com/mobile-managerpro; archived Jan. 13, 2016; 4 pages.
Chief Automotive Technologies; Intellitape Users Manual; Feb. 2008; 8 pages.
Hennessy Industries Inc.; AMMCO 3850, 3860 Drum & Disc Brake Lathes—Installation Instructions, Operating Instructions, Safety Instructions, Maintenance Instructions; May 2001; 24 pages.
Vetronix Corporation; General Motors Body Systems Applications 1988-2004; May 2007; 271 pages (reference submitted via 3 files : file 1—100 pages (cover to p. 92), file 2—100 pages (pp. 93 to 192), and file 3—71 pages (pp. 193 to 263)).
Duke, Tom; Tire Review; Back2Basics4 Step-by-step Tire/Wheel Balancing; Nov. 2012; 5 pages.
Snap-On Incorpoated; EECS306 D-TACTM Elite; downloaded from the World Wide Web at http://public.snapon.com/r_rrd/objects/images/EECS306C_Spec_Table.pdf on Mar. 22, 2016; 1 page.
Bendix Brake Advice Centre; Technical Bulletin—Issue 7—Measuring a Brake Pad; Nov. 9, 2011; 3 pages.
blue tools.com; Computorq3 Electronic Torque Wrenches; downloaded from the World Wide Web at http://www.bluetools.com/Torque-Tools-Torq-Wrenches-Electronic-Computorq3/c89_83_87/index.html on Mar. 22, 2016; 2 pages.
CDI Torque Products; Operation Manual—Computorq 3 Electronic Torque Wrench; Jun. 2010; 6 pages.
AC Delco; Disc Rotors—Catalogue: Issue 3.2; Jun. 7, 2012; 44 pages.
MAM Software Ltd.; MAM CarSide—Mobile Apps for garages and workshops; Jul. 25, 2014; 4 pages.
MAM Software Ltd.; MAM CarSide—User Guide; Jul. 25, 2014; 8 pages.
Ando, Amy W. et al; Estimating Full IM240 Emissions from Partial Test Results: Evidence from Arizona; Mar. 1998; 24 pages.
Ranger Products—Installation and Operation Manual—Models RL-8500, RL-8500XLT, Combination Brake Lathe; Oct. 1, 2014; 54 pages.
tire review.com; Tire & Wheel Balancing: Step by Step; downloaded from the World Wide Web at http://www.tirereview.com/back-to-basics-step-by-step-tire-wheel-balancing/ on Mar. 23, 2016; 6 pages.
Total Auto Business Solutions, Inc.; Autofluent—Accessories & Partnerships; downloaded from the World Wide Web at http://web.archive.org/web/20160510161643/http://autorepairsoftware.com/Accessories-Partners/Accessory-Details; May 10, 2016; 1 page.
Risich, Mike; Multi-point Inspections: Your Shop's Storytelling Tool; Feb. 4, 2015; 4 pages.
Alldata LLC; Alldata Mobile for Android; Nov. 5, 2014; 2 pages.
Alldata LLC; Alldata Repair; Jan. 29, 2014; 2 pages.
amazon.com; OBDLINK MX Bluetooth—Adroid Quick Start Guide; Sep. 11, 2014; 2 pages.
Alldata LLC; Alldata Manage Online—Simplified Shop Management—Cloud-based with Automatic Updates; Jan. 7, 2016; 2 pages.
Autofluent—A highly-integrated portfolio of tools to manage your automotive business more effectively; downloaded from the World

(56) References Cited

OTHER PUBLICATIONS

Wide Web at https://web.archive.org/web/20160507034609/http://autorepairsoftware.com/AutoFluent-Software/Features; archived May 7, 2016; 2 pages.
Automotive Progressive Systems; ROWriter Optional Software Modules; downloaded from the World Wide Web at http://web.archive.org/web/*/support.rowriter.com/Portals/0/Brochures/ROWriter_brochure.pdf; archived Mar. 28, 2016; 4 pages.
Evans, Bryce; Ratchet and Wrench; Finding the Right Management System; Jun. 1, 2013; 6 pages.
Andreoli & Associates, Inc; Andreoli Redesigns Bay Management Software; Aug. 21, 2012; 8 pages.
U.S. Appl. No. 16/508,272, filed Jul. 10, 2019, inventors: Patrick S. Merg, David Costantino, and Lester B. Johnson.

\* cited by examiner

| SOURCE | DESTINATION | COMM. TYPE | AUTH. ID | VEH. ID | |
|---|---|---|---|---|---|
| CCS (100) | SCS (2) | REPORT REQUEST: VD REC. ID 1 – VD RPT # 45 | REP. SHOP ID (212) | VEH. ID (209) | ←430 |
| CCS (100) | SCS (2) | REPORT REQUEST: VD RECORD 1 – VDR 90, 1,068 | PASSWORD (211) | VEH. ID (209) | ←431 |
| CCS (100) | SCS (2) | REPORT REQUEST: VD RECORD 5 | CCS ID (210) | VEH. ID (209) AND VIN RECEIPT TIME | ←432 |
| CCS (100) | SCS (2) | BRAKE THICKNESS ALL-TIME | TECH ID (213) | VO ID (214) | ←433 |
| CCS (100) | SCS (2) | BRAKE THICKNESS 18-FEB-2005 TO PRESENT | TECH ID (213) PASSWORD (211) | VO ID (214) AND VEH. ID (209) | ←434 |

FIG. 16

SYSTEM AND METHOD FOR USING MEASUREMENT MADE BY COMPUTERIZED MEASUREMENT TOOL

REFERENCE TO RELATED APPLICATION

This application is a continuation application of U.S. patent application Ser. No. 15/194,525 filed Jun. 27, 2016. U.S. patent application Ser. No. 15/194,525 is incorporated herein by reference. U.S. patent application Ser. No. 15/194,525 published as U.S. Patent Application Publication No. 2017/0372532 A1 on Dec. 28, 2017.

BACKGROUND

Most vehicles are serviced at least once during their useful life. In many instances, a vehicle is serviced at a facility with professional mechanics (e.g., technicians). The technicians can use any of a variety of non-computerized hand tools to service (e.g., repair) any of the wide variety of mechanical components on a vehicle. While servicing vehicles, a technician sometimes makes measurements to determine what needs to be repaired. The technician may spend valuable time recording measurements by writing the measurements on a repair order. Alternatively, the technician may save time by not recording measurements, but a service writer and vehicle owner will not know what measurements were performed and the passage of time may cause the technician to forget the measurements. Furthermore, many vehicle owners prefer to keep information about their vehicle (e.g., measurements) private or at least limit who has access to information about their vehicle.

OVERVIEW

Several example embodiments that relate to vehicle data reports and computerized measurement tools are described herein.

Viewed from one aspect, an example embodiment takes the form of a method comprising: (i) receiving, by a server computing system including at least one processor and a computer-readable memory, a first vehicle data report including an identifier of a first vehicle and a tool measurement regarding the first vehicle, (ii) storing, at the computer-readable memory, multiple vehicle data records including an identifier of a respective vehicle, wherein the multiple vehicle data records include a first vehicle data recording including the identifier of the first vehicle, (iii) storing, at the computer-readable memory, the first vehicle data report as part of the first vehicle data record, (iv) receiving, by the server computing system, a request from a client computing system for a requested portion of the first vehicle data record, wherein the request includes the identifier of the first vehicle, and wherein the requested portion includes at least a portion of the first vehicle data report, (v) determining, by the at least one processor, the client computing system is authorized to receive the requested portion of the first vehicle data record, and (vi) transmitting, by the server computing system, a response to the request from the authorized client computing system, wherein the response includes the requested portion of the first vehicle data record.

Viewed from another aspect, an example embodiment takes the form of a server comprising: at least one processor, and at least one computer-readable memory storing computer-readable program instructions and multiple vehicle data records including an identifier of a respective vehicle, wherein the multiple vehicle data records include a first vehicle data record including an identifier of a first vehicle, wherein execution of the computer-readable program instructions cause the server computing system to perform functions including: (i) receiving a first vehicle data report including the identifier of the first vehicle and a tool measurement regarding the first vehicle, (ii) storing, at the computer-readable memory, the first vehicle data report as part of the first vehicle data record, (iii) receiving a request from a client computing system for a requested portion of the first vehicle data record, wherein the request includes the identifier of the first vehicle, and wherein the requested portion includes at least a portion of the first vehicle data report, (iv) determining the client computing system is authorized to receive the requested portion of the first vehicle data record, and (v) transmitting a response to the request from the authorized client computing system, wherein the response includes the requested portion of the first vehicle data record.

Viewed from yet another aspect, an example embodiment takes the form of a method comprising: (i) receiving, by at least one processor of a client computing system, an identifier of a first vehicle, (ii) generating, by the at least one processor of the client computing system, a request for a first vehicle data report including a tool measurement regarding the first vehicle, wherein the first vehicle data report is part of a first vehicle data record including an identifier of the first vehicle and a first authorization identifier, wherein the request includes the identifier of the first vehicle and the first authorization identifier, (iii) transmitting, by the client computing system to a server computing system, the request for the first vehicle data report, wherein the first vehicle data record is stored at the server computing system with one or more other vehicle data records that include both an identifier of a respective vehicle other than the first vehicle and at least one authorization identifier, (iv) receiving, by the client computing system in response to transmitting the request, the first vehicle data report, and (v) displaying, by a display of the client computing system, the first vehicle data report.

Viewed from yet another aspect, an example embodiment takes the form of a client computing system comprising: at least one processor, a display, and at least one computer-readable memory storing computer-readable program instructions, wherein execution of the computer-readable program instructions cause the client computing system to perform functions including: (i) receiving, by the at least one processor, an identifier of a first vehicle, (ii) generating, by the at least one processor, a request for a first vehicle data report including a tool measurement regarding the first vehicle, wherein the first vehicle data report is part of a first vehicle data record including an identifier of the first vehicle and a first authorization identifier, wherein the request includes the identifier of the first vehicle and the first authorization identifier, (iii) transmitting, to a server computing system, the request for the first vehicle data report, wherein the first vehicle data record is stored at the server computing system with one or more other vehicle data records that include both an identifier of a respective vehicle other than the first vehicle and at least one authorization identifier, (iv) receiving, in response to transmitting the request, the first vehicle data report, and (v) displaying, by the display, the first vehicle data report.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 16 shows example requests for portions of a vehicle data record.

DETAILED DESCRIPTION

I. Introduction

Figure 1:
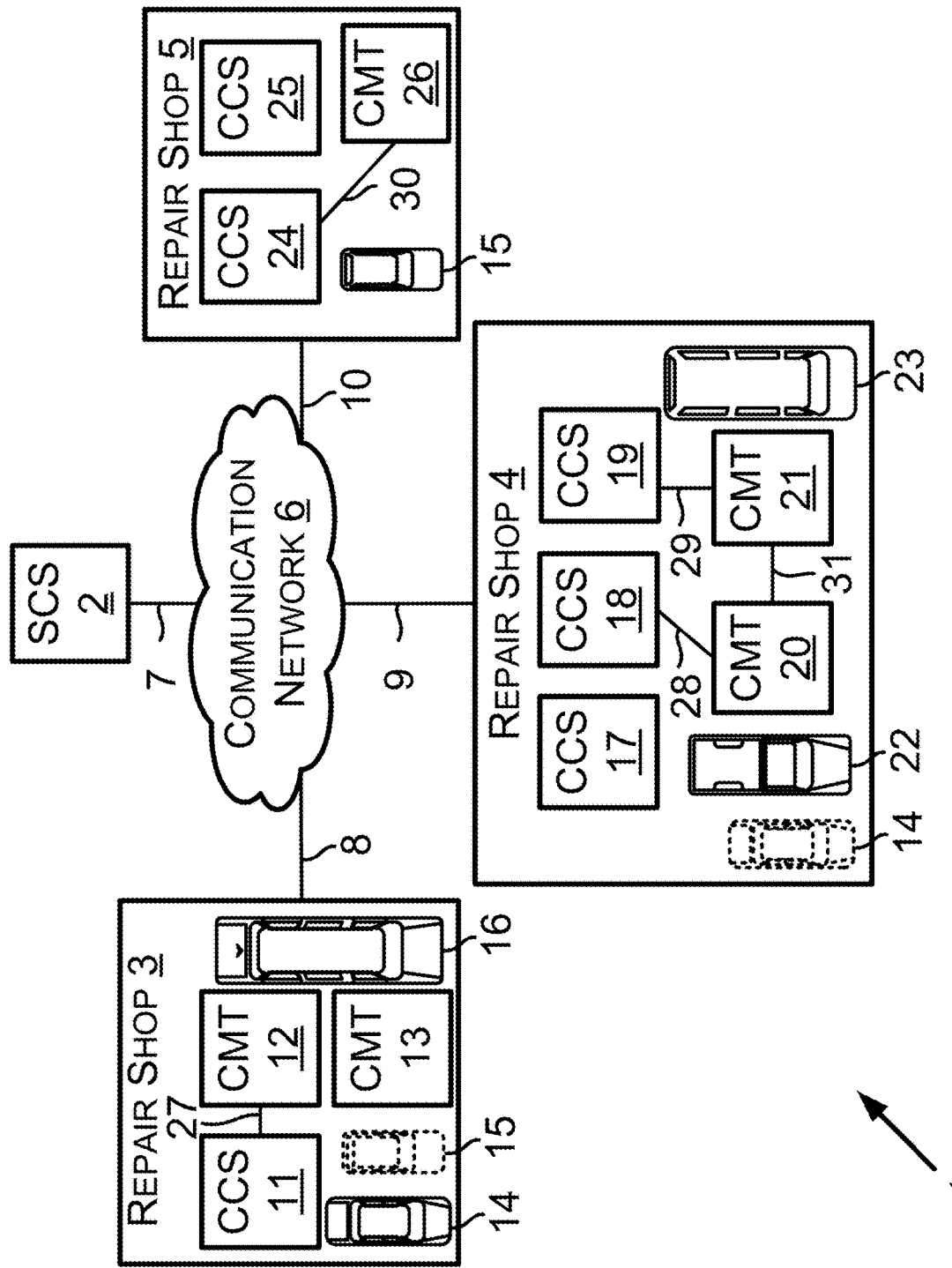
FIG. 1 is a diagram showing an example operating environment in which the example embodiments can operate.

This description describes several example embodiments, at least some which pertain to vehicle data reports and computerized measurement tools. The example embodiments can include transmitting a vehicle data report from a computerized measurement tool (or more simply "measurement tool" or "CMT") to a client computing system (or more simply, "client" or "CCS"), from a client to a server computing system (or more simply, "server" or "SCS"), or from a server to a client. Other examples of providing vehicle data reports are possible. The example embodiments can include providing data for generating a vehicle data report from the CMT to the client or the server. Other examples of providing data for generating a vehicle data report are also possible.

A server can store a vehicle data report as part of a vehicle data record (VD record) within a computer-readable medium. The VD record can be associated with a particular vehicle or vehicle owner so that the server can locate a portion of a VD record based on a search using various search criteria, such as an identifier (ID) of the particular vehicle or an identifier of a vehicle owner. The server can include or refer to authorization data to determine whether a person or device requesting a portion of a VD record has authorization to access the requested portion. Consequently, the server can store VD records that provide snapshots of operating conditions of a vehicle over time, and the server can restrict access to the snapshots so as to maintain some level of privacy of each VD record.

The example embodiments include embodiments that provide a way for transmitting a portion of a VD record (regarding a particular vehicle) stored at a first location where the vehicle is not currently located to a second location wherein the vehicle is located or in close proximity to the vehicle. A server located at the first location can transmit the portion of the VD record to a client located at the second location. Transmitting data from a first device (e.g., a server) to a second device (e.g., a client) can include the second device receiving the data from the first device. Similarly, downloading data at a first device (e.g., a server) from a second device (e.g., a client) can include the second device transmitting the data to the first device.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

U.S. patent application Ser. No. 15/194,531, filed Jun. 27, 2016, entitled "System and method for generating vehicle data report with tool measurement," which is published as United States Patent Application Publication No. 2017/0372533 on Dec. 28, 2017, is incorporated by reference herein.

II. Example Systems

FIG. 1 is a diagram showing an example operating environment 1 in which the example embodiments can operate. The operating environment 1 includes a server computing system (SCS) 2, repair shops 3, 4, 5, a communication network 6, and communication links 7, 8, 9, 10. The communication network 6 can include the communication links 7, 8, 9, 10 as well as other communication links (not shown). The communication network 6 and the communication links 7, 8, 9, 10 can include various network components such as switches, modems, gateways, antennas, cables, transmitters, and/or receivers. The communication network 6 can comprise a wide area network (WAN). The WAN can carry data using packet-switched or circuit-switched technologies. The WAN can include an air interface or wire to carry the data. The communication network 6 can comprise a network or at least a portion of a network that carries out communications using a Transmission Control Protocol (TCP) and the Internet Protocol (IP), such as the communication network commonly referred to as the Internet.

Two or more repair shops can be affiliated with one another. For example, the repair shops 3 and 5 can be repairs shops operating under a franchise agreement with a particular company. Two or more repair shops can be unaffiliated with one another. The unaffiliated repair shops can be owned by competitors that do not share data with one another for one or more reasons. The repair shops 4 and 5 can be unaffiliated with one another. Two or more repair shops can be located near one another. For example, the repair shops 3 and 4 can be located in San Jose, Calif. Two or more repair shops can be located far apart. For example, the repair shops 3 and 5 can be located in San Jose, Calif. and Gainesville, Fla., respectively. A vehicle owner can take her vehicle to a single repair shop, two or more affiliated repair shops, two or more unaffiliated repair shops, or one or more repair shops affiliated with another repair shop and to one or more shops unaffiliated with another repair shop.

A repair shop can include a client computing system (CCS) and a computerized measurement tool (CMT). As shown in FIG. 1, the repair shop 3 includes a client 11, a CMT 12, and a CMT 13, the repair shop 4 includes a client 17, a client 18, a client 19, a CMT 20, and a CMT 21, and the repair shop 5 includes a client 24, a client 25, and a CMT 26. One or more of the computerized measurement tools and the clients can be operable outside of a repair shop. For example, the client 17 and the CMT 20 can be operable within the vehicle 22 as the vehicle 22 is driven on roads outside of the repair shop 4 for any of a variety of purposes. The server 2 can be scaled so as to be able to serve any number of clients, such as one client, five clients (as shown in FIG. 1), one hundred clients, one thousand clients, or some other number of clients.

As an example, a computerized measurement tool can be used to carry out (i.e., perform) a measurement. A processor can generate a tool measurement (i.e., data to represent each measurement carried out by a CMT). A tool measurement can be referred to as "tool measurement data." The example embodiments can perform various functions with respect to the tool measurement, such as storing the tool measurement in a computer-readable medium, generating a vehicle data report (VD report) including the tool measurement, and providing the tool measurement to a client or a server. Providing the tool measurement can include transmitting the tool measurement over an air interface or a wire.

Table 1 shows examples of computerized measurement tools and measurements that may be performed by those measurement tools. Other examples of computerized measurement tools are also possible.

TABLE 1

| COMPUTERIZED MEASUREMENT TOOL | EXAMPLE MEASUREMENTS |
|---|---|
| Air chuck | Tire pressure |
| Air conditioning manifold gauges | Air conditioning low side pressure, air conditioning high side pressure |
| Ammeter | Amperage |
| Anti-freeze hydrometer | Coolant strength, antifreeze concentration |
| Battery tester | Battery temperature, electrolyte specific battery, battery voltage with load applied |
| Bore gauges | Cylinder bore diameter |
| Caliper | Distance between two opposite sides of an object, such as a crankshaft journal, a brake drum, or a brake rotor, wheel dimensions (e.g., wheel width and wheel diameter) |
| Charging system tester | Alternator output current |
| Compression gauge | Engine cylinder compression |
| Dial indicator | Brake rotor runout, ball joint wear |
| Digital indicator | Brake rotor runout, ball joint wear |
| Digital volt ohm meter (DVOM) | Voltage, resistance, capacitance, amperage, frequency, inductance, electrical |
| Exhaust gas analyzer | Vehicle tail pipe emissions for diagnostics, vehicle tail pipe emissions for state emission testing, hydrocarbons, carbon monoxide, carbon dioxide, oxides of nitrogen (NOx) |
| Feeler gauges | Spark plug gap |
| Fuel pressure gauge | Fuel pump pressure, fuel rail pressure |
| Level | Vehicle lift level |
| Oil pressure gauge | Engine oil pressure, transmission oil pressure |
| Oscilloscope | Voltage, amperage, frequency, pulse width, duty cycle, electronic spark timing |
| Starter tester | Starter current draw |
| Temperature gauge (e.g., thermometer or infrared temperature gauge) | Coolant temperature, engine oil temperature, ambient air temperature |
| Thermal imager | Vehicle component temperatures |
| Tire pressure gauge | Tire air pressure |
| Tire tread measurement gauge | Tire tread depth |

TABLE 1-continued

| COMPUTERIZED MEASUREMENT TOOL | EXAMPLE MEASUREMENTS |
|---|---|
| Torque wrench | Rotational force applied to a vehicle fastener, wheel lug nut torque, cylinder head bolt torque, intake manifold bolt torque, water pump bolt torque, fastener torque, bolt torque |
| Vacuum gauge | Intake manifold vacuum |
| Vehicle brake lathe (i.e., brake lathe) | Brake part thickness measurement of a vehicle brake part (e.g., a brake rotor or a brake drum) |
| Vehicle collision repair tool | Vehicle frame measurement |
| Vehicle inspector | Wheel alignment geometry, |
| Vehicle wheel balancer (i.e., wheel balancer) | Wheel weight value (e.g., 1.0 oz.), wheel weight position for a wheel of the vehicle, tire pressure, wheel width, wheel diameter |
| Wheel alignment machine | Caster, camber, toe-in, toe-out, a steering axis inclination, tire size, wheel size, vehicle dimensions, thrust angle |

FIG. 1 shows that repair shops can include a same or different number of CCS and a same or different number of CMT. Table 2 includes data showing examples of the CMT that can be associated with the repair shops 3, 4, and 5. Table 2 shows that the repair shops can be associated with the same type of CMT (e.g., a torque wrench), but the torque wrenches can be different (e.g., built by a different manufacturer or configured with a different version (e.g., software or hardware version)). Furthermore, Table 2 shows a use status of CTS at repair shops 3, 4, 5. Data indicating a status of one or more of the CMT can be reported to a server and stored within a computer-readable medium for use by the server.

TABLE 2

| Repair Shop | CMT | Manufacturer | Version | Use status |
|---|---|---|---|---|
| 3 | WAM | A | 1 | In use |
| 3 | Wheel balancer | B | 4 | Available |
| 3 | Battery tester | C | 6 | Available |
| 3 | DVOM | C | 2 | Available |
| 4 | Wheel balancer | D | 1 | Available |
| 4 | Torque wrench | E | 17 | Available |
| 4 | Battery tester | C | 4 | Available |
| 4 | Torque wrench | F | 6 | In use |
| 4 | Oil Pressure Gauge | G | 5 | Available |
| 4 | Compression Gauge | H | 3 | In use |
| 4 | Brake lathe | I | 4 | In use |
| 5 | Brake lathe | J | 2 | Available |
| 5 | Battery tester | C | 5 | Available |
| 5 | Tire Pressure Gauge | K | 4 | In use |
| 5 | Torque wrench | E | 1 | In use |
| 5 | Fuel pressure gauge | C | 7 | Available |

Another type of measurement that can be performed by a computerized measurement tool at repair shops is a measurement read from a vehicle data message. A vehicle can include an electronic control unit (ECU) connected to one or more vehicle sensors or other inputs. Each ECU can comprise an original equipment manufacturer (OEM) ECU or an after-market ECU. The ECU can carry out a measurement based on data the ECU receives from the vehicle sensors or other inputs. A processor in the ECU can generate vehicle data messages including data to represent each measurement performed by the ECU. An ECU can transmit vehicle data messages in response to an on-board diagnostics (OBD) II parameter request that includes a parameter identifier (PID) or in response to a different request.

A client and a CMT can be connected to each other by a network established by those devices. Such network can be referred to as a CMT-to-client network. A client can be connected to multiple CMT simultaneously using separate CMT-to-client networks. A client can be connected to multiple CMT simultaneously using a common CMT-to-client network. A CMT can be connected to multiple clients simultaneously using separate CMT-to-client networks. A CMT can be connected to multiple clients simultaneously using a common CMT-to-client network. A CMT-to-client network can include an air interface or a wire. A CMT-to-client network can comprise a personal area network (PAN). The PAN can be configured according to any of a variety of standards, protocols, or specifications. For example, the PAN can be configured according to a universal serial bus (USB) specification 2.0, 3.0, or 3.1 developed by the USB Implementers Forum. As another example, the PAN can be configured according to an Institute of Electrical and Electronics Engineers (IEEE) standard, such as an IEEE 802.11 standard (e.g., 802.11a, 802.11b, 802.11g, or 802.11n) or an IEEE 802.15 standard (e.g., 802.15.1, 802.15.3, 802.15.4, or 802.15.5) for wireless PAN (WPAN). FIG. 1 shows CMT-to-client networks 27, 28, 29, and 30.

Two or more CMT can be connected by a network established by those two or more CMT. Such network can be referred to as a CMT network. A CMT network can comprise a PAN, a WPAN, or another type of network. FIG. 1 shows a CMT network 31 connecting CMT 20 and CMT 21.

FIG. 1 shows vehicles 14, 15, 16, 22, 23 within the repair shops 3, 4, 5. The vehicles shown with solid lines represents the vehicle is currently in the repair shop, whereas the vehicles shown with broken lines represents the vehicle was previously in the repair shop. FIG. 1 thus shows that some vehicles can be taken to more than one repair shop. For example, vehicle 14 is currently in repair shop 3 and has previously been in repair shop 4, and vehicle 15 is currently in repair shop 5 and has previously been in repair shop 3. For purposes of this description, the vehicle 14 is owned by a first vehicle owner (VO1), vehicle 15 is owned by a second vehicle owner (VO2), vehicle 16 is owned by a third vehicle owner (VO3), vehicle 22 is owned by a fourth vehicle owner (VO4), and vehicle 23 is owned by a fifth vehicle owner (VO5). One or more of the VO1, the VO2, the VO3, the VO4, and the VO5 can be the same person.

A vehicle, such as vehicle 14, 15, 16, 22, 23, is a mobile machine that can be used to transport a person, people, or cargo. As an example, any vehicle described herein can be driven and/or otherwise guided along a path (e.g., a paved road or otherwise) on land, in water, or in the air or outer space. As another example, any vehicle described herein can be wheeled, tracked, railed, or skied. As yet another example, any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. As still yet another example, any vehicle described herein can include or use any appropriate voltage or current source, such as a battery, an alternator, a fuel cell, and the like, providing any appropriate current or voltage, such as about 12 volts, about 42 volts, and the like. As still yet another example, any of the vehicles described herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein can include an electronic control unit (ECU), a data link connector (DLC), and a vehicle communication link that connects the DLC to the ECU.

Some vehicles can be identified by characteristics of the vehicle such as when the vehicle was built (e.g., a vehicle model year), who built the vehicle (e.g., a vehicle make), marketing names associated with vehicle (e.g., a vehicle model name, or more simply "model"), and features of the vehicle (e.g., an engine type). This description uses an abbreviation YMME or Y/M/M/E, where each letter in the order shown represents a model year, vehicle make, vehicle model name, and engine type, respectively. This description uses an abbreviation YMM or Y/M/M, where each letter in the order shown represents a model year, vehicle make, and vehicle model name, respectively. An example Y/M/M/E shown in the drawings is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Mich.

A vehicle communication link within a vehicle can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2K-Line VDM protocol, an ISO 14230-4 KWP2000 K-Line VDM protocol, or some other protocol presently defined for performing communications within a vehicle.

The DLC can comprise a connector such as an OBD I connector or an OBD II connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Delphi Automotive LLP of Troy, Mich. The DLC can include conductor terminals that connect to a conductor in a vehicle. For instance, the DLC can include connector terminals that connect to conductors that respectively connect to positive and negative terminals of a vehicle battery. The DLC can include one or more conductor terminals that connect to a conductor of the vehicle communication link such that the DLC is communicatively connected to the ECU.

An ECU can control various aspects of vehicle operation or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle.

Figure 2:
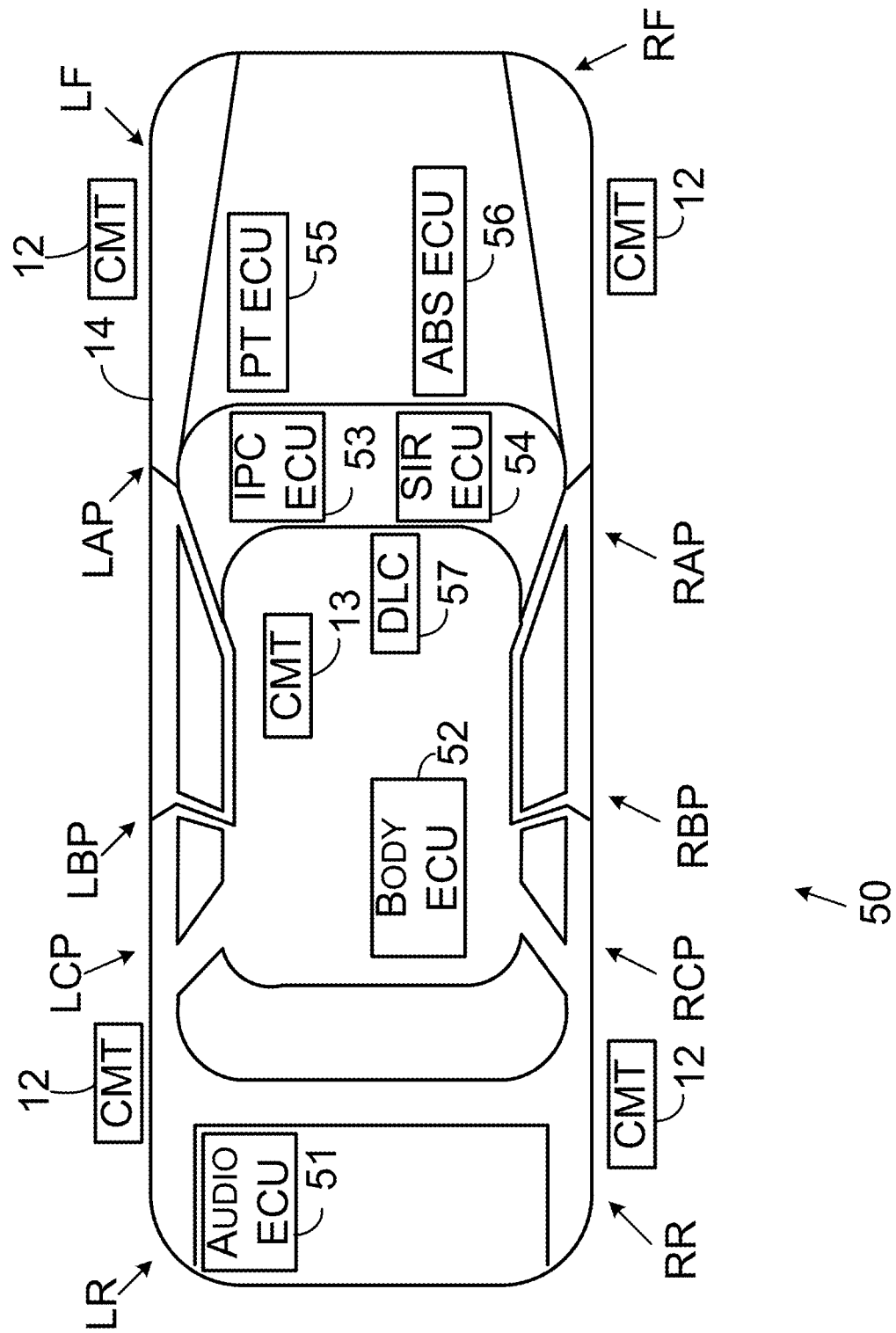
FIG. 2 is a diagram of a vehicle showing example placement of computerized measurement tools.

Next, FIG. 2 shows a diagram 50 of a vehicle and example placement of CMT with respect to the vehicle. In particular, FIG. 2 shows that the vehicle 14 can include an audio ECU 51, a body ECU 52, an instrument panel cluster (IPC) ECU 53, an SIR ECU 54, a PT ECU 55, and an anti-lock brake (ABS) ECU 56. A vehicle can include a different set of ECU than the set of ECU shown in FIG. 2. The vehicle 14 can include a DLC 57.

FIG. 2 shows example spatial references of a vehicle. Starting from the upper left-most corner and proceeding clockwise, those spatial references include left rear ("LR"), left C-pillar ("LCP"), left B-pillar ("LBP"), left A-pillar ("LAP"), left front ("LF"), right front ("RF"), right A-pillar ("RAP"), right B-pillar ("RBP"), right C-pillar ("RCP"), and right rear ("RR"). Spatial references pertaining to a vehicle can be included as part of a VD report including a tool measurement regarding the vehicle. Vehicle components within the vehicle 14 can be associated with different spatial identifiers, such as an engine cylinder position or number or a fuel injector position or number. Vehicle systems within the vehicle 14 can be associated with multiple spatial identifiers, such as a vehicle braking system including a LF wheel brake, a RF wheel brake, a LR wheel brake, and a RR wheel brake. Other examples of spatial identifiers pertaining to a vehicle, a vehicle component, a vehicle system, or a tool measurement are also possible.

A CMT can be used inside of a vehicle. For example, the CMT 13 can be used within a passenger compartment of the vehicle 14. A CMT can be used outside of a vehicle. For example, the CMT 12 can be used at the wheels of the vehicle 14, which can be referred to as the LF, RF, LR, and RR wheels. In one respect, the CMT 12 can include multiple measurement tools that can be used at those portions of the vehicle simultaneously, such as measurement tools of a wheel alignment machine. In another respect, the CMT 12 can include a single CMT, such as a brake lathe that is used at one wheel at a time.

Figure 3:
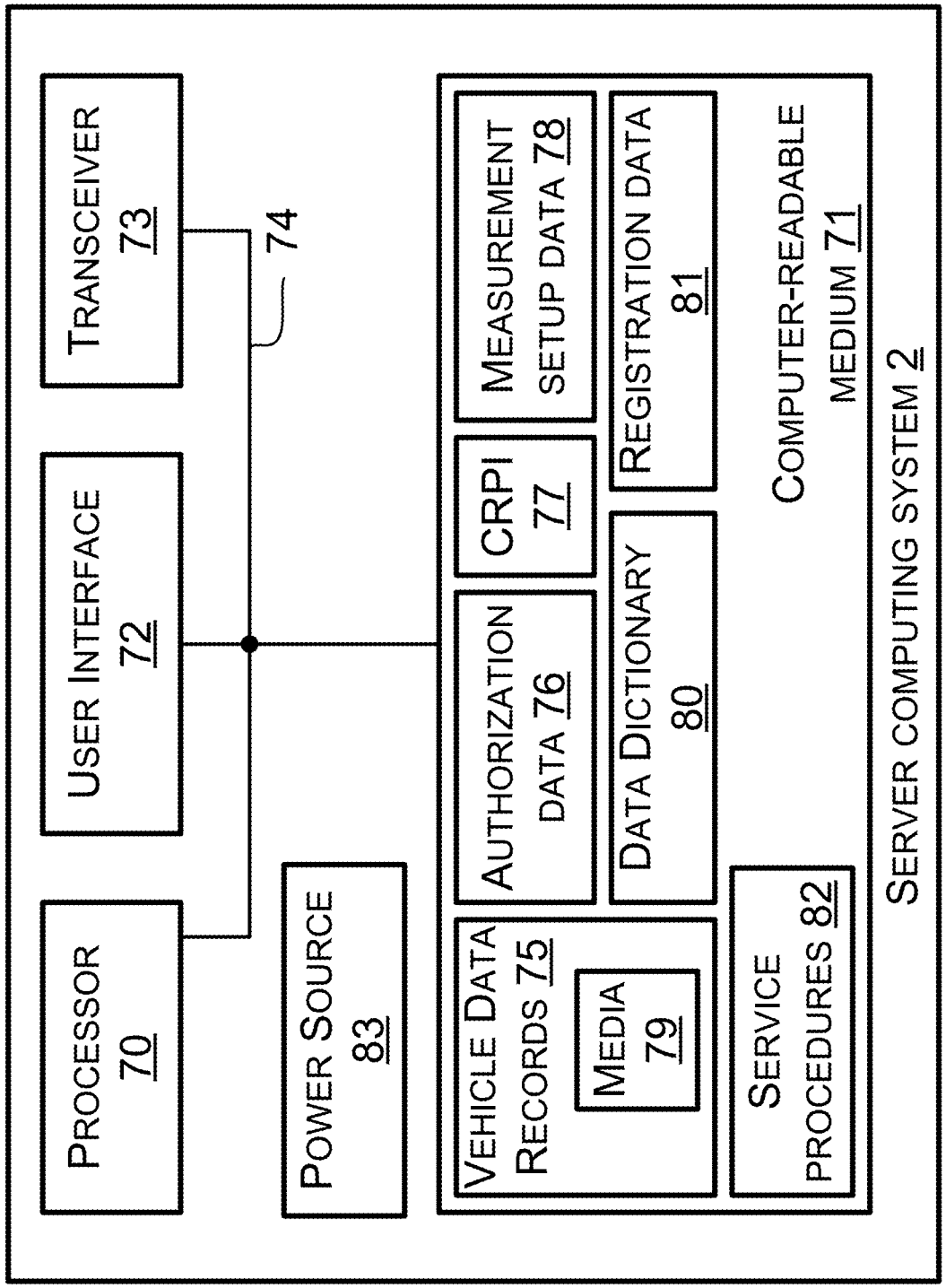
FIG. 3 is a block diagram of an example server computing system.

Next, FIG. 3 is a block diagram of the server computing system 2 shown in FIG. 1. FIG. 3 shows components that can be included within the server 2. Those components include a processor 70, a computer-readable medium (CRM) 71, a user interface 72, and a transceiver 73. Two or more of those components can be communicatively coupled or linked together via a system bus, network, or other connection mechanism 74. The server computing system 2 also includes a power source 83.

A processor such as the processor 70 or any other processor discussed in this description can include one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI). For example, the processor 70 can execute CRPI 77 stored in the CRM 71. A processor can be configured to execute hard-coded functionality in addition to or as an alternative to software-coded functionality (e.g., via CRPI). The at least one processor of the processor 71 can be programmed to perform any function or combination of functions described herein as being performed by the server 2.

A computer-readable medium such as the CRM 71 or any other CRM discussed in this description can include one or more CRM. A CRM can include a non-transitory CRM, a transitory CRM, or both a non-transitory CRM and a transitory CRM. A non-transitory CRM, or a portion thereof, can be located within or as part of a processor (e.g., within a single integrated circuit chip). A non-transitory CRM, or a portion thereof, can be separate and distinct from a processor.

A non-transitory CRM can include a volatile or non-volatile storage component, such as an optical, magnetic, organic or other memory or disc storage component. Additionally or alternatively, a non-transitory CRM can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory CRM can include, for example, CRPI provided over a communication link, such as a communication link which is connected to or is part of the communication network 6. The communication link can include a digital or analog communication link. The communication link can include a wired communication link including one or more wires or conductors, or a wireless communication link including an air interface.

A computer-readable medium can be referred to by other terms such as a "computer-readable storage medium," a "data storage device," a "memory device," a "memory," "computer-readable media," a "computer-readable database," "at least one computer-readable medium," or "one or more computer-readable medium." Any of those alternative terms can be preceded by the prefix "transitory" if the CRM is transitory or "non-transitory" if the CRM is non-transitory.

The CRM 71 can include a data dictionary 80. The processor 70 can refer to the data dictionary 80 while or as part of executing the CRPI 77. As an example, the processor 70 can refer to the data dictionary 80 after receiving a tool measurement including a tool measurement indicator to be able to determine what type of tool measurement is indicated by the tool measurement indicator and other information such as a conversion factor, a spatial indicator, a vehicle component indicator, or some other indicator.

The CRM 71 can include registration data 81 that includes data regarding CCS and CMT. The registration data can include data such as data indicating which CCS are authorized to receive data stored in the CRM 71, and which CMT are associated with a CCS or a repair shop. The registration data 81 can include status data transmitted to the server 2 regarding availability of the registered CMT. The registration data 81 can include data indicating a version of the registered CMT.

The CRM 71 can include service procedures 82 for providing to a CCS being used to diagnose a vehicle. One or more of the service procedures can include an instruction, such as an instruction to perform a measurement using a CMT arranged as a computerized measurement tool. The processor 70 can modify a service procedure prior to transmitting the service procedure to a CCS, the modification being based on the registered tools associated with the CCS to which the service procedure is to be transmitted. The modified service procedure can include data indicating the availability of the CMT required or recommended for the service procedure.

A user interface such as the user interface 72 or any other user interface discussed in this description can include one or more user interfaces. Each user interface can include one or more user-input elements configured so that a user of a system that includes the user interface can input data to or for use by a processor or another item of the system including the user interface. As an example, the user-input elements can include a touch screen display, a user input section having one or more input keys, a pointing device such as a computing system mouse, a keyboard (e.g., a QWERTY keyboard), a display pointer (e.g., a computer mouse input device), or a microphone for receiving spoken inputs.

A user interface such as the user interface 72 or any other user interface discussed in this description can include one or more user-output elements configured for outputting (e.g., presenting) data to a user of the system including the user interface. As an example, the user-output elements can include a display for visually presenting data, such as text fields, text entries, drop-down meus, display user interfaces, service procedures, repair orders, vehicle data reports, lists of measurement tools, vehicle identifiers, VD records 75, authorization data 76, comments within the CRPT 77, measurement setup data 78, or a tool measurement conclusion message. As another example, the user-output elements can include an audio speaker to audibly present data to a user of the device or system including the user interface.

A transceiver such as the transceiver 73 or any other transceiver discussed in this description can include one or more transceivers. Each transceiver can include one or more transmitters configured to transmit data onto a network, such as the communication network 6 or a CMT-to-client network. Each transceiver can include one or more receivers configured to receive data carried over a network, such as the communication network 6 or a CMT-to-client network. The data transmitted or received by a transceiver can comprise any of the measurement data, reports, records, or data discussed in this description or any combination thereof.

A transmitter can transmit radio signals carrying data and a receiver can receive radio signals carrying data. A transceiver with that transmitter and receiver can include one or more antennas and can be referred to as a "radio transceiver," an "RF transceiver," or a "wireless transceiver." The radio signals transmitted or received by a radio transceiver can be arranged in accordance with one or more wireless communication standards or protocols such as an IEEE 802.15.1 standard for WPANs, a Bluetooth version 4.1 standard developed by the Bluetooth Special Interest Group (SIG) of Kirkland, Wash., or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the communication network 6 or a CMT-to-client network. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a transceiver can include a destination identifier or address of a system component to which the data is to be transmitted. The data transmitted by a transceiver can include a source identifier or address of the system component including the transceiver. The source identifier or address can be used to send a response to the system component that includes the transceiver that sent the data.

A transceiver that is configured to carry out communications over the communication network 6, such as the network interface 73, can include a modem, a network interface card, and/or a chip mountable on a circuit board. As an example the chip can comprise a CC3100 Wi-Fi® network processor available from Texas Instruments, Dallas, Tex., a CC256MODx Bluetooth® Host Controller Interface (HCI) module available from Texas instruments, and/or a different chip for communicating via Wi-Fi®, Bluetooth® or another communication protocol.

Figure 6:
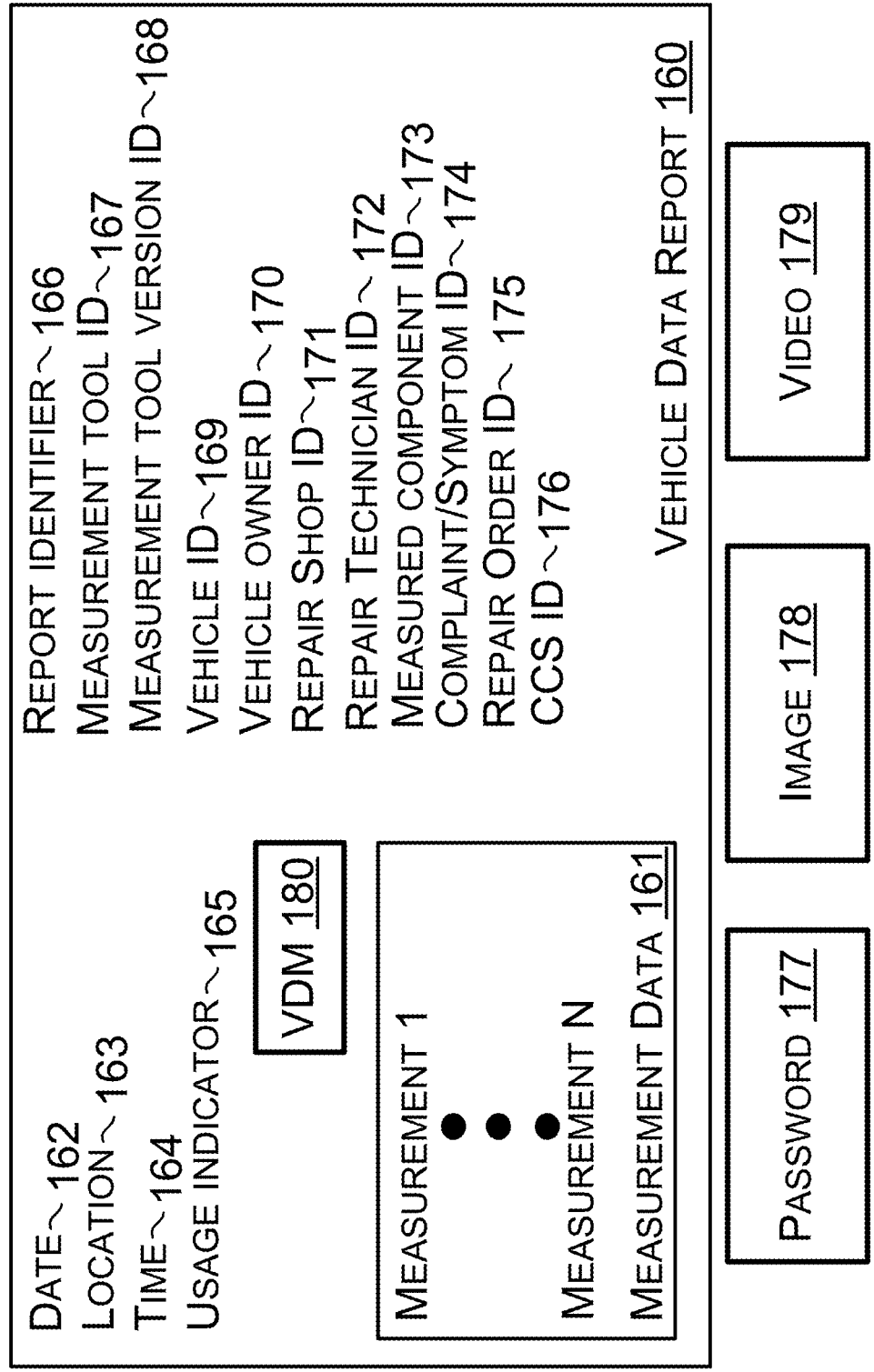
FIG. 6 shows an example vehicle data report.

The VD records 75 stored in the CRM 71 can include one or more VD records. Each VD record can include an identifier, such as a vehicle ID or a vehicle owner TD (e.g., VO1). Each VD record can include one or more vehicle data reports (e.g., a vehicle data report the server 2 receives from a CMT or client) associated with a vehicle or vehicle owner represented by the identifier. FIG. 6 shows an example VD record. The VD records 75 can include media 79 (e.g., one or more media files that correspond to or that are part of a vehicle data report stored in the VD records 75). A media file stored in the media 79 can include a video file, an audio file, or an image.

The authorization data 76 can include data the processor 70 uses to determine what portion of the VD records 75, if any, should be provided to a client in response to a request for some portion of the VD records 75. For example, the authorization data 76 can include an identifier, such as an identifier of a repair shop, a technician, a client, an ST, a vehicle owner, or a vehicle. The authorization data can include a password associated with the identifier.

The measurement setup data 78 can include data that indicates a range of measurement data regarding a vehicle component. The range of measurement data can indicate an acceptable operating measurement for the vehicle component. Some or all of the measurement setup data 78 can be obtained by a manufacturer of a vehicle component or a vehicle. As an example, the measurement setup data 78 can include data that indicates dimensions of vehicle components, such as thicknesses and diameters, and normal operating characteristics of vehicle components, such as temperatures, voltages, currents, and pressures.

The CRPI 77 can comprise a plurality of program instructions. The CRPI 77 and any other CRPI described in this description can include data structures, objects, programs, routines, or other program modules that can be accessed by a processor and executed by the processor to perform a particular function or group of functions and are examples of program codes for implementing steps for methods described in this description.

In general, the CRPI 77 can include program instructions to cause the server 2 to perform any function described herein as being performed by the server 2 or to cause any item of the server 2 to perform any function herein as being performed by that item of the server 2.

Figure 15:
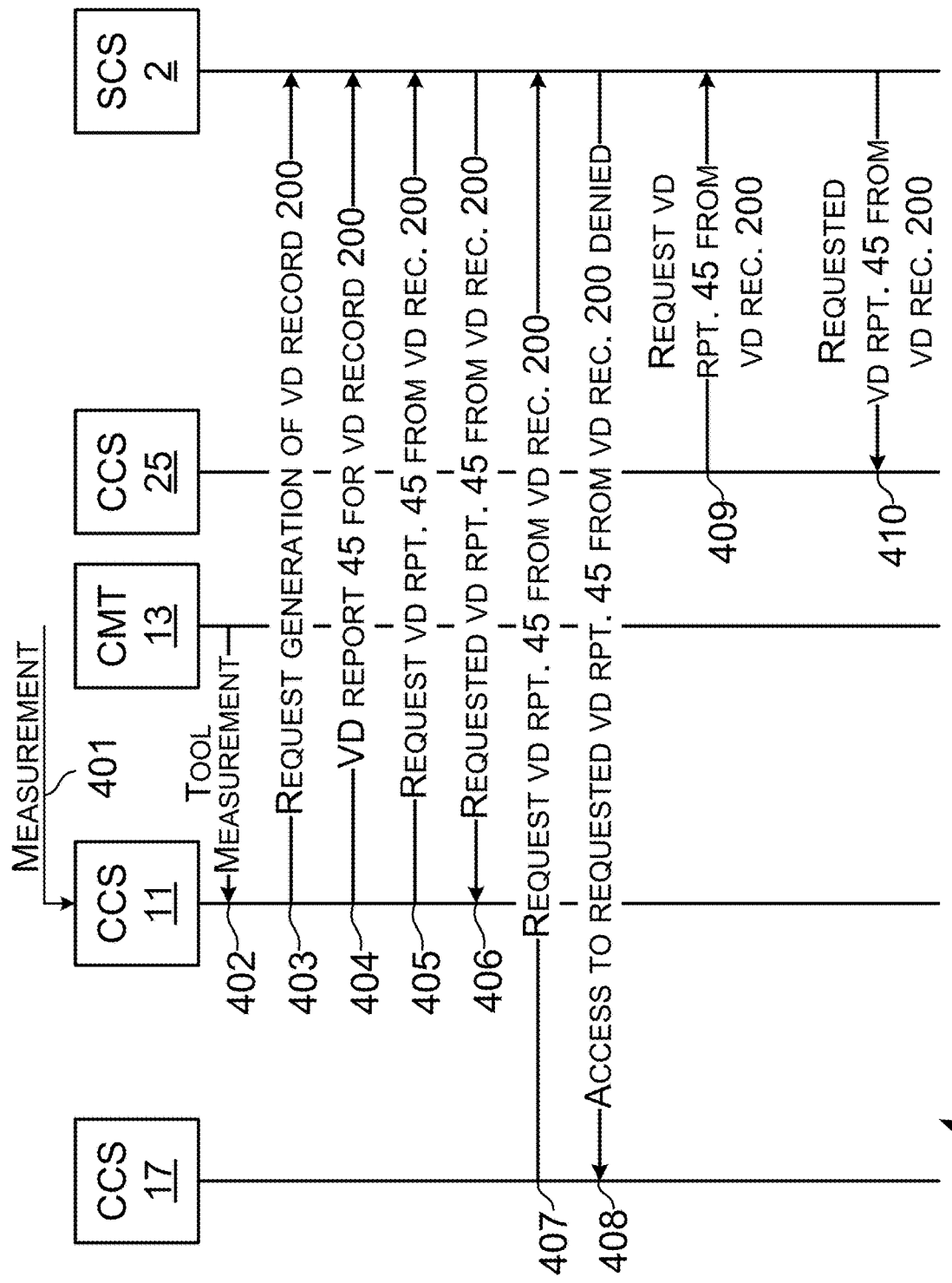
FIG. 15 is a communication diagram showing various communications in accordance with the example embodiments.

In particular, the CRPI 77 can include program instructions to search the VD records 75 to determine whether a VD record has been established for a particular vehicle or vehicle owner, generate a VD record for a particular vehicle or vehicle owner, modify a VD record for a particular vehicle or vehicle owner by adding a vehicle data report to the VD record, search the VD record to locate at a portion of the VD record, determine whether a portion of a VD record should be provided in response to a request for the portion of the VD record, and provide a portion of a VD record to the transceiver 73 for transmission over the communication network 6 to a client. In this way, the server 2 can transmit to the client at least part of a VD record not stored at the client in response to a request for the at least part of the VD record so that the client can display some part of the VD record on a user interface 103. The CRPI 77 can include program instructions to receive the communications received by the server 2 and transmitted by the server 2, as shown in FIG. 15. Other examples of the functions performed by executing program instructions within the CRPI 77 are also possible.

A power source such as the power source 83 or any other power source discussed in this description can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source such as the power source 83 or any other power source discussed in this description can include a connection to an internal power source and power transfer circuitry to allow current to flow to other elements connected to the internal power source. As an example, the internal power source can include an energy storage device, such as a battery.

Furthermore, any power source described herein can include various circuit protectors and signal conditioners. The power sources described herein can provide a way to transfer electrical currents to other elements that operate electrically.

Figure 4:
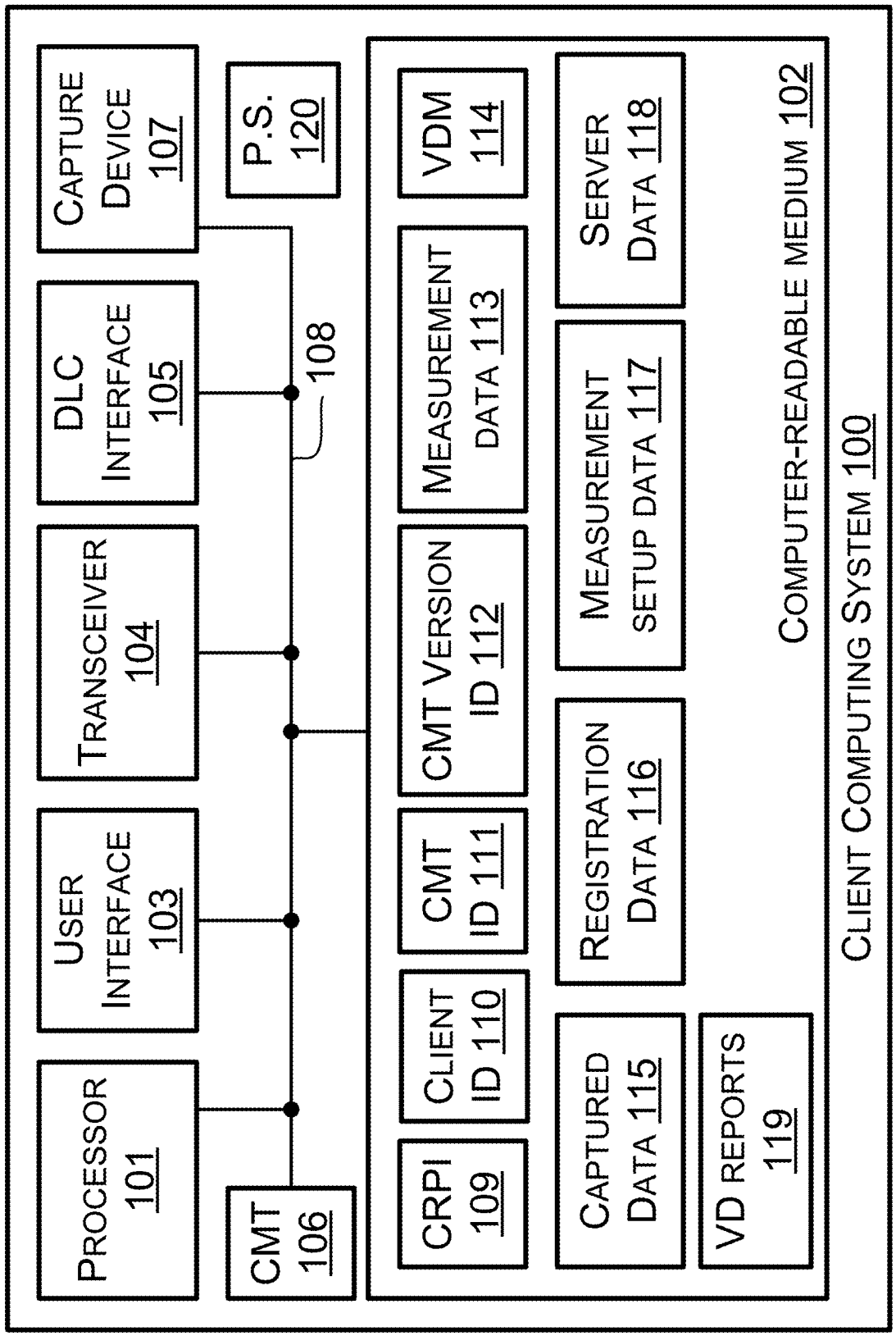
FIG. 4 is a block diagram of an example client computing system.

Next, FIG. 4 is a block diagram of a client computing system 100. As shown in FIG. 4, the client 100 includes a processor 101, a CRM 102, a user interface 103, a transceiver 104, a DLC interface 105, a CMT 106, and a capture device 107. Two or more of those elements can be communicatively coupled and/or linked together via a system bus, network, and/or other connection mechanism 108. As an example, a client described in this description can be configured like the client 100 (e.g., include the components of the client 100). As another example, a client described in this description can include the processor 101, the CRM 102, the user interface 103, the transceiver 104, and none of or one or more of the DLC interface 105, the CMT 106, and/or the capture device 107, as illustrated in Table 3, where "X" indicates the client includes that component. Other example arrangements of a client based on the components shown in FIG. 4 are also possible. The client computing system 100 can include the power source 120.

TABLE 3

| FIG. 4 | Client computing system example no. | | | | | | | |
|---|---|---|---|---|---|---|---|---|
| Ref. | 1 | 2 | 3 | 4 | 5 | 6 | 7 | 8 |
| 101 | X | X | X | X | X | X | X | X |
| 102 | X | X | X | X | X | X | X | X |
| 103 | X | X | X | X | X | X | X | X |
| 104 | X | X | X | X | X | X | X | X |
| 105 |   | X |   |   | X | X |   | X |
| 106 |   |   | X |   |   | X | X | X |
| 107 |   |   |   | X |   | X | X | X |

The user interface 103 can include user interface components for manually entering a tool measurement based on a measurement performed by a measurement tool. For example, the tool measurement can include a compression measurement of one or more engine cylinders in a vehicle. As another example, the tool measurement can be a thickness measurement of a brake rotor, a diameter of a brake drum, a thickness of a brake pad or brake shoe performed using a measurement caliper, such as a digital electronic caliper, model number MCAL6A, available from Snap-on Incorporated. The tool measurement entered via the user interface 103 can be stored within the measurement data 113. Manually entering tool measurement can be necessary when the measurement tool that carried out the measurement does not include a transceiver to transmit the message to the client 100 or the measurement tool is not a CMT.

The user interface 103 can include a display for displaying a display user interface (DUI). A DUI can, for example, include a graphical user interface or text-based user interface. A DUI can provide a way to input data into the client 100. As an example, a DUI can display vehicle data report characteristics selectable for generating a request for a portion of a VD record. As another example, a DUI can provide a way to enter tool measurement without or with spatial identifiers associated with a tool measurement, such as an engine cylinder number, LF, LBP, etc. As another example, a DUI can display the portion of a VD record requested and received from the server 2. As another example, a DUI can display tool data representing a measurement performed by the CMT 106 or received at the transceiver 104.

Displaying a DUI can include displaying one or more selector fields (e.g., text boxes, drop-down menus, etc.) at which a user can enter a selection, such as a vehicle data report characteristic for generating a request for a portion of a VD record.

The transceiver 104 can communicatively couple to a network, such as the communication network 6 or a CMT-to-client network. That coupling can be carried out, for example, by connecting the transceiver 104 to a wired communication link of the communication network 6 or the CMT-to-client network, syncing the transceiver to a wireless network access point, placing a phone call, or in some other manner. The transmitter of the transceiver 104 can transmit various data over the communication network 6 or the CMT-to-client network such as a report that includes measurement data, such as a VD report, or a request for a portion of a VD report. The receiver of the transceiver 104 can receive various data transmitted over the communication network 6 or the CMT-to-client network, such as a VD report including a requested portion of a VD record.

The transceiver 104 can include one or more items that allow the client 100 to receive tool measurement data (i.e., tool measurements) carried out by a CMT or non-measurement data (e.g., captured vehicle identification information) from a CMT. The items of the transceiver 104 can include wires, cables, connectors, electrical circuitry, receivers, transmitters, or some other item. As an example, the transceiver 104 can include Universal Serial Bus (USB) connectors and cables for connecting to a CMT having a USB connector. The USB components can be configured according the USB 3.0 standard or another USB standard. As another example, the transceiver 104 can include a radio receiver to receive tool measurements or non-measurement data transmitted by radio signals from a CMT or CMT. The transceiver 104 can provide the received measurements or non-measurement data to another component of the client 100 by way of the connection mechanism 108.

The DLC interface 105 can include one or more items that allow the client 100 to communicate with a vehicle over a client-to-vehicle network established between the client 100 and a DLC of a vehicle. The items of the DLC interface 105 can include a DLC that is configured to connect to the DLC in a vehicle, a wire connector, one or more wires that connect the DLC of the DLC interface 105 to the connection mechanism 108 such that vehicle data messages from the vehicle can be received by the processor 101 or another component of the client 100. The vehicle data messages or some portion thereof can be stored within the measurement data 113 or the vehicle data messages (VDM) 114.

The DLC interface 105 can include a transceiver (e.g., an integrated transmitter and receiver, or a distinct transmitter and a distinct receiver). The transmitter of the DLC interface 105 can be configured to transmit data to a vehicle. The data transmitted by the DLC interface 105 to a vehicle can include a request for a VDM. The receiver of the DLC interface 105 can be configured to receive data transmitted by a vehicle over a client-to-vehicle network. As an example, the transceiver of the DLC interface 105 can comprise a transceiver such as a system basis chip with high speed CAN transceiver 33989 provided by NXP Semiconductors, Eindhoven, Netherlands. The data received by the DLC interface 105 from a vehicle can include a VDM.

The CMT 106 can comprise a CMT that performs tool measurements that are provided to the server 2 as part of a vehicle data report. As an example, the CMT 106 can comprise a brake lathe, a wheel alignment machine, a wheel balancer, an exhaust gas analyzer, a tire tread measurement machine, a DVOM, or some other type of CMT. A client that includes a CMT can be referred to as a CMT.

The capture device 107 is operable to capture various types of data. As an example, the capture device 107 can comprise a camera to capture an image. As another example, the capture device 107 can comprise an optical scanner to capture data by scanning a multi-dimensional code, such as a two-dimensional bar code or a matrix code. The captured data can include any of a variety of data that can be interpreted by the processor 101. The interpretation can include performing optical character recognition or comparing a captured media file to a reference media file perhaps retrieved from the measurement setup data 78. As an example, the captured data can comprise data representing the VIN of a vehicle. As another example, the captured data can comprise data representing a CMT identifier. As another example, the captured data can comprise an image of a VIN plate or label on a vehicle, an image of a license plate attached to the vehicle, an image of a vehicle or a portion of a vehicle, an image of a vehicle component, or an image of a CMT. As yet another example, the captured data can comprise vehicle battery data, such as a cold cranking amperage rating of the battery. The data captured by the capture device 107 can be stored in the CRM as captured data 115.

The CRM 102 can include CRPI 109, a client identifier 110, a CMT identifier 111, a CMT version identifier 112, measurement data 113, vehicle data messages 114, captured data 115, registration data 116, measurement setup data 117, server data 118, and VD reports 119. The measurement data 113 can include data representing at least one of a tool measurement, such as a tool measurement carried out by the CMT 106 or measurement data received at the transceiver 104 from a CMT distinct from the client 100. The CRM 102 can receive the data stored as measurement data 113 from at least one of the processor 101, the user interface 103, the transceiver 104, and the CMT 106. The CRPI 109 are executable by the processor 101 to perform functions described herein as being performed by the client 100.

The client ID 110 can include an identifier that a processor (e.g., the processor 70 of the server 2) can use to distinguish the client 100 from at least one other client (e.g., all other clients). As an example, the client ID 110 can include a hardware serial number associated with the client 100. As another example, the client ID 110 can include a license number, such as a license number associated with an information product, such as the SHOPKEY® information system available from Snap-on Incorporated, Kenosha, Wis. Additionally or alternatively, the client ID 110 can include an identifier that a processor can use to determine a model type of the client 100. For example, the client TD 110 can include a model identifier such as "EEMS330W" which represents a model type of a client referred to as the VERUS® Edge diagnostic and information system sold by Snap-on Incorporated. The client ID 110 can include a software level identifier associated with software (e.g., the CRPI 109) contained in the CRM 102 and a hardware level identifier associated with items contained within the client 100.

The CMT ID 111 can include an identifier that a processor (e.g., the processor 70) can use to distinguish a CMT associated with the identifier from any other CMT. As an example, the CMT ID 111 can include a serial number associated with a CMT. Additionally or alternatively, the CMT ID 111 can include an identifier that a processor can use to determine a type of measurement tool associated with the CMT. As an example, the CMT ID 111 can include a model number, such as the model number "EEWB330A" which represents a hand spin wheel balancer sold by Snap-on Incorporated, Kenosha, Wis.

The CMT version ID 112 can include an identifier that a processor (e.g., the processor 70) can use to determine a hardware, firmware, or software level of the items within a CMT associated with client 100 and/or that provides measurements to the client 100. The client ID 110, the CMT ID 111 or the CMT version ID 112 can be used by the processor 70 when analyzing measurement reports provided by multiple clients so as determine an explanation of variations of measurement data contained within the measurement reports. For instance, the processor 70 can determine that a particular client carried out or received a tool measurement using an obsolete version of software.

The server data 118 can include data the client 100 requests from the server 2 and receives at the transceiver 104 from the server 2. The received data can be referred to as data transmitted to the client from the server and as data downloaded at the client from the server. As an example, the client 100 can request a service procedure for a vehicle identified by a vehicle identifier entered at the client 100. The processor 101 can cause the service procedure to be stored in the server data 118 and displayed on the user interface 103. The processor 101 can determine the service procedure includes a CMT reference and compare the CMT reference to CMT identified in the registration data 116 to determine if a CMT referenced by the service procedure is identified in the registration data 116. The processor 101 can cause the user interface to display the service procedure with an identifier of a registered CMT so that a user can be prompted to use the registered CMT when performing the service procedure.

In general, the CRPI 109 can include program instructions executable by the processor 101 to cause the client 100 to perform any function described herein as being performed by the client 100 or to cause any item of the client 100 to perform any function herein as being performed by that item of the client 100. Some particular examples of the CRPI 109 are provided in the following three paragraphs.

The CRPI 109 can include program instructions to cause the user interface 103 to display a DUI, such as any DUI described in this description. The CRPI 109 can include program instructions to generate a VD report, such as a VD report 160 shown in FIG. 6. The CRPI 109 can include program instructions to generate a request for a VD record or a portion of a VD record, and to display a DUI with the VD record or portion of a VD record downloaded from the server 2 in response to the request. The CRPI 109 can thus allow the client 100 to display the portion of the VD record, which can be a portion that was not generated at the client 100 or a portion that was not generated at the repair shop where the client is located.

The CRPI 109 can include program instructions to cause the processor 101 to compare a measurement received in a VD report (e.g., a tool measurement or measurement data from an ECU) to other measurements or data previously defined as normal measurement data (e.g., specification data). As a result of the comparison, the processor 101 can determine whether the measurement of the VD report is a normal measurement or an abnormal measurement. The processor 101 can make that determination by determining the measurement is outside of a range of measurements or that the measurement differs from the other measurements or previously defined normal measurement data by a threshold amount. Upon determining that the measurement is abnormal, the processor 101 can cause the user interface 103 or the transceiver 104 to output a communication with notice the measurement is abnormal. Outputting that notice can lead to a determination that the measurement tool that captured the tool measurement requires repair. The processor 101 can refer to the CMT ID 111 and the CMT version ID 112 of multiple VD reports with abnormal measurements to look for trends indicating that certain versions of a particular measurement tool require repair.

The CRPI 109 can include program instructions executable to register a CMT such as a CMT. Execution of those program instructions can cause the CRM 102 to store registration data about the CMT in the registration data 116. The registration data 116 can include a CMT identifier for each registered CMT. The registration data 116 can include a CMT version identifier for each registered CMT.

Figure 5:
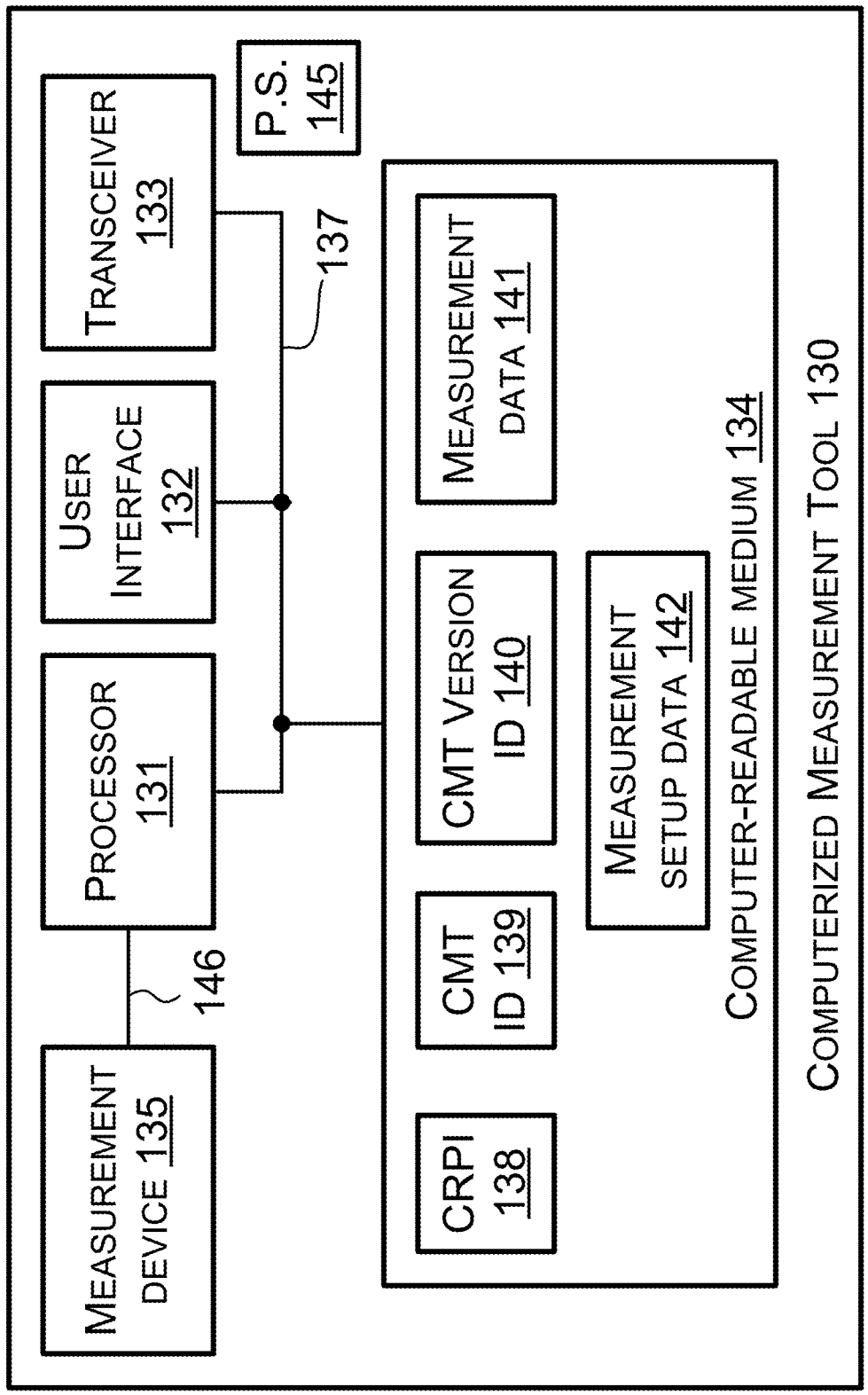
FIG. 5 is a block diagram of an example computerized measurement tool.

Next, FIG. 5 is a block diagram of a computerized measurement tool 130. As shown in FIG. 5, the CMT 130 includes a processor 131, a user interface 132, a transceiver 133, a computer-readable medium 134, and a measurement device 135. Two or more of those items of the CMT 130 can be communicatively coupled and/or linked together via a system bus, network, and/or other connection mechanism 137 and/or 146. Any CMT described in this description can be configured like the CMT 130 and/or include one or more of the items of the CMT 130. As an example, a CMT described in this description can be configured like the CMT 130 (e.g., include the components of the CMT 130). As another example, a CMT described in this description can include the processor 131, the CRM 134, the measurement device 135, and none of or one or more of the user interface 132 and the transceiver 133, as illustrated in Table 4, where "X" indicates the CMT includes that component. Other example arrangements of a CMT based on the components shown in FIG. 5 are also possible. The CMT 130 can include the power source 145.

TABLE 4

| FIG. 5 Ref. | CMT Example No. | | | |
|---|---|---|---|---|
| | 1 | 2 | 3 | 4 |
| 131 | X | X | X | X |
| 134 | X | X | X | X |
| 135 | X | X | X | X |
| 132 | | X | | X |
| 133 | | | X | X |

The processor 131 can include one or more processors. The measurement device 135 can include one or more of processors of the processor 131. The measurement device 135 and the processor 131 can be connected by a connection mechanism 146 (e.g., one or more electrical circuits).

The CRM 134 can include any of the following data: computer-readable program instructions 138, a CMT identifier 139, a CMT version identifier 140, measurement data 141, and/or measurement setup data 142. The CRPI 138 includes program instructions executable by the processor 131. The CRPI 138 can include program instructions that are executable to perform one or more of the following functions: determine a tool measurement from a measurement input, store a tool measurement in the measurement data 141, display a tool measurement on a display of the user interface 132, transmit a tool measurement using the transceiver 133, transmit the CMT ID 139 using the transceiver 133, and transmit the CMT version ID 140 using the transceiver 133. Other examples of functions that can be performed by execution of the CRPI 138 are also possible.

The CMT ID 139 can include data indicating a model number of a CMT or a model name of the CMT. The CMT version ID 140 can include a hardware, firmware, or software level of the CMT 130. Other examples of the CMT ID 139 and the CMT version ID 140 are also possible.

The measurement device 135 can include one or more devices to perform a measurement with respect to a vehicle or a vehicle component. As an example, the measurement device 135 can include any of a variety of devices for making a tool measurement, generating a measurement input to the processor 131, or providing a measurement input to the processor 131. As an example, the measurement device 135 in the CMT can include a thermistor, transducer, a thermocouple, a potentiometer, an accelerometer, or a strain gauge. An electric current can be provided to the measurement device 135 for generating the measurement input provided to the processor 131 via the connection mechanism 146. The processor 131 receives the measurement input to determine the tool measurement. The tool measurements determined by the processor 131 can be stored in the measurement data 141. The measurement data 141 can include data indicating the units (e.g., volts, kilopascals, degrees Celsius, millimeters, etc.) of each tool measurement.

As an example, the CMT 130 or the measurement device 135 can comprise or be configured as a torque wrench that detects an amount of rotational force applied to a vehicle fastener. Examples of tool measurements performed by a torque wrench are shown in Table 1. The measurement setup data 142 can include specified torque requirements or other specifications for a particular vehicle component selected for measurement, as well as for a particular vehicle selection.

As another example, the CMT 130 or the measurement device 135 can comprise or be configured as a measurement caliper. Examples of tool measurements performed by the caliper are shown in Table 1. A variety of calipers can provide the tool measurement, such as an inside caliper, an outside caliper, a Vernier caliper, a dial caliper, a digital caliper, and/or a micrometer caliper. The measurement setup data 142 can include specified distances for a particular vehicle component selected for measurement, as well as for a particular vehicle selection.

As yet another example, the CMT 130 or the measurement device 135 can comprise or be configured as a wheel alignment machine. Example tool measurements performed by the WAM are shown in Table 1. The tool measurements performed by the WAM can be classified with respect to performance of a wheel alignment. For example, the tool measurements performed by a WAM can be classified as a pre-alignment measurement (i.e., an alignment measurement performed before the vehicle is aligned using the WAM), a post-alignment measurement (i.e., a measurement performed after the vehicle is aligned using the WAM), and an intermediate alignment measurement (i.e., a measurement perform as the vehicle is being aligned using the WAM). The measurement setup data 142 can include wheel alignment specifications for a particular vehicle selected for alignment by the CMT 130, as well as for a particular vehicle selection. A tool function performed using the WAM can include determining a wheel alignment geometry value for a vehicle positioned on the WAM.

As yet another example, the CMT 130 or the measurement device 135 can comprise a level, such a level to determine a vehicle lift is level prior to use of a WAM.

As yet another example, the CMT 130 or the measurement device 135 can comprise or be configured as a brake lathe. Examples of tool measurements performed by a brake lathe are shown in Table 1. The tool measurements performed by the brake lathe can be classified with respect to performance of a machining a brake part using the brake lathe. For example, a brake part thickness measurement performed by the brake lathe can be classified as a pre-machining thickness measurement performed prior to the brake lathe being used to machine the brake part, an intermediate brake part thickness measurement performed while the brake lathe is machining the brake part, or a post-machining thickness measurement performed after the brake lathe is used to machine the brake part. The measurement setup data 142 can include specified brake part measurement for a particular brake part selected for measurement, as well as for a particular vehicle selection.

As still yet another example, the CMT 130 or the measurement device 135 can comprise or be configured as a wheel balancer. Examples of tool measurements performed by a wheel balancer are shown in Table 1. A wheel weight position can indicate a wheel position at which a wheel weight is to be installed, such as an inside wheel surface, an outside wheel surface, or a position relative to one or more other wheel weights. A tool measurement performed by a wheel balancer can also indicate a type of weight attached to a wheel, such as a clip style weight or a tape style weight.

As still yet another example, the CMT 130 or the measurement device 135 can comprise or be configured as an exhaust gas analyzer. Examples of tool measurements performed by an exhaust gas analyzer are shown in Table 1. The measurement setup data 142 can include the expected exhaust gas content specified for a particular vehicle.

As still yet another example, the CMT 130 or the measurement device 135 can comprise or be configured as a DVOM. Examples of tool measurements performed by the DVOM are shown in Table 1. The measurement setup data 142 can include the expected electrical measurements for a particular vehicle component, as well as for a particular vehicle selection.

As still yet another example, the CMT 130 or the measurement device 135 can comprise or be configured as gauge or gauge set. The tool measurements performed by the example gauges or the gauge set can represent levels, pressures or temperatures of various fluids (e.g., engine oil, engine coolant, refrigerants, fuel) within a vehicle. The measurement setup data 142 can include the expected levels, pressures, or temperatures of the various fluids specified for a particular vehicle component, as well as for a particular vehicle selection.

III. Example Vehicle Data Reports and Records

FIG. 6 shows an example vehicle data report 160 including measurement data 161. The measurement data 161 can include one or more measurements. The VD report 160 can include a variety of identifiers and other information to associate the measurement data 161 with items represented by those identifiers or aspects associated with that information. A processor, such as the processor 70, that receives the VD report 160 can use the identifiers and information to associate the VD report 160 as part of a particular VD record or for searching for a requested portion of a VD record. Some particular examples of the measurement data 161 are provided in the following paragraph.

The measurement data 161 can include tool measurements, and the tool measurements can include spatial identifiers and measurement units. For example, the measurement data 161 can include post-machining brake rotor thickness measurements for a LF rotor and a RF rotor such as 24.5 millimeters and 24.5 mm, respectively. The measurement data 161 can include tire tread depth measurements for LF, RF, LR, and RR tires such as 9/32 inch, 1/4 inch, 9/32 inch, 5/16 inch, respectively. The measurement data 161 can include a thermostat opening temperature measurement of provided by a CMT used to carry out the measurement(s) are also possible.

The VD report 160 includes a date 162 (e.g., date(s) on which the VD report 160 is generated or when the measurement(s) of measurement data 161 are performed), a location 163 (e.g., location(s) at which the VD report 160 is generated or location(s) at which the measurement(s) of measurement data 161 are performed), a time 164 (e.g., time(s) at which the VD report 160 is generated or time(s) at which the measurement(s) of measurement data 161 are performed), and a usage indicator 165 associated with the vehicle. The usage indicator 165 can indicate at least one of a distance the vehicle has been driven (e.g., miles or kilometers) and an amount of time (e.g., hours) the vehicle has been driven.

The VD report 160 includes a report identifier 166 (e.g., a report ID to distinguish the VD report 160 from all other reports of the VD records 75). The report ID 166 can be added to the VD report 160 by the processor 70 after the server 2 receives the VD report 160. The report ID 166 can include alpha-numeric characters. The report ID 166 can represent or indicate information of the VD report 160, such as the date 162, location 163, or time 164.

The VD report 160 includes a measurement tool ID 167 associated with a CMT that carried out the tool measurement(s) of the measurement data 161. The CMT ID 167 can include data the processor 70 can use to determine at least one of the type of CMT used to perform a measurement and a particular CMT. The CMT ID 167 can include a model number of a particular type of CMT, a serial number of a particular CMT, a name of a particular type of CMT (e.g., a brake lathe or an alignment machine). The CMT ID 167 provides a way for the processor 70 to determine what type of CMT performed a measurement. The CMT ID 167 can be configured like or match the CMT ID 111 stored in the CRM 102 of the client 100. The CMT ID 167 can be configured like or match the CMT ID 139 stored in the CRM 134 of the CMT 130.

The VD report 160 includes a measurement tool version ID 168 associated with a CMT that carried out the tool measurement(s) of measurement data 161. The CMT version ID 168 can include data that represents a hardware, firmware, or software level of a CMT. The CMT version ID 168 provides a way for the processor 70 to determine what version of a CMT performed a measurement. The processor 70 can use the CMT version ID 168 of multiple measurement reports to determine that particular versions of a CMT are operating correctly or incorrectly. The CMT version ID 168 can be configured like or match CMT version ID 112 stored in the CRM 102 of the client 100. The CMT version ID 168 can be configured like or match the CMT version ID 140 stored in the CRM 134 of the CMT 130. For embodiments in which measurement data is manually entered into the client 100, a VD report including that measurement data may not include a measurement tool ID and a CMT version ID.

The VD report 160 includes a vehicle ID 169, a vehicle owner ID 170, a repair shop ID 171, and a technician ID 172. Each of those ID can include data that uniquely indicates a particular vehicle, a particular vehicle owner, a particular repair shop, and a particular repair technician, respectively. A vehicle ID, such a vehicle ID 169, can include a vehicle identification number (VIN) associated with a vehicle that was measured to obtain the measurement data 161. Some VIN can include seventeen alpha-numeric characters. The vehicle ID 169 can include only a portion of a VIN associated with the vehicle. The vehicle owner ID 170 can include a name of a vehicle owner, such as the name of VO1. The repair shop ID 171 can include a name of the repair shop at which or through which the measurements of the measurement data 161 were performed. The technician ID can include a name of the repair technician that performed the measurements of measurement data 161. One or more of the vehicle owner ID 170, the repair shop ID 171, and the technician ID 172 can include an alpha numeric identifier (e.g., a post office mailing address).

The VD report 160 includes a measured component ID 173 that represents a vehicle component that was measured to obtain the measurements of measurement data 161. The measured component ID 173 can include a vehicle component name (e.g., brake rotor, engine coolant thermostat, tire, or oxygen sensor). The measurement component ID 173 can include a spatial identifier of a vehicle component and the vehicle component name (e.g., a left front brake rotor or right front wheel).

The VD report 160 includes a complaint/symptom ID 174 and a repair order (RO) ID 175. The complaint/symptom ID 174 can include data that represents one or more complaints or symptoms associated with a vehicle being measured. For example, the complaint/system can indicate "vehicle pulls right when braking" and the measurements of the measurement data can include one or more of a brake rotor thickness measurement and a wheel alignment measurement. The RO ID 175 can include data (e.g., an RO number) that represents a unique RO prepared by a repair shop at which the vehicle was measured. The processor 70 can locate the VD report 160 by searching the VD reports based on the complaint/symptom or the RO number. Other VD report can include none or one or more of a complaint/symptom ID and a repair order ID.

The VD records 75 can include repair orders referenced by the RO ID 175. The RO referenced by an RO ID is associated with the VD report including the RO ID. The client 100 displaying the VD report 160 can display the RO associated with the RO ID 175 after receiving the RO from the server 2.

The VD report 160 includes a client (CCS) ID 176. The client ID 176 can include an ID associated with a client that generated or transmitted the VD report 160. The client ID 176 can be configured like the client ID 110 stored in the CRM 102 of the client 100.

FIG. 6 shows a password 177, an image 178, and a video 179. One or more of those items can be included within the VD report 160 and transmitted to and received by the server 2. One or more of those items can be separate from the VD report 160 and transmitted and received by the server 2 separately from the VD report 160. The processor 70 can use the password to determine the VD report 160 should be stored as part of a particular VD record. One or more of the image 178 and the video 179 can be captured by the client 100 or a measurement tool when performing the measurements of the measurement data 161. One or more of the image 178 and the video 179 can be requested by a client and provided to the client from the server 2 in response to the request for a portion of a VD record.

The VD report includes VDM 180. The VDM 180 can include data values of the VDM received at the DLC interface 105 from a vehicle on which the tool measurements of the measurement data 161 were performed. The data values can be from VDM from any of the ECU within the vehicle.

A person having ordinary skill in the will understand that the data shown in the vehicle data report 160 is only an example. In accordance with the example embodiments, some vehicle data reports can include only a subset of the data items shown in FIG. 6 or can include other data items not shown in FIG. 6.

Figure 7:
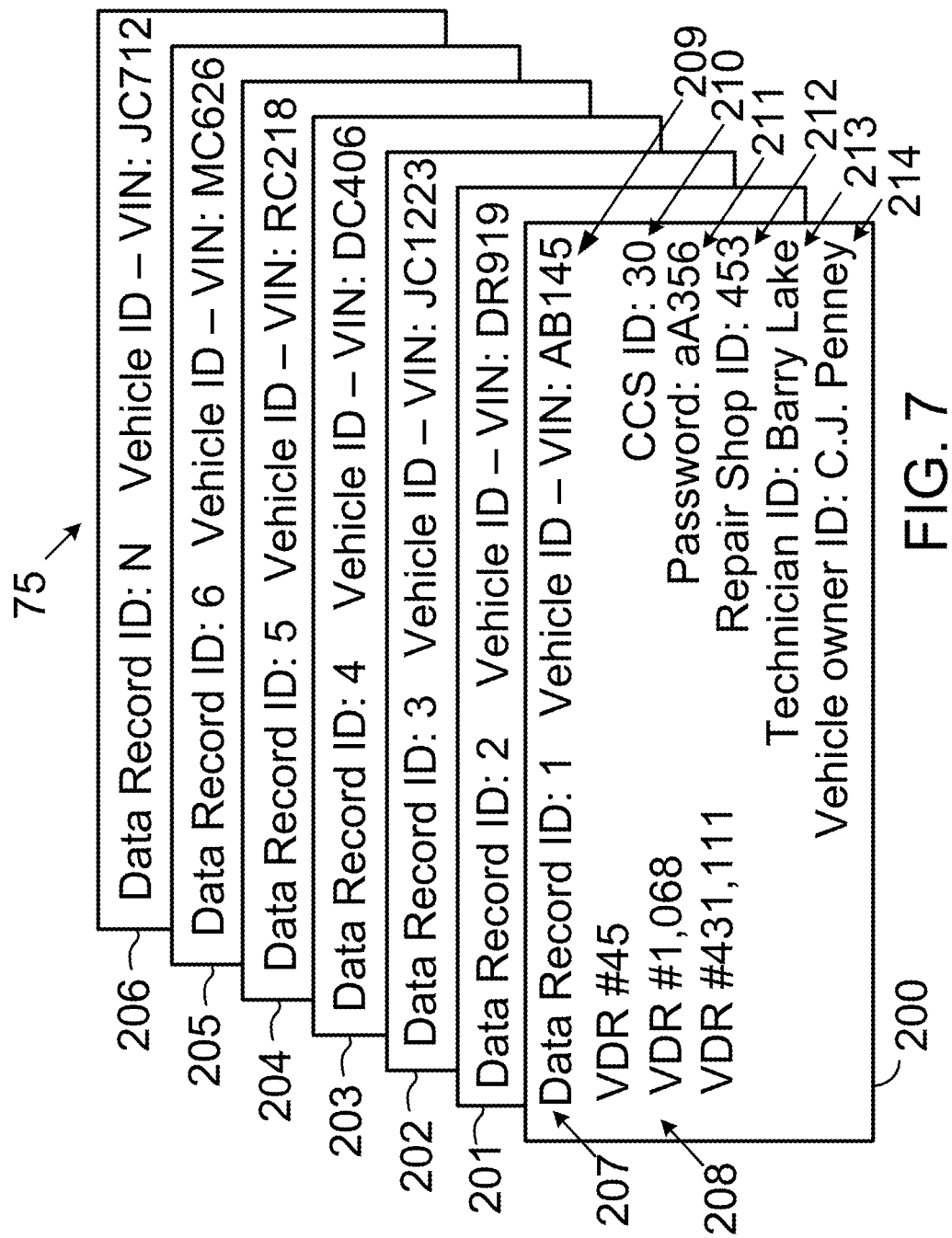
FIG. 7 shows example details of a vehicle data record.

Next, FIG. 7 shows example details of the VD records 75 stored in the server 2. The VD records 75 can include N VD records, where N is greater than or equal to one. As an example, the VD records 75 can include VD records 200, 201, 202, 203, 204, 205, and 206. Each VD record can include a vehicle ID. In addition to or as an alternative to the vehicle ID, a VD record can include a vehicle owner ID. A VD record can be generated for a vehicle or a vehicle owner before any VD report is generated for that vehicle or vehicle owner. Each VD record can include a VD record ID 207, which can include one or more of the vehicle ID, the vehicle owner ID, and some other identifier (e.g., a distinct numeric identifier assigned by the processor 70 from among a set of number identifiers, such as a list of consecutive numbers).

The VD record 200 includes a VD record ID 207, data reports 208 numbered "45," "1,068," and "431,111," a vehicle ID 209, a client ID 210, a password 211, a repair shop ID 212, a technician ID 213, and a vehicle owner ID 214. The vehicle ID 209 can comprise at least a portion of a VIN. The repair shop ID 212 can represent multiple affiliated repair shops. Each of the VD reports identified in a VD record can include any of the data items shown in the example VD report 160 in FIG. 6.

The processor 70 can search the VD records 75 based on the content of the VD records including the content of any VD report stored within the VD records 75. The processor 70 can require a user of a client to provide a VD record password 211 before providing that client with any portion of the requested VD record.

IV. Example Operation

Figure 8:
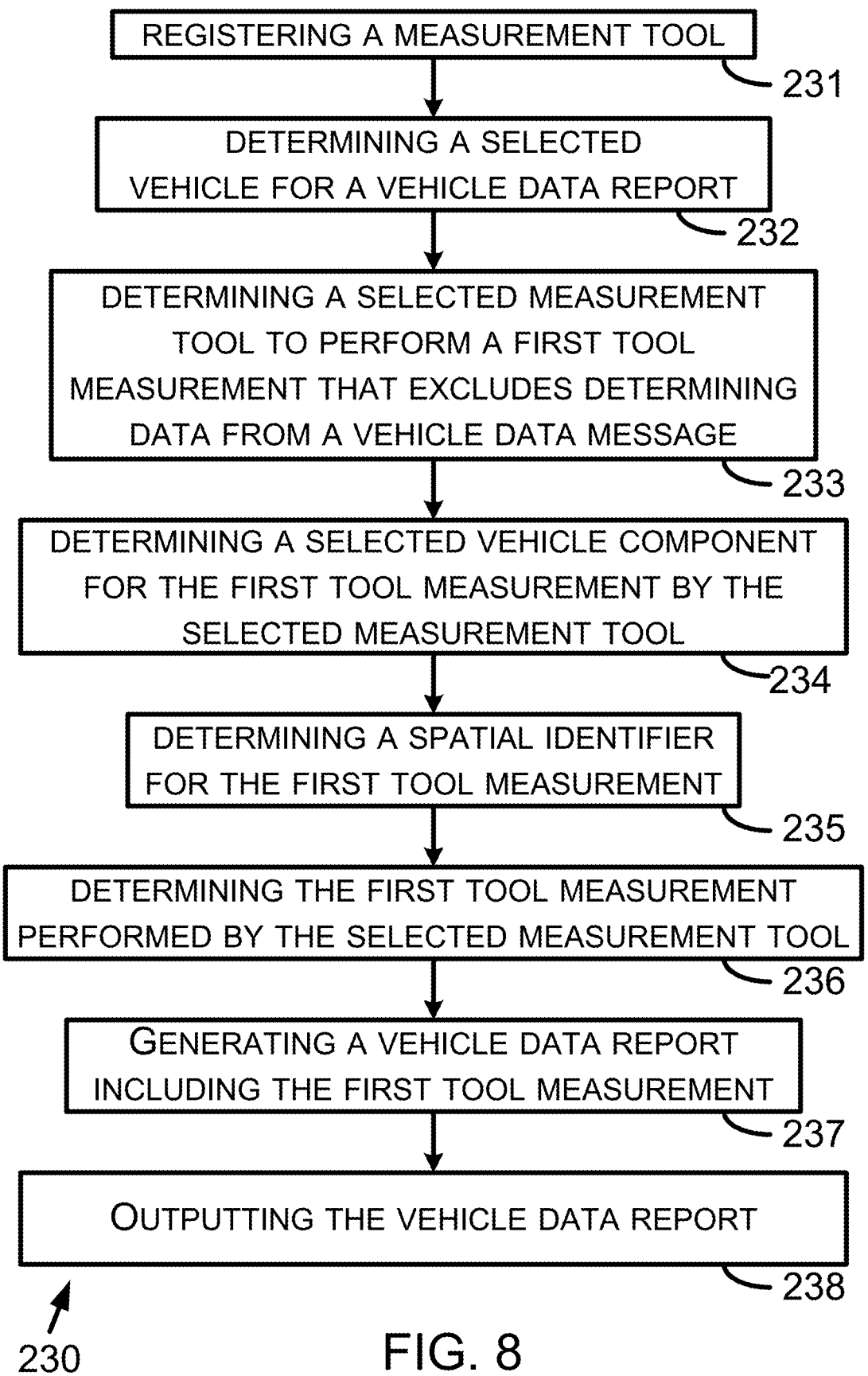
FIG. 8 is a flowchart depicting a set of functions that can be carried out in accordance with the example embodiments.

Next, FIG. 8 shows a flowchart depicting a set of functions 230 (or more simply "the set 230") that can be carried out in accordance with the example embodiments described in this description. The set 230 includes the functions shown in blocks labeled with whole numbers 231 through 238 inclusive. The following description of the set 230 includes references to elements shown in other figures described in this description, but the functions of the set 230 are not limited to being carried out only by the referenced elements. A variety of methods can be performed using all of the functions shown in the set 230 or any proper subset of the functions shown in the set 230. Any of those methods can be performed with other functions such as one or more of the other functions described in this description. For instance, a method including a function of the set 230 can include one or more functions of the sets 240, 250, and 260. One or more of the functions shown in the set 230 can be carried out multiple times in performing a method in accordance with the example embodiments.

Block 231 includes registering a measurement tool (e.g., CMT 130). The measurement tool can be registered at one or more of the server 2 and the client 100. Registering the measurement tool at the server 2 and the client 100 can include storing registration data in the registration data 81 and 116, respectively. The registration data can include data that indicates each type of one or more types of measurements that can be carried out using the CMT 130. Examples of the types of measurements are shown in Table 1. Registering the CMT 130 at the client 100 can be one way in which the processor 101 provides a recommendation to use the CMT 130 at appropriate times (e.g., while the user interface 103 is displaying a service procedure in which the CMT 130 can be used to make a tool measurement applicable to the service procedure).

At the client 100, the processor 101 can execute the CRPT 109 to register a CMT. The capture device 107 can capture a CMT identifier or an image of the CMT to be registered. The processor 101 can receive the captured CMT identifier or image and refer to a list of CMT that can be registered to determine additional registration data (e.g., types of measurement(s)) pertaining to the CMT to be registered based on the captured CMT identifier or image. As an example, the list of CMT can be stored within the CRM 102 (e.g., the registration data 116) or the CRM 71 (e.g., the registration data 81). The user interface 103 can display the list of CMT or a portion of the list of CMT to allow selection of registration data (e.g., a name of the CMT or a model number of the CMT) pertaining to the CMT to be registered. Data identifying the CMT registered at the client 100 can be stored at the registration data 116.

The client 100 can register multiple CMT. The registration data stored for each CMT within the registration data 116 can include a CMT identifier and CMT version identifier. The registration data 116 can include a repair technician identifier associated with one or more of the CMT registered with the client 100. The client 100 may require a repair technician to perform a log-in step so that the client 100 can determine which CMT and/or types of measurements are available to the repair technician that has performed the log-in step and is using the client 100.

At the server 2, the processor 70 can execute the CRPI 77 to register a CMT. The transceiver 73 can receive a CMT identifier associated with the CMT to be registered and data associated with the CMT to be registered and cause that data to be stored in the registration data 81. The data associated with the CMT to be registered can include at least one of a repair shop identifier that indicates a repair shop that owns the CMT, a repair technician identifier of a repair technician authorized to use the CMT, and the client ID 110 identifying the client associated with the repair shop or the authorized repair technician. The data associated with the CMT to be registered can include a CMT version identifier.

Each CMT can be registered with a single client or with multiple clients. For example, the repair shop 4 can own the CMT 20, and one or two or more of the clients 17, 18, and 19 can register the CMT 20. The registration data 81 at the server 2 can include registration data indicating each client at which the CMT is registered. The server 2 can use the registration data 81 to determine whether a client device requesting part of a vehicle data record is authorized to access the requested part of the vehicle data record.

Next, block 232 includes determining a selected vehicle (or more simply a "vehicle selection") for a vehicle data report. One or more items of the client 100 can determine the vehicle selection. An item that determines the vehicle selection can determine the vehicle selection by receiving data that indicates the vehicle selection and subsequently provide the data indicating the vehicle selection to other item(s) of the client 100 via the connection mechanism 108. As an example, the capture device 107 can determine the vehicle selection by capturing an image of the VIN or scanning the VIN of the vehicle to be selected. As another example, the capture device 107 can determine the vehicle selection by capturing an image of a license plate of the vehicle to be selected.

As yet another example, the user interface 103 can determine the vehicle selection by displaying a DUI from which characteristics of a vehicle can be selected. In one case, the DUI can include fields to enter a YMME of the vehicle to be selected. The fields to enter the YMME can include pick lists from which the year, make, model and engine can be selected. In another case, the DUI can include fields to enter a YMM of the vehicle to be selected. The fields to enter the YMM can include pick lists from which the year, make, and model can be selected. In one, both or none of those cases, an identifier of the vehicle owner or some portion of the VIN or a vehicle license plate number can be received as part of the vehicle selection to distinguish between vehicles having the same YMM or YMME characteristics.

Figure 14:
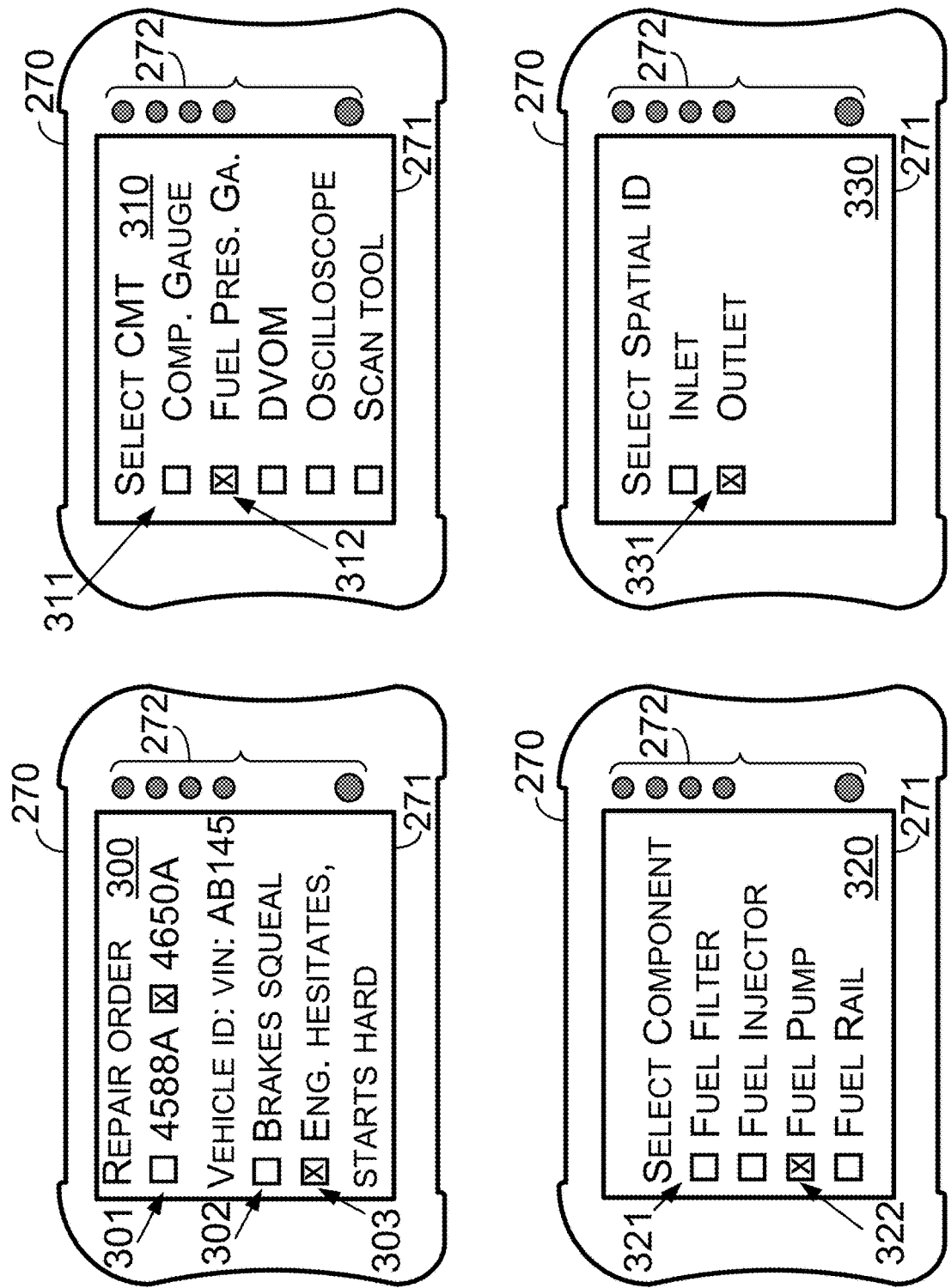
FIG. 14 shows example display user interfaces.

As yet another example, the user interface 103 can determine the vehicle selection as a result of selecting a repair order regarding the vehicle (see, DUI 300 in FIG. 14). In that case, the processor 101 can determine the vehicle selection from vehicle identification information on the RO. As yet another example, the user interface 103 can determine the vehicle selection as a result of receiving a selection of a vehicle owner associated with the selected vehicle. The vehicle selection can be implicit if the vehicle owner is associated with a single vehicle or can require selection of a particular vehicle from a list of multiple vehicles associated with the vehicle owner.

Next, block 233 includes determining a selected measurement tool (or more simply a "CMT selection") to perform a first tool measurement that excludes determining data from a vehicle data message. Determining the CMT selection can include receiving CMT selection data that can be used to determine the CMT selection from data stored in the CRM 102 (e.g., the registration data 116) or in the CRM 71 (e.g., the registration data 81). One or more items of the client 100 can determine the CMT selection or the CMT selection data. An item of the client 100 that determines the CMT selection or the CMT selection data can subsequently provide the CMT selection or the CMT selection data to other item(s) of the client 100 via the connection mechanism 108. The CMT selection data can indicate any example measurement tool described in this description or another CMT configured for operation with the example embodiments.

As an example, the capture device 107 can capture an image of the CMT or can scan a multi-dimension code on or associated with the CMT. The processor 101 can receive the captured image or scanned code from the capture device 107 and compare the captured image or scanned code to the registration data 116 in order to determine the CMT selection by comparing the captured image or scanned code to the registration data 116 in order to determine a registered image or code of a CMT that matches the captured image or scanned code, respectively. Additionally or alternatively, the transceiver 104 can transmit the captured image or scanned code to the server 2 so that the processor 70 can compare the captured image or scanned code to images or codes stored in the registration data 81 in order to determine a CMT. The transceiver 73 can transmit a communication to the client 100 indicating the CMT selection based on that comparison carried out at the server 2.

As another example, the transceiver 104 can receive a communication from the transceiver 133 of the CMT 130 including data indicating the CMT selection is the CMT 130. In this case, the communication can be sent in response to the CMT 130 being switched from an off-state to an on-state, an input being entered at the user interface 132 indicating the CMT 130 has been selected for use, or for some other reason. As yet another example, the user interface 103 can display a DUI 310 (shown in FIG. 14) in which one or more CMT are listed for selection. The processor 101 can generate the DUI 310 based on CMT identified in the registration data 116 or on a list of CMT associated with the client 100, where the list of CMT is provided from the server 2. The processor 101 can output to the user interface 103 (e.g., a display) a list of measurement tool identifiers associated with measurement tools that are registered with the client 100. The processor 101 can determine the CMT selection from data that indicates the CMT that was selected from the displayed list of CMT.

As still yet another example, determining a CMT selection can occur while the user interface 103 is displaying a service procedure, such as a diagnostic procedure in which a particular tool measurement (e.g., a fuel pressure measurement) is to be made. At or before a time the diagnostic procedure is displayed on the user interface 103, the processor 101 can refer to the registration data 116 to determine whether a compatible CMT (e.g., a fuel pressure gauge) with the service procedure is registered. If a compatible CMT is registered for the client 100, the processor 101 can cause the service procedure to be displayed with reference to the compatible CMT.

The processor 101 can output a service procedure indicating at least one measurement tool for performing the service procedure. The user interface 103 can display the service procedure. Determining the CMT selection can include receiving an indication the CMT was selected from the displayed service procedure, receiving a selection of the service procedure that causes the processor to output the service procedure, or determining a particular step in the service procedure requiring use of the CMT is being performed. Determining the CMT selection can be based on the use status of a registered CMT. As an example, a CMT currently in use may not be included as a selectable CMT whereas a CMT currently not in use can be included as a selectable CMT.

At a time, a particular step of the service procedure requiring the compatible CMT is being performed, the processor 101 can receive a tool measurement via the transceiver 104. Other examples of the service procedure include performing a wheel alignment on a vehicle, repairing a vehicle brake system, rebuilding an engine within the vehicle, and tightening a fastener on the vehicle.

Next, block 234 includes determining a selected vehicle component (or more simply a "component selection") for a tool measurement by the selected measurement tool. Determining the component selection can include receiving component selection data that can be used to determine the component selection from data stored in the CRM 102 (e.g., the measurement setup data 117) or in the CRM 71 (e.g., the measurement setup data 78). One or more items of the client 100 can receive the component selection or the component selection data. An item of the client 100 that receives the component selection or the component selection data can subsequently provide the component selection or the component selection data to other item(s) of the client 100 via the connection mechanism 108. The transceiver 104 can transmit the component selection or the component selection data to the transceiver 73 of the server 2, which can subsequently provide the component selection or the component selection data to one or more items of the server 2 via the connection mechanism 74.

As an example, the capture device 107 can determine the component selection by capturing an image of a vehicle component or by scanning a multi-dimensional code on or associated with a vehicle component. The processor 101 can compare the captured image or scanned code to the measurement setup data 117 in order to determine the component selection by comparing the captured image or scanned code to the measurement setup data 117 in order to determine a registered image or code of a vehicle component that matches the captured image or scanned code, respectively. Additionally or alternatively, the transceiver 104 can transmit the captured image or scanned code to the server 2 so that the processor 70 can compare the captured image or scanned code to images or codes stored in the measurement setup data 78 in order to determine a vehicle component. The transceiver 73 can transmit a communication to the client 100 indicating the component selection based on that comparison carried out at the server 2.

As another example, the user interface 103 can determine the component selection by displaying a DUI (e.g., the DUI 320 shown in FIG. 14) with a list of one or more selectable vehicle components, and a user-input element making a selection of a component from the displayed list. As still yet another example, the processor 101 can receive a component selection by determining a current step of a service procedure pertaining to the vehicle component that is being displayed at the user interface 103 or is about to be displayed at the user interface 103.

The selected vehicle component can be any of a variety of vehicle components on a vehicle. As an example, the selected vehicle component can include a brake rotor, a brake drum, a crankshaft, a camshaft, or a fuel pump. As another example, the vehicle component can comprise any of a variety of vehicle subsystems, such as a vehicle steering system, a vehicle fuel system, a vehicle emissions system, or a vehicle braking system. Other examples of the selected vehicle component are also possible.

Next, block 235 includes determining a spatial identifier (or more simply a "spatial ID selection") for the first tool measurement. Determining the spatial ID selection can include receiving spatial ID selection data that can be used to determine the spatial ID selection from data stored in the CRM 102 (e.g., the measurement setup data 117) or in the CRM 71 (e.g., the measurement setup data 78). One or more items of the client 100 can determine the spatial ID selection or the spatial ID selection data. An item of the client 100 that determines the spatial 1D selection or receives the spatial ID selection data can subsequently provide the spatial ID selection or the spatial ID selection data to other item(s) of the client 100 via the connection mechanism 108. The transceiver 104 can transmit the spatial ID selection or the spatial ID selection data to the transceiver 73 of the server 2, which can subsequently provide the spatial ID selection or the spatial ID selection data to one or more items of the server 2 via the connection mechanism 74. The transceiver 104 can receive the spatial ID selection from the server 2 after the server 2 determines the spatial ID selection based on the spatial ID selection data the server 2 receives from the client 100.

As another example, the user interface 103 can determine the spatial ID selection by displaying a DUI (e.g., the DUI 330 shown in FIG. 14) with a list of one or more selectable spatial identifiers, and a user-input element making a selection of a spatial identifier from the displayed list. As still yet another example, the processor 101 can determine a spatial ID selection by determining a current step of a service procedure that is being displayed at the user interface 103 or is about to be displayed at the user interface 103. The spatial ID selection can be associated with one or more of the selected vehicle, measurement tool, vehicle component, and vehicle system. The spatial ID selection can indicate one of the example spatial references or identifier discussed throughout the specification or another spatial identifier.

Next, block 236 includes determining the first tool measurement performed by the selected measurement tool. Determining the tool measurement can include receiving a measurement signal such an electrical signal or an optical signal that can be used to determine the tool measurement. One or more items of the client 100 can receive the tool measurement or the measurement signal. An item of the client 100 that determines the tool measurement or receives the measurement signal can subsequently provide the tool measurement or the measurement signal to other item(s) of the client 100 via the connection mechanism 108.

In one respect, determining the tool measurement can include the transceiver 104 of the client 100 receiving the tool measurement from the transceiver 133 of the CMT 130. In another respect, determining the tool measurement can include the processor 101 receiving the tool measurement or the measurement signal from the CMT 106 that is part of the client 100. In yet another respect, determining the tool measurement can include the transceiver 104 of the client 100 receiving the measurement signal from the transceiver 133 of the CMT 130. In this respect, the transceiver 104 can include or be connected to a converter (e.g., an analog-to-digital converter) to convert the measurement signal into a modified measurement signal or the tool measurement. The processor 101 can convert the modified measurement signal into the tool measurement.

In still yet another respect, determining the tool measurement can include the transceiver 73 of the server 2 receiving the tool measurement from the transceiver 104 of the client 100. The transceiver 73 can subsequently provide the tool measurement to one or more items of the server 2 via the connection mechanism 74. The processor 70 can cause the tool measurement to be stored as part of a VD report.

The tool measurement received or determined from the measurement signal can include a value of the tool measurement. That tool measurement can include data indicating one or more of units of the tool measurement (e.g., a distance, diameter, thickness, pressure, or voltage) and a temporal value associated with the tool measurement. As an example, the temporal value can indicate a date the tool measurement was made or received or a time the tool measurement was made or received. The tool measurement can include one or more data values.

Next, block 237 includes generating a vehicle data report including the first tool measurement. The processor 101 can execute the CRPI 109 to generate the VD report. As an example, the VD report can include the first tool measurement received at the bock 236 and information indicating the vehicle selection, the CMT selection (e.g., a CMT identifier and a CMT version identifier), the component selection, and the spatial ID selection received at blocks 232, 233, 234, and 235, respectively. As another example, the VD report can include all of the data items of the VD report 160 shown in FIG. 6 or any proper subset of the data items of the VD report 160. As yet another example, the VD report can include a temporal value associated with the tool measurement. After generation of the VD report, the VD report can be stored in the VD reports 119. After generation of the VD report, the user interface 103 can display some or all of the VD report. After generation of the VD report, the transceiver 104 can transmit the VD report to the server 2 for inclusion within a VD record. The user interface 103 can display a message prompting a user to authorize transmission of the VD report to the server 2.

Next, block 238 includes outputting the vehicle data report. The processor 101 can execute the CRPI 109 to output the VD report. As an example, outputting the VD report can include providing the VD report to the transceiver 104 and transmitting the VD report to the server 2. As another example, outputting the VD report can include providing the VD report to the user interface 103 for displaying on a display. As yet another example, outputting the VD report can include providing the VD report to the CRM 102 for storage within the VD reports 119. The VD report can include the vehicle selection such that outputting the VD report also includes outputting the vehicle selection.

Figure 9:
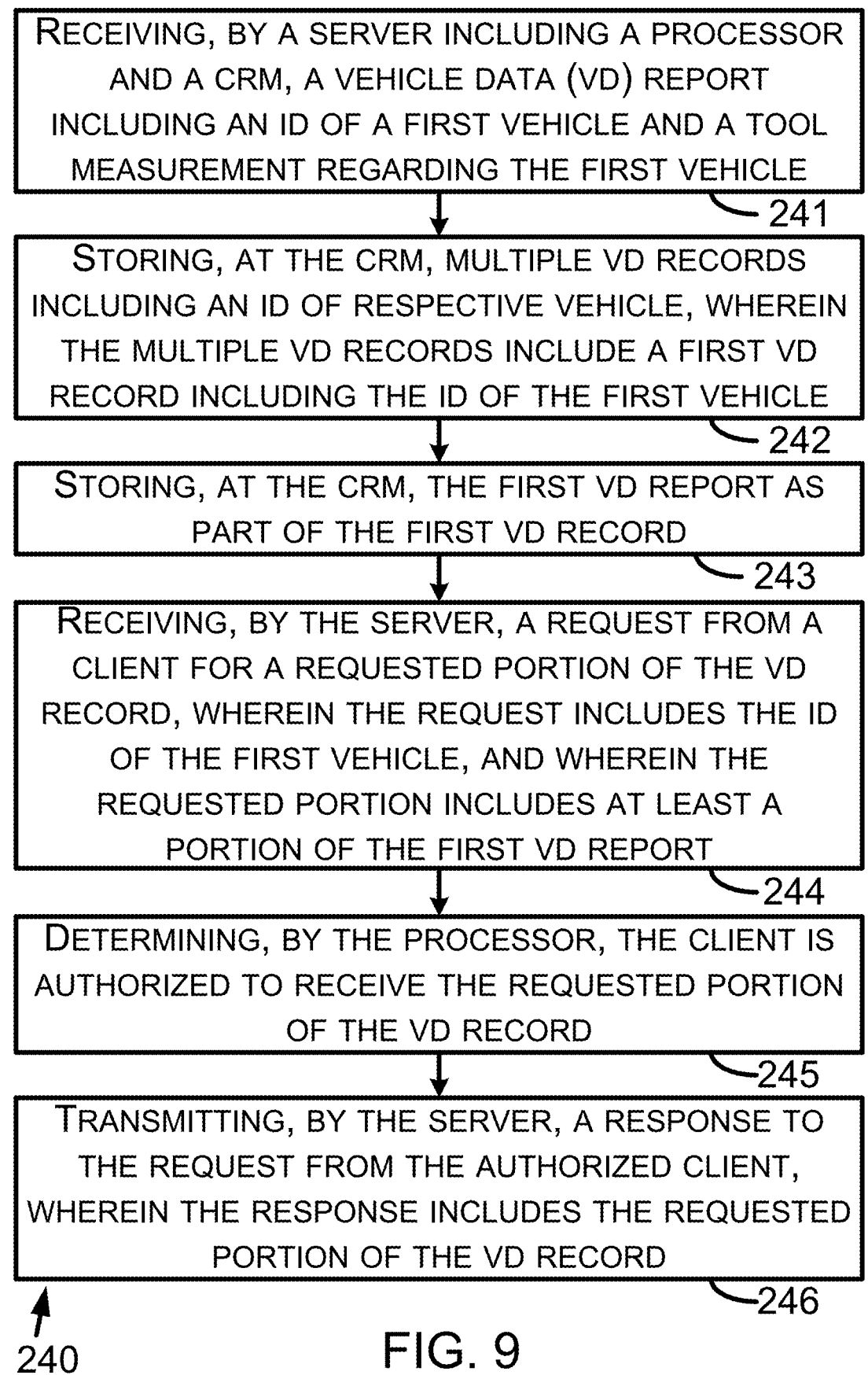
FIG. 9 is a flowchart depicting a set of functions that can be carried out in accordance with the example embodiments.

Next, FIG. 9 shows a flowchart depicting a set of functions 240 (or more simply "the set 240") that can be carried out in accordance with the example embodiments described in this description. The set 240 includes the functions shown in blocks labeled with whole numbers 241 through 246 inclusive. The following description of the set 240 includes references to elements shown in other figures described in this description, but the functions of the set 240 are not limited to being carried out only by the referenced elements. A variety of methods can be performed using all of the functions shown in the set 240 or any proper subset of the functions shown in the set 240. Any of those methods can be performed with other functions such as one or more of the other functions described in this description. For instance, a method including a function of the set 240 can include one or more functions of the sets 230, 250, and 260. One or more of the functions shown in the set 240 can be carried out multiple times in performing a method in accordance with the example embodiments.

Block 241 includes receiving, by a server (e.g., the server 2) including a processor and a CRM, a VD report including an identifier of a first vehicle and a tool measurement regarding the first vehicle (e.g., the vehicle 14). The tool measurement regarding the vehicle 14 can comprise a tool measurement regarding a vehicle component of the vehicle 14. One or more items of the server 2 can receive the VD report. An item of the server 2 that receives the VD report can subsequently provide the VD report to other item(s) of the server 2 via the connection mechanism 74.

The VD report can include the VD report that is discussed with respect to the function of block 237. In that regard, the VD report can include all of the data items of the VD report 160 shown in FIG. 6 or any proper subset of the data items of the VD report 160. The VD report received by the server 2 can include a VD report transmitted to the server 2 over the communication network 6 from a client (e.g., the client 11) or from a CMT. The CMT can transmit the VD report to the client using a CMT-to-client network, and then the client can transmit the VD report over the communication network 6 to the server 2. Alternatively, the CMT using the transceiver 133 can transmit the VD report to the server over the communication network 6.

The tool measurement of the VD report can include a tool measurement carried out by the CMT 130. In other words, the tool measurement can be carried out by any of a variety of measurement tools, such as a brake lathe, a torque wrench, a WAM, a measurement caliper, a wheel balancer, or any other measurement tool configured to perform and provide a tool measurement to a client or the server 2. The VD report can include a tool measurement indicator indicating the type of tool measurement being reported. The processor 70 can refer to the data dictionary 80 to determine the tool measurement contained within the VD report. An $n^{th}$ data byte in the VD report can include the tool measurement indicator. Table 5 shows an example of data that can be included within the data dictionary 80.

TABLE 5

| Tool measurement byte (binary value) | Tool measurement |
|---|---|
| 000 | Brake rotor thickness |
| 001 | Brake drum diameter |
| 010 | Tire pressure |

TABLE 5-continued

| Tool measurement byte (binary value) | Tool measurement |
| --- | --- |
| 011 | Wheel camber |
| 100 | Wheel caster |
| 101 | Wheel scrub radius |
| 110 | Wheel weight size |
| 111 | Wheel weight location |

The tool measurement of the VD report can include a tool measurement performed by a CMT that communicatively couples to the transceiver 104 or a CMT 106 included within the client 100. The tool measurement of the VD report can include a tool measurement manually entered into the client 100 via the user interface 103. The registration data 81 and 116 can include data identifying the types of measurements in a similar manner as the data dictionary or in a different manner.

The tool measurement of the VD report can include a tool measurement identified in a service procedure displayable at the client 100. The transceiver 73 of the server 2 can transmit the service procedure to the client 100. The client 100 can display the service procedure, such as a service procedure that pertains the first vehicle and includes a procedural step requiring use of the selected measurement tool or another measurement tool configure for performing the tool measurement.

Next, block 242 includes storing, at the computer-readable medium (e.g., the CRM 71) multiple vehicle data records including an identifier of a respective vehicle. The multiple vehicle data records include a first VD records including the identifier of the first vehicle. As an example, the multiple VD records can be configured like the VD records 75 or as VD records including any aspect of the VD records 75. In this regard, the multiple VD records can include a VD record with one or multiple vehicle data reports.

Next, block 243 includes storing, at the computer-readable medium (e.g., the CRM 71), the first VD report as part of the first VD record. The first VD record can include an identifier associated with the first vehicle. The identifier associated with the first vehicle can include at least one of an identifier of the first vehicle and an identifier of the owner of the first vehicle from which a vehicle identifier can be determined. The identifier associated with the first vehicle can be configured as metadata associated with VD record.

The processor 70 can execute the CRPI 77 to determine whether a VD record has been established for the vehicle 14 by determining whether VD records 75 includes a VD record for the vehicle 14. The VD record for the vehicle 14 can comprise a VD recording that includes an identifier of the vehicle 14 or that is otherwise associated with the vehicle 14. If the processor 70 cannot locate a VD record for the vehicle 14, the processor 70 can generate a VD record for the vehicle 14 within the VD records 75. After generating the VD record for the vehicle 14 or if the processor 70 determines the VD records 75 includes the VD record for the vehicle 14, the processor 70 can cause the VD report (received at block 241) to be stored within the VD record for the vehicle 14. The VD record for the vehicle 14 can be generated in response to the server 2 receiving the request to generate a VD record 403 (shown in FIG. 15).

Storing the first VD report can include storing the first VD report (e.g., the VD report 160) within the VD records 75. More particularly, storing the first VD report can include storing the first VD report within any one of the VD records 200, 201, 202, 203, 204, 205, and 206. The first VD record in which the first VD report is stored can include any of the elements of the VD records 75, such as a vehicle ID of the vehicle which was measured to obtain the tool measurement of the first VD report.

Since the first VD record includes multiple VD reports, the computer-readable medium 71 can store a second VD report as part of the first VD record. The server 2 can receive the second VD report that includes measurement data regarding the first vehicle. The second VD report can include measurement data determined from a vehicle data message transmitted by an electronic control unit within the first vehicle. The requested portion of the first vehicle data record can include at least a portion of the second VD report.

Next, block 244 includes receiving, by the server 2, a request from the client 100 for a portion of the VD record. The request can be referred to as a "data report request." The portion of the VD record can be referred to as the "requested portion of the VD record." One or more items of the server 2 can receive the data report request. An item of the server 2 that receives the data report request can subsequently provide the data report request to other item(s) of the server 2 via the connection mechanism 74. The transceiver 73 can be the first item of the server 2 to receive the data report request. Communications 405, 407, and 409 represent transmission of data report requests from a client to a server. The request received by the server 2 for block 244 can occur in response to the client transmitting request as discussed with respect to block 253 of FIG. 10.

The data report request can include data that the processor 70 can use to determine which vehicle data record is associated with the requested portion of the vehicle data record. As an example, that data the processor 70 can use to determine the VD record can include one or more of a VD record ID, such as the VD record ID 207, a vehicle ID, such as the vehicle ID 209, a repair shop ID, such as the repair shop ID 212, a technician ID, such as the technician ID 213, and vehicle owner ID, such as the vehicle owner ID 214. The data report request can include a password, such as the password 211.

The requested portion of the VD record can include portions of one or more different vehicle data reports from a VD record. As an example, the requested portion of the VD record can include at least a portion of the VD report received by the server 2 as part of performing the function of block 241. As another example, the requested portion of the VD record can include at least a portion of the "VDR #45" and at least a portion of the "VDR #431,111" of the VD record shown in FIG. 7.

The requested portion of the VD record can include portions of one or more different vehicle data reports from multiple VD records. As an example, the requested portion of the VD record can include a portion of a VD report from the VD record 200 and a portion of a VD report from the VD record 204. In such a case, request for the portion of the VD record can include data to identify each of the multiple VD records as well as data to identify the portion of each VD report within the multiple VD records that is requested.

Next, block 245 includes determining, by the processor, the client 100 is authorized to receive the requested portion of the VD record. The processor 70 can execute the CRPI 77 to make that determination. Execution the CRPI 77 to make that determination can include the processor 70 comparing the password received as part of the request for the portion of the VD record to a password associated with the VD record stored in the authorization data 76. Additionally or alternatively, execution the CRPI 77 to make that determination can include the processor 70 determining that the registration data 81 includes a second identifier. The second identifier can identify at least one of the client 100, a repair shop, and a repair technician. The processor 70 determining the passwords match or that the registration data includes an identifier of the client 100 can be sufficient to determine the client is authorized the requested portion of the VD record. Other ways to determine the client is so authorized are also possible.

Next, block 246 includes transmitting, by the server 2, a response to the request from the authorized client, wherein the response includes the requested portion of the VD record. Transmitting the response can be performed by the transceiver 73. Transmission of the response can occur over the communication network 6. Communications 406 and 410 represent transmission of responses to a data report request from a server to a client. The request received by the server 2 for block 244 can occur in response to the client transmitting request as discussed with respect to block 252 of FIG. 10.

The processor 70 can compare the tool measurement of the first vehicle data report to a threshold measurement to determine a tool measurement conclusion message. The tool measurement conclusion message can be included in or accompany the requested portion of the VD record. As an example, a tool measurement including a brake rotor thickness or a brake drum diameter can be compared to parts specification data stored in the measurement setup data 78 to determine whether a measured brake rotor or brake drum can be machined further by a brake lathe. Tool measurements with respect to other components can be compared to specifications for the other components to determine whether the measurement indicates the component is within specification such that replacement of the component may not be necessary or the measurement indicates the component is not within specification such that replacement of the component should occur.

Figure 10:
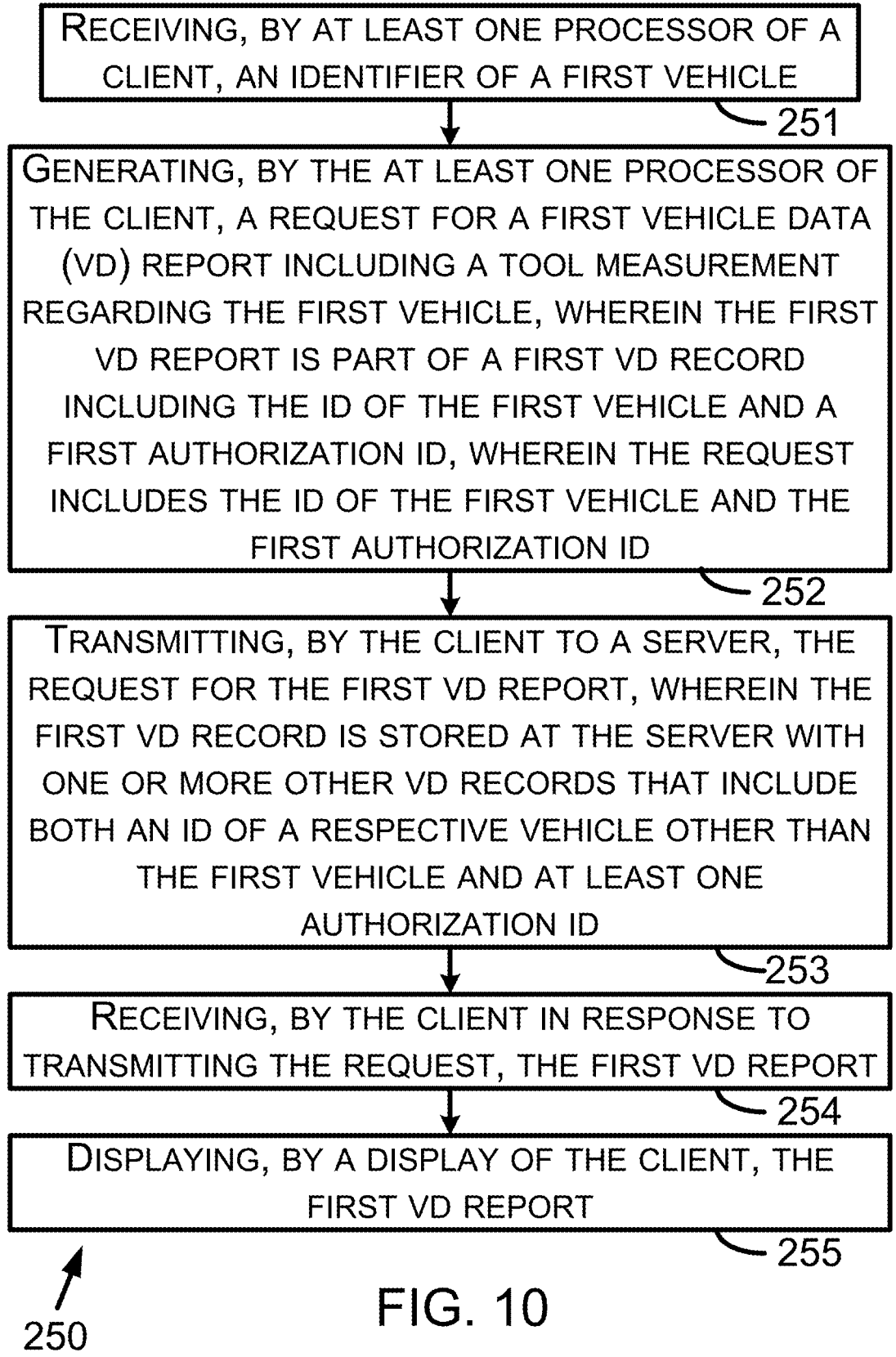
FIG. 10 is a flowchart depicting a set of functions that can be carried out in accordance with the example embodiments.

Next, FIG. 10 shows a flowchart depicting a set of functions 250 (or more simply "the set 250") that can be carried out in accordance with the example embodiments described in this description. The set 250 includes the functions shown in blocks labeled with whole numbers 251 through 255 inclusive. The following description of the set 250 includes references to elements shown in other figures described in this description, but the functions of the set 250 are not limited to being carried out only by the referenced elements. A variety of methods can be performed using all of the functions shown in the set 250 or any proper subset of the functions shown in the set 250. Any of those methods can be performed with other functions such as one or more of the other functions described in this description. For instance, a method including a function of the set 250 can include one or more functions of the sets 230, 240, and 260. One or more of the functions shown in the set 250 can be carried out multiple times in performing a method in accordance with the example embodiments.

Block 251 includes receiving, by at least one processor of a client, an identifier of a first vehicle. One or more items of the client 100 can receive the identifier of the first vehicle. Receiving the identifier of the first vehicle can be include any of the aspects described above with respect to receiving data indicating a selected vehicle for a vehicle data report, as described with respect to block 232.

The processor 101 can receive the identifier of the first vehicle by receiving a VTN associated with the first vehicle. The DLC interface 105 can receive the YIN from an ECU within the first vehicle and then provide the VTN to the processor 101. The processor 101 can store a temporal identifier (e.g., a time when the VIN is received at the processor 101 or the DLC interface 105) within the CRM 102.

Next, block 252 includes generating, by the processor 101 of the client 100, a request for a portion of a VD record (i.e., a data report request). The VD record includes a VD report (e.g., the VD report 160) having a tool measurement regarding a vehicle. The request comprises an identifier associated with the first vehicle and an authorization identifier.

The data report request can include data indicating the client 100 received the YIN from the ECU in the vehicle. The server 2 can use that date to determine that the client 100 is currently connected to the vehicle or at least was connected to the vehicle sometime in the past. The server 2 may not authorize sending the first vehicle data report to the client 100 unless the client is currently connected to the vehicle or was connected to the vehicle sometime in the past. Furthermore, the data report request can include a temporal identifier to indicate when the client received the YIN from the first vehicle. The server 2 may not authorize sending the first vehicle data report to the client 100 unless the client 100 was connected to the vehicle within a threshold amount of time. The server 2 can use the temporal identifier to determine whether to authorize the client for receiving the first vehicle data report.

The processor 101 can cause the user interface 103 to display a DUI at which a user can enter a vehicle data record password that is associated with the first VD record. The authorization identifier in the data report request can include the vehicle data record password entered at the DUI displayed by the user interface 103.

The authorization identifier can include any of the example authorization identifier discussed throughout this description or another authorization identifier. As an example, the authorization identifier can include at least one of the client ID 110, and a repair shop identifier (e.g., the repair shop ID 171) and/or a repair technician identifier (e.g., the repair technician ID 172). As another example, the authorization ID can include a client ID (e.g., the client ID 110 or the CCS ID 176) and a repair shop ID (e.g., the repair shop ID 171). As yet another example, the authorization ID can include a client ID (e.g., the client ID 110 or the CCS ID 176) and a repair technician identifier (e.g., the repair technician ID 172).

Turning to FIG. 16, some example data report requests 430, 431, 432, 433, and 434 are shown. Each of those data report requests include a source identifier (e.g., an identifier of a device that generates or transmits the data report request), a destination identifier (e.g., an identifier of a device or system to which the data report request is to be transmitted), a communication type identifier (CTI) (e.g., an identifier that indicates that the data report request is for some portion of a VD record), an authorization identifier, and a vehicle identifier.

The CTI for the data report request 430 includes an identifier of a particular portion (i.e., the VD report #45) of a VD record (i.e., VD record ID 1 shown in FIG. 7). The CTI for the data report request 431 includes identifier of multiple VD reports #45 and #1,068 of the VD record ID 1. The CTI for the data report request 432 includes an identifier of the entire portion of the VD record ID 5. The CTI for the data report request 433 includes an identifier of a particular type of VD report data (e.g., brake thickness measurements) and a time range (e.g., all-time). The CTI for the data report request 434 includes an identifier of a particular type of VD report data (e.g., brake thickness measurements) and a time range (e.g., 18 Feb. 2015 to present).

FIG. 16 also shows the authorization identifier and vehicle identifier of a data report request can include one or more identifiers. The authentication ID of a data report request can include any one or more of the identifiers described in this description as being an authentication ID or another type of authentication ID. The vehicle ID of a data report request can include any one or more of the identifiers described in this description as being a vehicle ID or another type of vehicle ID. Other examples of a data report request are also possible.

Turning back to FIG. 10, block 253 includes transmitting, by the client (e.g., by the transceiver 104 of the client 100), the request for the first VD report (i.e., a data report request). The data report request transmitted at the block 253 can be configured like any of the data report requests 430, 431, 432, 433, or 434, or include any of the elements of those data report requests. Communications 405, 407, and 409 (shown in FIG. 15) are examples of transmissions of data report requests from a client to a server that can be carried out to transmit the data record report for block 253.

Next, block 254 includes receiving, by the client (e.g., by the transceiver 104 of the client 100) in response to transmitting the request, the first VD report. As an example, the first VD report can include an entire VD record or some but not all of an entire VD record. As yet another example, the first VD report can include any measurement data described in this description (e.g., tool measurements or vehicle measurement data). As still yet another example, the first VD report can include any non-measurement data associated with a VD record (e.g., any identifier, date, location, time, usage indicator, etc. within a VD report or the VD record).

Next, block 255 includes displaying, by a display of the client (e.g., a display of the user interface 103), the first VD report. The processor 101 can generate a DUI to display the first VD report on the display (e.g., the DUI 273 shown in FIG. 12).

One or more of the server 2 and the client 100 can determine a tool measurement conclusion message to be displayed based on, at least in part, the requested portion of the VD record. The tool measurement conclusion message can be generated based on a determination that the tool measurement is within specific measurement levels or that the tool measurement is outside of specific measurement levels.

As an example, the requested portion of the VD record can include one or more brake part thickness measurements. At the server, the processor 70 can use a brake part thickness measurement to determine whether the brake part can be machined by a brake lathe such that a post-machining thickness of the brake part is within a range of acceptable brake part thickness measurements. The processor 70 can refer to the measurement setup data 78 to the VD record including brake part thickness measurement(s), the processor 70 can determine whether the brake part thickness measurement(s) is/are within a range of brake part thicknesses stored in the measurement setup data 78, and the server 2 can transmit a tool measurement conclusion message to the client 100 indicating whether machining of the brake part can be performed by the brake lathe. The user interface 103 can display tool measurement conclusion message provided to the client 100. The processor 101 can execute the CRPI 109 to can determine whether the brake part thickness measurement(s) is/are within a range of brake part thicknesses stored in the measurement setup data 117, and the processor 101 can generate the tool measurement conclusion message for display at the user interface 103. Other examples of tool measurement conclusion messages are also possible.

Turning to FIG. 15, a communication diagram 400 with various tool measurements or communications to or from the server 2, the client 11, the client 17, the client 25, and the CMT 13 is shown. The lines extending downward from those elements pertain to those respective elements. The arrowheads touching the downward extending line of any element or the element itself indicates that the particular element receives the communication represented by the arrowed line. The element from which that arrowed line extends is the transmitter of that communication. As indicated previously, the repair shops 3 and 5 at which the client 11, the client 25, and the CMT 13 can operate can be affiliated with one another, but can be unaffiliated with the repair shop 4 at which the client 17 can operate.

The client 11 can perform or receive a variety of measurements. For example, the client 11 can receive a measurement 401, which can include a tool measurement manually entered into the client 11 via the user interface 103 or measurement data from a vehicle communicatively coupled to the client 11 via the DLC interface 105. As another example, the client 11 (e.g., by the transceiver 73) can receive a tool measurement 402 from the CMT 13.

The client 11 can transmit a communication 403 to request generation of the VD record 200. The communication 403 can include a request to generate a VD record, and data to include within the VD record, such as one or more of the vehicle ID 209, the client ID 210, the password 211, the repair shop ID 212, the technician TD 213, and the vehicle owner ID 214. Other examples of items contained in the communication 403 are also possible. The server 2 can transmit a response (not shown) to the communication 403, such as a response containing notice the VD record 200 (with VD record ID: 1) has been generated. Communications other than the communication 403 can be sent to the server 2 to cause the server 2 to generate the VD record. For example, a vehicle owner can transmit a request to generate the VD record from a smart phone or tablet to the server 2. The communication 403 or those other communications can occur prior to, while, or after the client 11 receives one or more of the measurements 401 and 402.

The client 11 can generate a VD report including a measurement, such as one or more of the measurement 401 and 402. The client 12 can transmit a communication 404 to the server 2 including the "VD report #45" (shown in FIG. 7) for the VD record 200 generated as a result of the communication 403 or generated for another reason. The "VD report #45" can be arranged like the VD report 160 such that the communication 404 can include one or more of the measurements 401 and 402 as part of the example measurement data 161 of the VD report 160.

The client 11 can transmit data report requests. A communication 405 is a data report request for at least a portion of the "VD report #45" of the VD record 200. The server 2 can receive the data report request of the communication 405. This can occur as described with respect to the block 244 (shown in FIG. 9) or in another manner. The server 2 can determine whether the client 11 or a user of the client 11 is authorized to access the requested portion of the data record. This can occur as described with respect to the block 245 (shown in FIG. 9) or in another manner. In this case, the server 2 determines access to the requested portion of the VD report is authorized and the server 2 transmits the requested portion of the VD record to the client 11 via a communication 406. This can occur as described with respect to the block 246 (shown in FIG. 9) or in another manner.

FIG. 15 shows communications 407 and 408 between the client 17 and the server 2. The client 17 is used within the repair shop 4, which is unaffiliated with the repair shop 3. The client 17 can transmit data report requests. This lack of affiliation may prohibit the client 17 from accessing portion of VD records generated based on requests from the repair shop 3. The communication 407 is a data report request for at least a portion of the "VD report #45" of the VD record 200. The server 2 can receive the data report request of the communication 407. This can occur as described with respect to the block 244 (shown in FIG. 9) or in another manner. The server 2 can determine whether the client 17 or a user of the client 17 is authorized to access the requested portion of the data record. This can occur as described with respect to the block 245 (shown in FIG. 9) or in another manner. In this case, the server 2 determines access to the requested portion of the VD report is not authorized and the server 2 transmits the communication 408 indicating that access to the requested portion of the VD record is denied. The client 17 can display subsequently display the access-failed message 291 (shown in FIG. 13) or another message.

FIG. 15 shows communications 409 and 410 between the client 25 and the server 2. The client 25 is used within the repair shop 5, which is affiliated with the repair shop 3. This affiliation may result in the client 25 being able to access portion of VD records generated based on requests from the repair shop 3. The communication 409 is a data report request for at least a portion of the "VD report #45" of the VD record 200. The server 2 can receive the data report request of the communication 409. This can occur as described with respect to the block 244 (shown in FIG. 9) or in another manner. The server 2 can determine whether the client 25 or a user of the client 25 is authorized to access the requested portion of the data record. This can occur as described with respect to the block 245 (shown in FIG. 9) or in another manner. In this case, the server 2 determines access to the requested portion of the VD report is authorized and the server 2 transmits the requested portion of the VD record to the client 25 via a communication 410. This can occur as described with respect to the block 246 (shown in FIG. 9) or in another manner.

Figure 11:
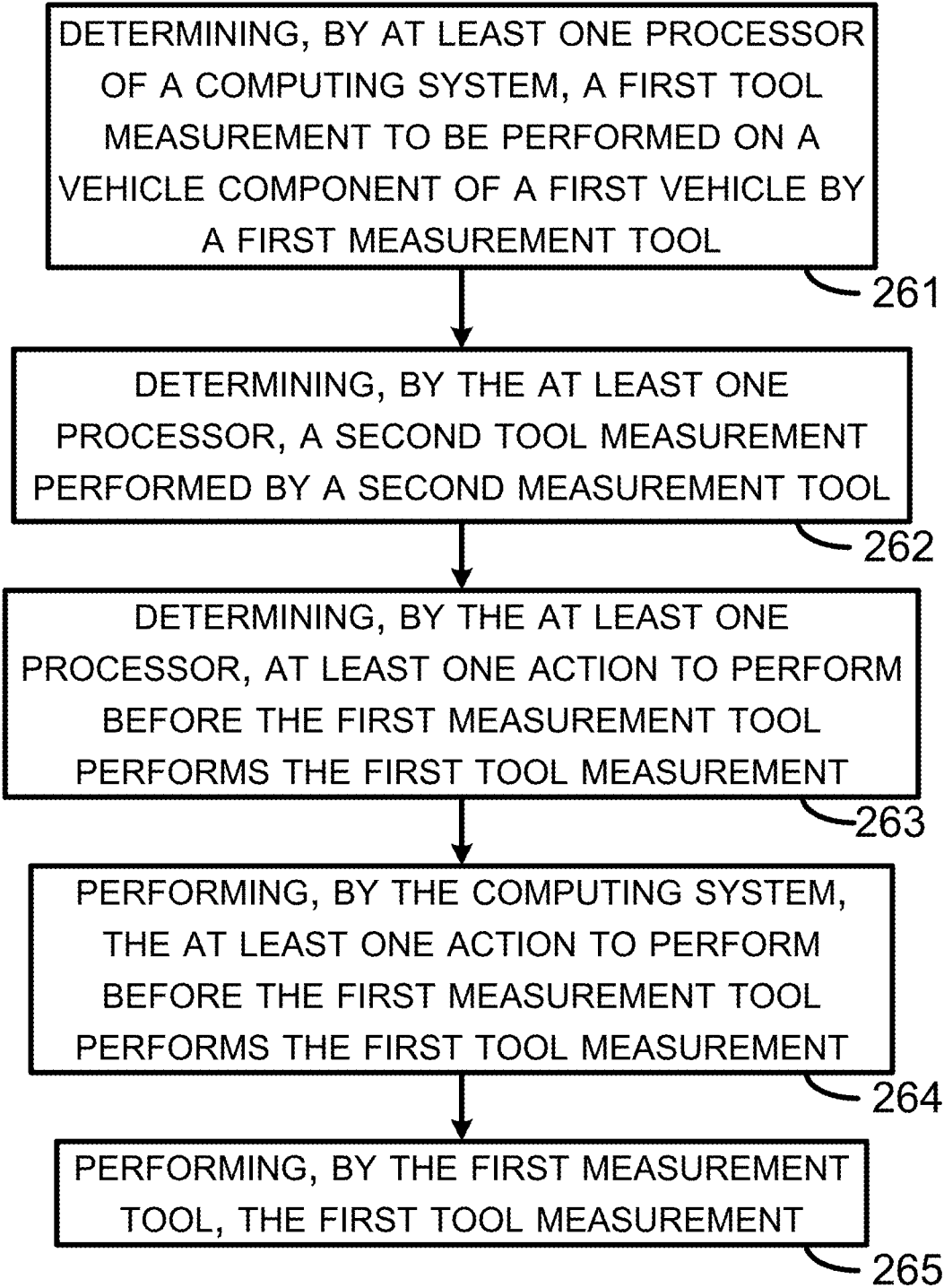
FIG. 11 is a flowchart depicting a set of functions that can be carried out in accordance with the example embodiments.

Next, FIG. 11 shows a flowchart depicting a set of functions 260 (or more simply "the set 260") that can be carried out in accordance with the example embodiments described in this description. The set 260 includes the functions shown in blocks labeled with whole numbers 261 through 265 inclusive. The following description of the set 260 includes references to elements shown in other figures described in this description, but the functions of the set 260 are not limited to being carried out only by the referenced elements. In particular, at least some of the functions refer at least one processor of a computing system. As an example, the computing system can include the server 2, the client 100, or the CMT 130 such that the at least one processor includes the processor 70, the processor 101, or the processor 131, respectively.

A variety of methods can be performed using all of the functions shown in the set 260 or any proper subset of the functions shown in the set 260. Any of those methods can be performed with other functions such as one or more of the other functions described in this description. For instance, a method including a function of the set 260 can include one or more functions of the sets 230, 240, and 250. One or more of the functions shown in the set 260 can be carried out multiple times in performing a method in accordance with the example embodiments.

Block 261 includes determining, by at least one processor of a computing system, a first tool measurement to be performed on a vehicle component of a first vehicle by a first measurement tool. The vehicle component to be measured may be on the first vehicle (e.g., installed on the first vehicle, installed within the first vehicle, or attached to another component of the first vehicle). Alternatively, the vehicle component to be measured may be off of the vehicle (e.g., a vehicle component such as a wheel or an alternator that has been unattached from another component of the first vehicle).

Determining the first tool measurement can include or occur as a result of one or more steps. A first example step includes receiving at the at least one processor an identifier of the first tool measurement. A second example step includes receiving at the at least one processor an identifier of the vehicle component. A third example step includes receiving at the at least one processor an identifier of the first vehicle. A fourth example step includes receiving at the at least one processor an identifier of the first measurement tool.

For an embodiment in which the at least one processor includes the processor 70, the at least one processor can receive one or more of the identifiers of the first, second, third, and fourth example steps from any one or more of the CRM 71, the user interface 72, and the transceiver 73. The transceiver 73 can receive one or more of the identifiers of the first, second, third, and fourth example steps from the client 100.

For an embodiment in which the at least one processor includes the processor 101, the at least one processor can receive one or more of the identifiers of the first, second, third, and fourth example steps from any one or more of the CRM 102, the user interface 103, the transceiver 104, the DLC interface 105, the CMT 106, and the capture device 107. The transceiver 104 can receive one or more of the identifiers of the first, second, third, and fourth example steps from the CMT 130.

For an embodiment in which the at least one processor includes the processor 131, the at least one processor can receive one or more of the identifiers of the first, second, third, and fourth example steps from any one or more of the CRM 134, the user interface 132, the transceiver 133, and the measurement device 135. The transceiver 133 can receive one or more of the identifiers of the first, second, third, and fourth example steps from the server 2 or the client 100.

Next, block 262 includes determining, by the at least one processor, a second tool measurement performed by a second measurement tool. The at least one processor within a first computing system, such as the client 100, can determine the second tool measurement and cause its transceiver to transmit the second tool measurement to a second computing system so that the processor of the second computing system can determine the second tool measurement. Transmitting the second tool measurement can be performed by transmitting a VDR or a portion of a VDR that includes the second tool measurement.

In one respect, transmission of a tool measurement, a VDR, and/or a portion of a VDR can occur directly from the transmitter of the first computing system to the receiver of the second computing system over a PAN or WPAN established between the first computing system and the second computing system. In another respect, transmission of a tool measurement, a VDR, and/or a portion of a VDR can occur indirectly from the transmitter of the first computing system to the receiver of the second computing system. As an example, the indirect transmission of the tool measurement, the VDR, and/or the portion of a VDR can include a transmitter of the second computing system (e.g., the second measurement tool) transmitting the tool measurement, the VDR, and/or the portion of a VDR onto the communication network 6 for delivery to the SCS 2, and a transmitter of the SCS 2 subsequently transmits the tool measurement, the VDR, and/or the portion of a VDR onto the communication network 6 for delivery to the first computing system (e.g., the CCS 100 or the CMT 130). The indirect transmission of the tool measurement, the VDR, and/or the portion of a VDR can include one or more components of the communication network 6 receiving and forwarding the tool measurement, the VDR, and/or the portion of a VDR along the communication network 6 towards the first computing system.

For an embodiment in which the at least one processor includes the processor 70, each processor can determine the second tool measurement from a vehicle data report stored in the VDR 75. For an embodiment in which the at least one processor includes the processor 101, each processor can determine the second tool measurement from a vehicle data report stored in the VDR 119. For an embodiment in which the at least one processor includes the processor 121, each processor can determine the second tool measurement from data including the second tool measurement received at the user interface 132 or the transceiver 133.

A processor can cause a transceiver to transmit a request for data indicating the second tool measurement or a request for a VDR including the second tool measurement. A request for a VDR including the second tool measurement can include a request for a particular VDR associated with the first vehicle or a request for all VDR associated with the first vehicle.

As an example, the first tool measurement can include a wheel alignment measurement for a wheel alignment measurement tool. The second tool measurement can include a tool measurement of a vehicle suspension component, such as a ball joint, a steering knuckle, a tie rod end, a wheel, or a tire, using a dial or digital indicator. Alternatively, the second tool measurement can include a tire pressure measurement of a tire on the first vehicle.

As another example, the first tool measurement can include a brake rotor runout measurement for a brake lathe. The second tool measurement can include a brake rotor thickness measurement performed by a micrometer.

As another example, the first tool measurement to be performed can include a torque measurement of force to be applied by use of a torque wrench. The second tool measurement can include a temperature measurement of the vehicle component and/or another component of the first vehicle to which the vehicle component is to be attached by one or more fasteners.

The at least one processor may determine a second tool measurement that is associated with the first tool measurement to be performed based on data that associates the first and second tool measurements with each other. Such data can be stored in the measurement setup data 78 and/or the service procedures 82 within the server 2, and/or in the measurement setup data 117 and/or the sever data 118 within the client 100, and/or within the measurement setup data 142 within the CMT 130.

Next, block 263 includes determining, by the at least one processor, at least one action to perform before the first measurement tool performs the first tool measurement. The at least one action can be associated with the first tool measurement, the vehicle component on the first vehicle, and a value of the second tool measurement. The CRPI executed by the at least one processor can include or access data that associates the first tool measurement with the second tool measurement, a range of values of the second tool measurement, and at least one action.

Next, block 264 includes performing, by the computing system, the at least one action to perform before the first measurement tool performs the first tool measurement.

Performing the at least one action can include performing an action by the CMT 130. As an example, the user interface 132 can display a notification showing the second tool measurement. As another example, the user interface 132 can display a notification indicating performance of the first tool measurement should be postponed until other service to the first vehicle has been performed (e.g., a notification indicating that a worn ball joint indicated by the second tool measurement should be replaced prior to performing the first tool measurement of aligning the wheels of the vehicle). For an embodiment in which the first tool measurement includes a wheel alignment measurement and the second tool measurement includes measuring a ball joint with a dial or digital indicator, the range of values of the second tool measurement can include values greater than or equal to 0.050 inch, the action can additionally or alternatively include preventing performance of the first tool measurement using first measurement tool until the processor 131 determines the ball joint has been replaced or a notification otherwise overridden based on a user entry.

As another example, the user interface 132 can display a notification indicating performance of the first tool measurement is not recommended (in order to save the technician time) (e.g., a notification that a brake rotor thickness dimension indicated by the second tool measurement is too small to allow the brake rotor to be machined to a dimension within specification for the first vehicle).

As another example, the user interface 132 can display a notification indicating performance of the first tool measurement (e.g., a torque measurement as well as the use of a torque wrench) should be postponed until a temperature of the vehicle component and/or another component to which the vehicle component is to be attached is below a specified temperature.

Performing the at least one action can include performing an action by the client 100. As an example, the processor 101 can cause the transceiver 104 to send a message to the CMT 130, the message including a request to perform an action at the CMT 130. As an example, the requested action can be to display one of the example notifications regarding either or both the first and second tool measurements.

Performing the at least one action can include performing an action by the server 2. As an example, the processor 70 can cause the transceiver 73 to send a message to at least one of the client 100 and the CMT 130, the message including a request to perform an action at the client or the CMT 130. As an example, the requested action can be to display one of the example notifications regarding either or both the first and second tool measurements.

Next, block 265 includes performing, by the first measurement tool, the first tool measurement. Performing the first tool measurement can include determining data at a measurement device, such as the measurement device 135. Performing the first tool measurement can include receiving, at the one more processors, the data determined at the measurement device. As an example, the first tool measurement can include a tool measurement that excludes determining data from a vehicle data message. As another example, the first tool measurement can include a tool measurement that includes determining data from a vehicle data message. The CMT 130 can transmit the first tool measurement to the client 100. The first tool measurement can be added to a new VDR associated with the first vehicle.

V. Example Display User Interface (DUI)

Figure 12:
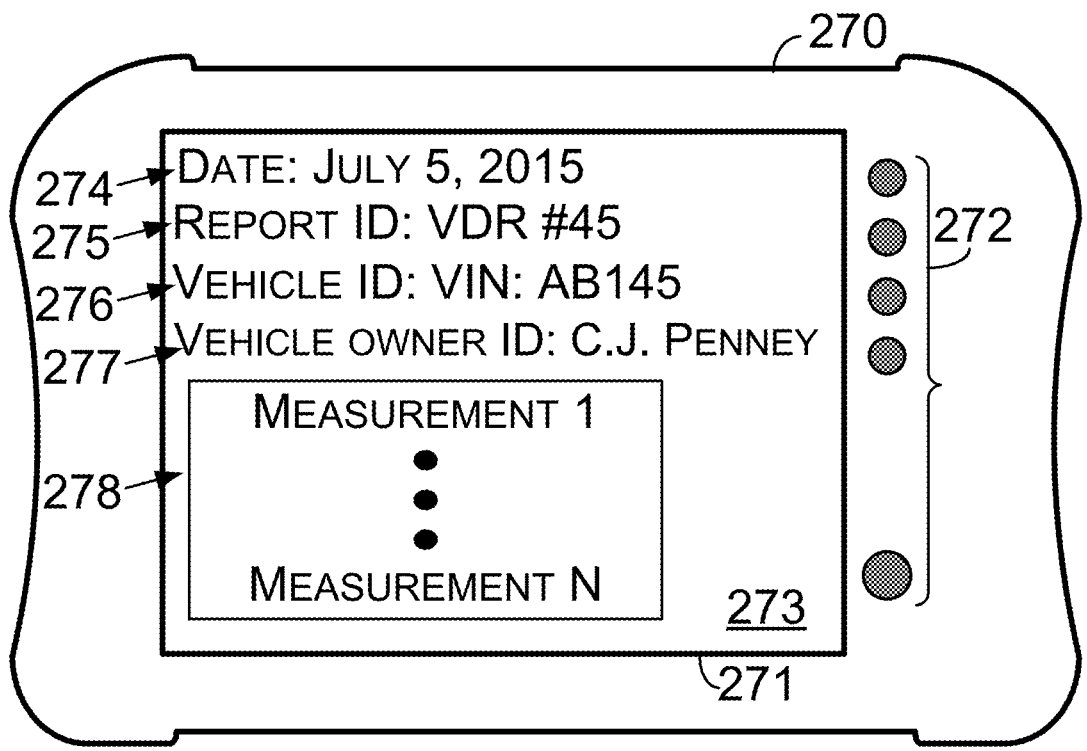
FIG. 12 shows example display user interfaces.
Figure 12:
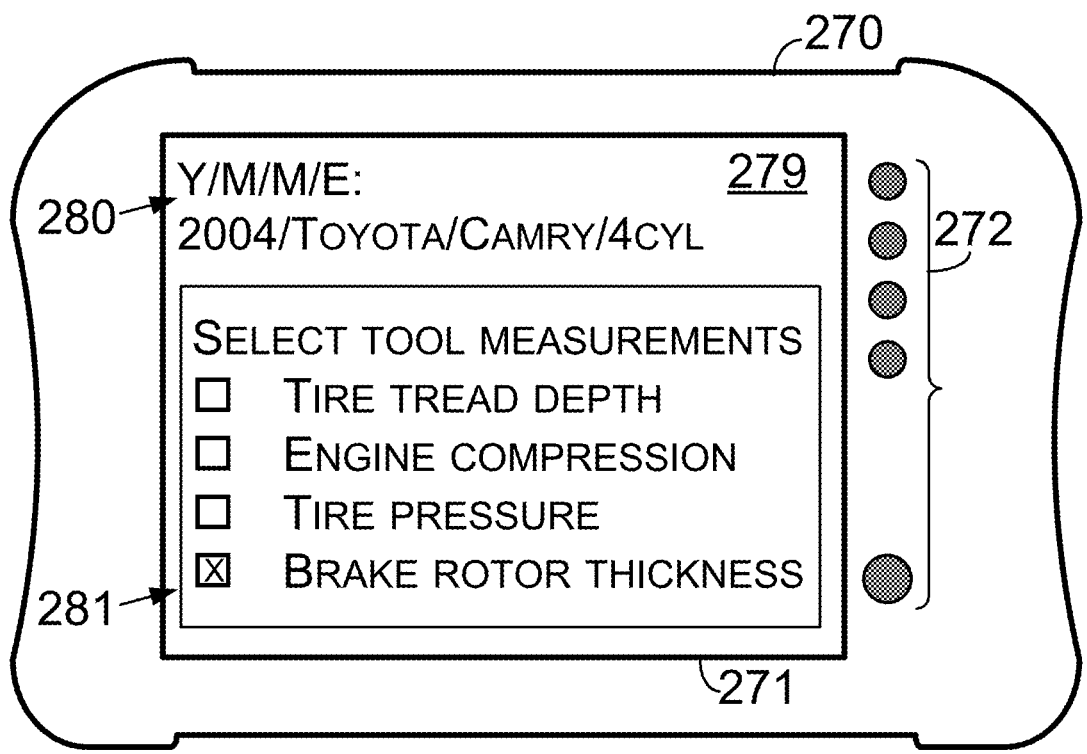
Figure 13:
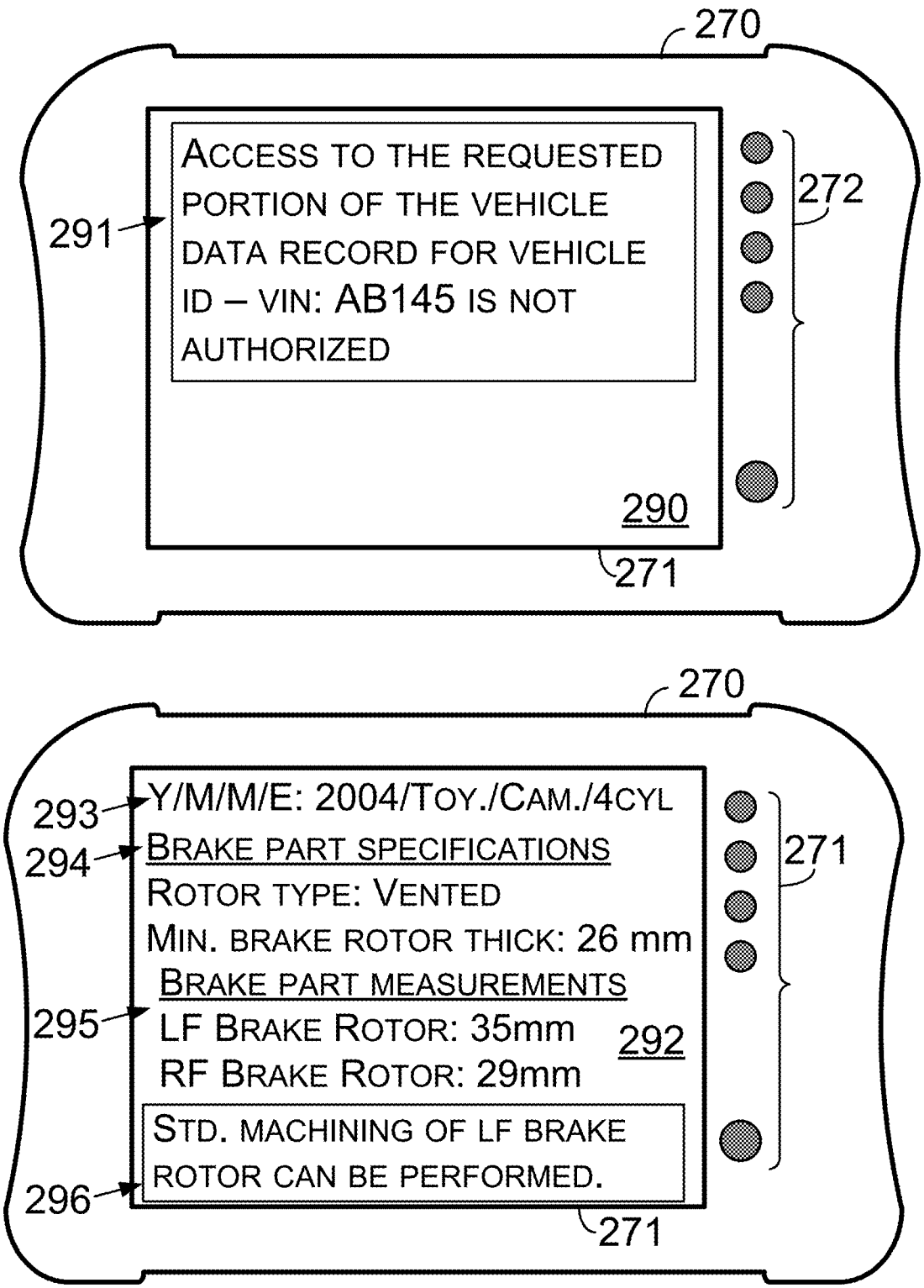
FIG. 13 shows example display user interfaces.

FIG. 12, FIG. 13, and FIG. 14 show an example client 270 having a display 271 and a user-input element section 272. The client 100 can be configured like the client 270. FIG. 12 and FIG. 14 show rectangular check boxes within DUI, some of which include an "X" to represent selection of the check box. Other examples of ways in which a DUI can show something as selectable or having been selected are also possible. The user-input element section 272 can be used to select a displayed check box. Other ways to select a check box are also possible.

FIG. 12 shows the display 271 displaying a DUI 273. The DUI 273 can be displayed after selections of one or more of a vehicle ID, a vehicle owner ID, a date, and VD report identifier have been received to select a portion of a VD record. The DUI 273 includes a date 274, such as a date a vehicle data report was generated, a report ID 275, such as a vehicle data report generated on the displayed date, a vehicle ID 276 for a vehicle selection, such as a vehicle selection received at block 232 (shown in FIG. 8), a vehicle owner ID 277 associated with the vehicle selection, and tool measurement data 278 within the identified vehicle data report. The tool measurement data 278 can identify the type of tool measurement performed, the vehicle component on which the tool measurement was performed, and the type of CMT used to make the tool measurement. The tool measurement data 278 can include other types of data stored within the identified vehicle data report.

FIG. 12 also shows the display 271 displaying a DUI 279. The DUI 279 can be displayed after the client 100 receives a vehicle selection. The DUI 279 includes a vehicle ID 280 in the form of a Y/M/M/E, and a tool measurement selection list 281. The tool measurements listed in the selection list 281 can be conditioned on various factors. For example, the listed tool measurements can be restricted to those that are applicable to vehicles matching the type of vehicle identified by the vehicle ID 280. As another example, the tool measurements listed in the selection list 281 can be conditioned on the measurement tools that have been registered for the client 100. As another example, the tool measurements listed in the selection list 281 can be conditioned on a service procedure being performed by a user of the client 100. The service procedure can be identified in various ways, such as a service procedure having been recently or currently displayed on the display 271 or from a repair order associated with vehicle identified by the vehicle ID 280.

Next, FIG. 13 shows the display 271 displaying a DUI 290. The DUI 290 can be displayed after the client 100 receives a selection for a vehicle data record for which the client 100 is not authorized to access or insufficient information has been received for the client to access the vehicle data record. The DUI 290 can be displayed in response to the client receiving a communication that indicates access to the requested portion of the VD record is denied (e.g., the communication 408 (shown in FIG. 15)). The DUI 290 includes an access-failed message 291.

FIG. 13 also shows the display 271 displaying a DUI 292. The DUI 292 can be displayed after the client 100 receives a vehicle selection and a tool measurement. The DUI 292 includes a vehicle ID 293 in the form of a Y/M/M/E, a vehicle component specification 294, a tool measurement 295, and a tool measurement conclusion message 296. The DUI 292 is an example of a DUI in which the tool measurement selection is brake rotor thickness, such as the tool measurement selection shown in the DUI 279. The processor 101 can request the vehicle component specification 294 from the measurement setup data 78 for the selected vehicle and store the vehicle component specification within the measurement setup data 117. The processor 101 can receive brake rotor thickness measurements from the transceiver 104 or from the CMT 106, store the brake thickness measurements within the measurement data 113, and make a tool measurement conclusion by comparing the tool measurement to the vehicle component specification. Based on that conclusion, the processor 101 can generate the tool measurement conclusion message 296.

Next, FIG. 14 shows the display 271 displaying a DUI 300. The DUI 300 can be displayed after the processor 101 receives a vehicle identifier for a vehicle. The processor 101 can receive the vehicle identifier after a user-input element is used to select a particular repair order associated with the identified vehicle from a repair order list 301. The repair order list 301 can include repair orders associated with a particular repair shop associated with the client 100 or with a user of the client 100. Each repair order within the repair order list can be associated with a particular vehicle. Each repair order can include one or more service requests. The DUI 300 includes two service requests 302 and 303 for the selected repair order. The DUI 300 shows that the service request 303 for "engine hesitates, starts hard" has been selected.

FIG. 14 also shows the display 271 displaying a DUE 310 including a measurement tool selection list 311, and a measurement tool selection 312 for a "fuel pressure gauge" selection. The DUI 310 can be displayed after the processor 101 receives one or more of a vehicle identifier for a particular vehicle (e.g., a vehicle with an internal combustion engine), a selection of a service request from a repair order (e.g., service request 303), and a selection of a vehicle component (e.g., a fuel pump). The processor 101 can generate the CMT selection list 311 to include CMT associated with the particular vehicle and the selected service request. The CMT associated with the particular vehicle and the selected service request can be determined by the server 2 based on a variety of information, at least some of which can include historical repair orders for previous repairs performed on a vehicle similar to the vehicle identified on the DUI 300, similar service requests listed on the historical repair orders, and confirmation that service procedures performed for the service requests were performed successfully. The server 2 can rank the CMT in the CMT selection list 311 in an order that can lead to quicker repair of a vehicle. The server 2 may not select certain CMT for inclusion within the ST selection list 311 if not applicable to the particular vehicle and the selected service request. For example, the server 2 may not select a brake lathe or WAM because the server 2 can determine they are not associated with one or more of the particular vehicle and the selected service request.

FIG. 14 also shows the display 271 displaying a DUI 320 including a vehicle component selection list 321, and a vehicle component selection 322 for a "fuel pump" selection. The DUI 320 can be displayed after the processor 101 receives one or more of a vehicle identifier for a particular vehicle (e.g., a vehicle with an internal combustion engine), a selection of a service request from a repair order (e.g., service request 303), and a CMT selection (e.g., a fuel pressure gauge). The processor 101 can generate the CMT selection list 311 to include vehicle components associated with the particular vehicle, the selected service request, or the selected CMT. The vehicle component associated with the particular vehicle, the selected service request, or the selected CMT can be determined by the server 2 based on a variety of information, at least some of which can include historical repair orders for previous repairs performed on a vehicle similar to the vehicle identified on the DUI 300, similar service requests listed on the historical repair orders, and confirmation that service procedures performed for the service requests were performed successfully. The server 2 can rank the vehicle components in the vehicle component selection list 321 in an order that can lead to quicker repair of a vehicle. The server 2 may not select certain vehicle components for inclusion within the vehicle component selection list 321 if not applicable to the particular vehicle, the selected service request, or the selected CMT. For example, the server 2 may not select any vehicle brake system components because the server 2 can determine they are not associated with one or more of the particular vehicle, the selected service request, or the selected CMT.

FIG. 14 also shows the display 271 displaying a DUI 330 including a spatial identifier selection list 331. The DUI 330 can be displayed after or in response to the processor 101 receiving one or more of a vehicle identifier for a particular vehicle (e.g., a vehicle with an internal combustion engine), a selection of a service request from a repair order (e.g., service request 303), and a CMT selection (e.g., a fuel pressure gauge). The processor 101 can generate the spatial identifier selection list 331 to include spatial identifier associated with the particular vehicle, the selected service request, or the selected CMT. The spatial identifier associated with the particular vehicle, the selected service request, or the selected CMT can be determined by the server 2 based on a variety of information, at least some of which can include historical repair orders for previous repairs performed on a vehicle similar to the vehicle identified on the DUI 300, similar service requests listed on the historical repair orders, confirmation that service procedures performed for the service requests were performed successfully, and component location information. The server 2 can rank the spatial identifier in the vehicle component selection list 331 in an order that can lead to quicker repair of a vehicle. The server 2 may not select certain spatial identifiers for inclusion within the spatial identifier selection list 331 if not applicable to the particular vehicle, the selected service request, or the selected CMT. For example, the server 2 may not select any spatial identifiers of locations (e.g., engine cylinder numbers) that do not apply to a selected vehicle component (e.g., a fuel pump).

VI. Example Computing Systems

Figure 17:
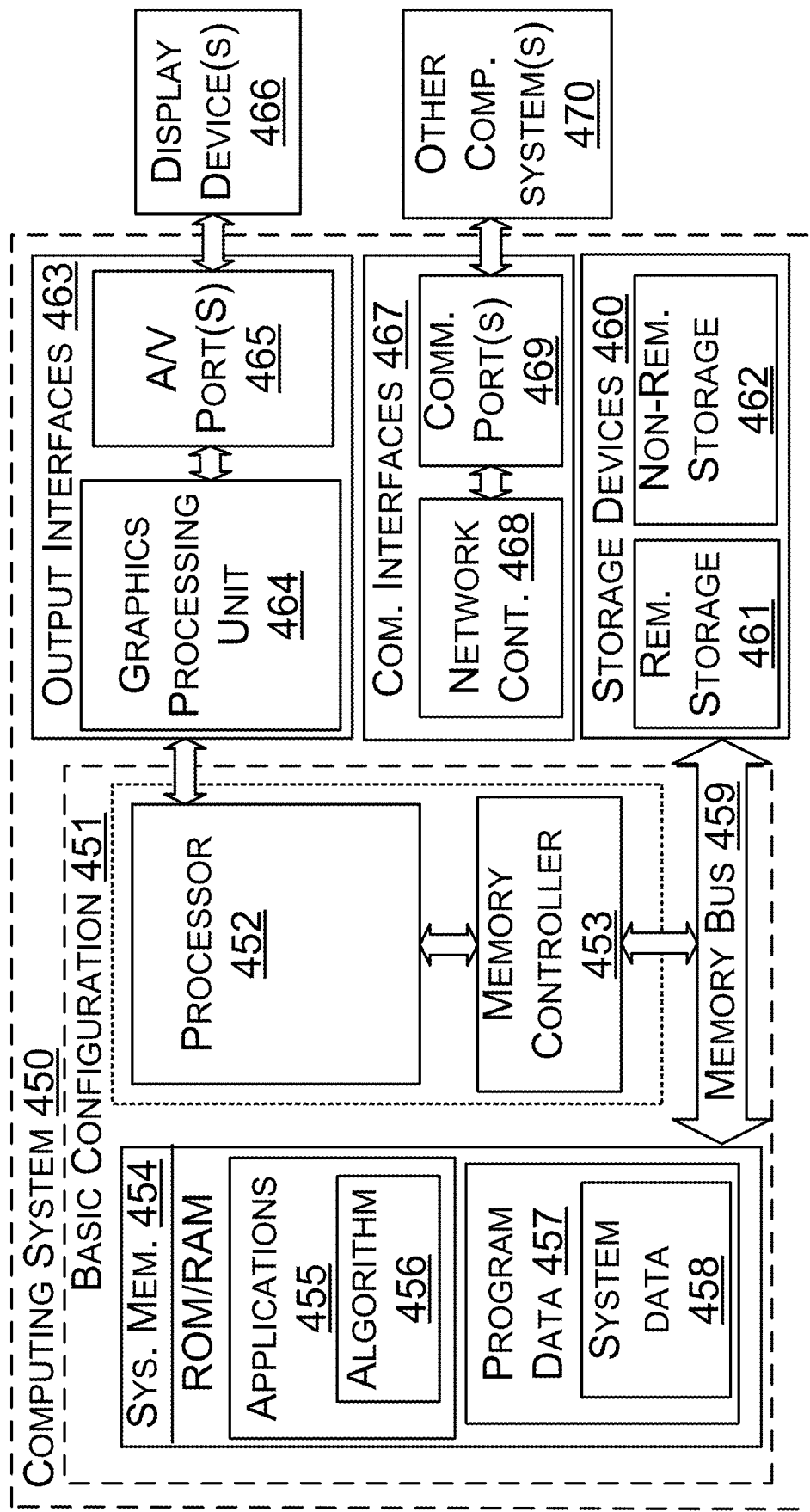
FIG. 17 is a functional block diagram illustrating a computing system that is arranged in accordance with at least some example embodiments.

As described above, the computing systems described herein can be any of a number of different types of computing systems. FIG. 17 is a functional block diagram illustrating an example computing system 450 used in a computing system that is arranged in accordance with at least some embodiments described herein. In a basic configuration 451, the computing system 450 can typically include one or more processors 452 and system memory 454. A memory bus 459 can be used for communicating between the processor 452 and the system memory 454. Depending on the desired configuration, processor 452 can be of any type including but not limited to a microprocessor (μP), a microcontroller (μC), a digital signal processor (DSP), or any combination thereof. A memory controller 453 can also be used with the processor 452, or in some implementations, the memory controller 453 can be an internal part of the processor 452.

Depending on the desired configuration, the system memory 454 can be of any type including but not limited to volatile memory (such as RAM), non-volatile memory (such as ROM, flash memory, etc.) or any combination thereof. System memory 454 can include one or more applications 455, and program data 457. The application 455 can include an algorithm 456 that is arranged to perform the functions described as being performed by the CRPI 77, 109, or 138 or other functions described in this description. The program data 457 can include system data 458 that could be directed to any number of types of data, such as one more of the following types of data: the vehicle data records 75, the authorization data 76, the measurement setup data 78, 117, or 142, the data dictionary 80, the registration data 81 or 116, the service procedures 82, the client ID 110, the CMT ID 111 or 139, the CMT version ID 112 or 140, the measurement data 113 or 140, the VDM 114, the captured data 115, the server data 118, and/or the VD reports 119. In some example embodiments, the applications 455 can be arranged to operate with the program data 457 on an operating system executable by the processor 452.

The computing system 450 can have additional features or functionality, and additional interfaces to facilitate communications between the basic configuration 451 and any devices and interfaces. For example, data storage devices 460 can be provided including removable storage devices 461, non-removable storage devices 462, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable program instructions, data structures, program modules, or other data such as the data stored in computer-readable medium 71, 102, and 134.

The system memory 454 and the storage devices 460 are examples of computer-readable medium, such as the computer-readable medium 71, 102, or 134. The system memory 454 and the storage devices 460 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 450.

The computing system 450 can include or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The CRPI 77, 109, or 127, the application 455, or the program data 457 can include an application downloaded to a transceiver 73, 104, or 133, or the communication interfaces 467 from the APP STORE® online retail store, from the GOOGLE PLAY® online retail store, or another source of the applications or the CRPI described herein.

Figure 18:
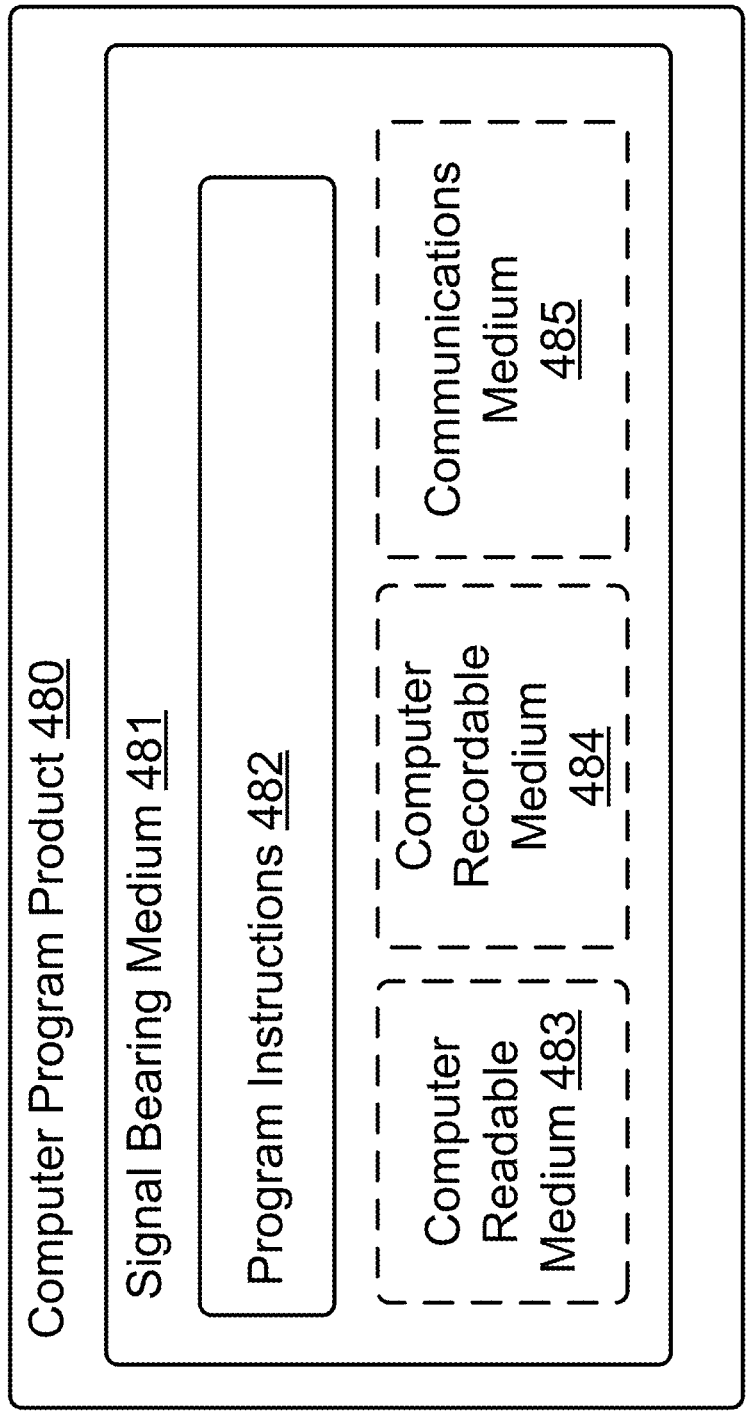
FIG. 18 is a schematic illustrating a conceptual partial view of a computer program product for executing a computer process on a computing system, according to an example embodiment.

Additionally or alternatively, the computing system 450 can include or be implemented as a personal computing system (including both laptop computer and non-laptop computer configurations), or a server. In some embodiments, the disclosed methods can be implemented as CRPI encoded on a non-transitory computer-readable storage media in a machine-readable format, or on other non-transitory media or articles of manufacture. FIG. 18 is a schematic illustrating a conceptual partial view of an example computer program product 480 that includes a computer program for executing a computer process on a computing system, arranged according to at least some embodiments presented herein.

The computing system 450 can also include output interfaces 463 that can include a graphics processing unit 464, which can be configured to communicate to various external devices such as display devices 466 or speakers via one or more A/V ports 465 or a communication interface 467. The communication interface 467 can include a network controller 468, which can be arranged to facilitate communications with one or more other computing systems 470 over a network communication via one or more communication ports 469. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 480 is provided using a signal bearing medium 481. The signal bearing medium 481 can include one or more programming instructions 482 that, when executed by one or more processors can provide functionality or portions of the functionality described above with respect to FIGS. 1-18. In some examples, the signal bearing medium 481 can encompass a computer-readable medium 483, such as, but not limited to, a hard disk drive, a Compact Disc (CD), a Digital Video Disk (DVD), a digital tape, or any other CRM described herein. In some implementations, the signal bearing medium 481 can encompass a computer recordable medium 484, such as, but not limited to, memory, read/write (R/W) CDs, R/W DVDs, etc. In some implementations, the signal bearing medium 481 can encompass a communications medium 485, such as, but not limited to, a digital and/or an analog communication medium (e.g., a fiber optic cable, a waveguide, a wired communications link, a wireless communication link, etc.). Thus, for example, the signal bearing medium 481 can be conveyed by a wireless form of the communications medium 485 (e.g., a wireless communications medium conforming to the IEEE 802.11 standard or another transmission protocol).

The one or more programming instructions 482 can be, for example, computer executable and/or logic implemented instructions. In some examples, a computing system such as the computing system 450 of FIG. 17 can be configured to provide various operations, functions, or actions in response to the programming instructions 482 conveyed to the computing system 450 by one or more of the computer-readable medium 483, the computer recordable medium 484, and/or the communications medium 485.

One or more of the processors 70, 101, and 131 can be configured as the processor 452. One or more of the CRM 71, 102, and 134 can be configured as part of or all of the system memory 454 or the storage devices 460. One or more of the user interfaces 72, 103, and 132, can be configured as part of or all of the output interfaces 463 and the display device(s) 466. One or more of the transceivers 73, 104, and 133 can be configured as part of or all of the communication interfaces 467.

VII. Conclusion

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

Embodiments of the present disclosure may thus relate to one of the enumerated example embodiment (EEEs) listed below.

EEE 1 is a method comprising: receiving, by a server computing system including a computer-readable memory and at least one processor, a first vehicle data report including an identifier of a first vehicle and a tool measurement regarding the first vehicle; storing, at the computer-readable memory, multiple vehicle data records including an identifier of a respective vehicle, wherein the multiple vehicle data records include a first vehicle data recording including the identifier of the first vehicle; storing, at the computer-readable memory, the first vehicle data report as part of the first vehicle data record; receiving, by the server computing system, a request from a client computing system for a requested portion of the first vehicle data record, wherein the request includes the identifier of the first vehicle, and wherein the requested portion includes at least a portion of the first vehicle data report; determining, by the at least one processor, the client computing system is authorized to receive the requested portion of the first vehicle data record; and transmitting, by the server computing system, a response to the request from the authorized client computing system, wherein the response includes the requested portion of the first vehicle data record.

EEE 2 is the method of EEE 1, further comprising: receiving, by the server computing system, a second vehicle data report including measurement data regarding the first vehicle, wherein the second vehicle data report includes measurement data determined from a vehicle data message transmitted by an electronic control unit within the first vehicle; and storing, at the computer-readable memory, the second vehicle data report as part of the first vehicle data record, wherein the requested portion of the first vehicle data record further includes at least a portion of the second vehicle data report.

EEE 3 is the method of EEE 1 or 2, wherein the first vehicle data record includes a vehicle data record password, wherein the request includes a request password, and wherein determining the client computing system is authorized to receive the requested portion of the first vehicle data record includes determining, by the at least one processor, the request password matches the vehicle data record password.

EEE 4 is the method as in any one of EEE 1-3, wherein the first vehicle data record includes a second identifier, wherein the second identifier identifies at least one of the client computing system, a repair shop, and/or a repair technician, wherein the request includes a request identifier, and wherein determining the client computing system is authorized to receive the requested portion of the first vehicle data record includes determining, by the at least one processor, the request identifier of the request matches the second identifier of the vehicle data record.

EEE 5 is the method as in any one of EEE 1-4, further comprising: transmitting, by server computing system to the client computing system, a service procedure displayable at the client computing system, wherein the service procedure pertains to the first vehicle and includes a procedural step requiring use of a measurement tool configured for performing the tool measurement.

EEE 6 is the method as in any one of EEE 1-5, wherein the selected measurement tool comprises a torque wrench, and wherein the tool measurement comprises a torque measurement performed by the torque wrench.

EEE 7 is the method as in any one of EEE 1-5, wherein the selected measurement tool comprises a vehicle brake lathe, and wherein the tool measurement comprises at least one of a thickness of a vehicle brake rotor and/or a diameter of a vehicle brake drum.

EEE 8 is the method of EEE 7, the method further comprising: comparing, by the at least one processor, the tool measurement to a threshold measurement for vehicle brake parts stored in parts specification data within the computer-readable medium; and transmitting, by the server computing system, a tool measurement conclusion message indicating whether further machining of at least one of the vehicle brake rotor and/or the vehicle brake drum by the brake lathe should be performed.

EEE 9 is a server computing system comprising: at least one processor; and at least one computer-readable memory storing computer-readable program instructions and multiple vehicle data records including an identifier of a respective vehicle, wherein the multiple vehicle data records include a first vehicle data record including an identifier of a first vehicle, wherein execution of the computer-readable program instructions cause the server computing system to perform functions including: receiving a first vehicle data report including the identifier of the first vehicle and a tool measurement regarding the first vehicle; storing, at the computer-readable memory, the first vehicle data report as part of the first vehicle data record; receiving a request from a client computing system for a requested portion of the first vehicle data record, wherein the request includes the identifier of the first vehicle, and wherein the requested portion includes at least a portion of the first vehicle data report; determining the client computing system is authorized to receive the requested portion of the first vehicle data record; and transmitting a response to the request from the authorized client computing system, wherein the response includes the requested portion of the first vehicle data record.

EEE 10 is the server computing system of EEE 9, wherein the functions further include: receiving, by the server computing system, a second vehicle data report including measurement data regarding the first vehicle, wherein the second vehicle data report includes measurement data determined from a vehicle data message transmitted by an electronic control unit within the first vehicle; and storing, at the computer-readable memory, the second vehicle data report as part of the first vehicle data record, wherein the requested portion of the first vehicle data record further includes at least a portion of the second vehicle data report.

EEE 11 is the server computing system of EEE 9 or 10, wherein the first vehicle data record includes a vehicle data record password, wherein the request includes a request password, and wherein determining the client computing system is authorized to receive the requested portion of the first vehicle data record includes determining, by the at least one processor, the request password matches the vehicle data record password.

EEE 12 is the server computing system as in any one of EEE 9-11, wherein the first vehicle data record includes a second identifier, wherein the second identifier identifies at least one of the client computing system, a repair shop, and/or a repair technician, wherein the request includes a request identifier, and wherein determining the client computing system is authorized to receive the requested portion of the first vehicle data record includes determining, by the at least one processor, the request identifier of the request matches the second identifier of the vehicle data record.

EEE 13 is the server computing system as in any one of EEE 9-12, wherein the functions further include: transmitting, by server computing system to the client computing system, a service procedure displayable at the client computing system, wherein the service procedure pertains to the first vehicle and includes a procedural step requiring use of a measurement tool configured for performing the tool measurement.

EEE 14 is the server computing system as in any one of EEE 9-13, wherein the selected measurement tool comprises a torque wrench, and wherein tool measurement comprises a torque measurement performed by the torque wrench.

EEE 15 is the server computing system as in any one of EEE 9-13, wherein the selected measurement tool comprises a vehicle brake lathe, and wherein the tool measurement comprises at least one of a thickness of a vehicle brake rotor and/or a diameter of a vehicle brake drum.

EEE 16 is the server computing system of EEE 15, wherein the functions further include: comparing, by the at least one processor, the tool measurement to a threshold measurement for vehicle brake parts stored in parts specification data within the computer-readable medium; and transmitting, by the server computing system, a tool measurement conclusion message indicating whether further machining of at least one of the vehicle brake rotor and/or the vehicle brake drum by the brake lathe should be performed.

EEE 17 is a method comprising: receiving, by at least one processor of a client computing system, an identifier of a first vehicle; generating, by the at least one processor of the client computing system, a request for a first vehicle data report including a tool measurement regarding the first vehicle, wherein the first vehicle data report is part of a first vehicle data record including an identifier of the first vehicle and a first authorization identifier, wherein the request includes the identifier of the first vehicle and the first authorization identifier; transmitting, by the client computing system to a server computing system, the request for the first vehicle data report, wherein the first vehicle data record is stored at the server computing system with one or more other vehicle data records that include both an identifier of a respective vehicle other than the first vehicle and at least one authorization identifier; receiving, by the client computing system in response to transmitting the request, the first vehicle data report; and displaying, by a display of the client computing system, the first vehicle data report.

EEE 18 is the method of EEE 17, wherein the identifier of the first vehicle includes a vehicle identification number (VIN) associated with the first vehicle, and wherein the request includes data indicating the client computing system received the VIN from an electronic control unit with the first vehicle.

EEE 19 is the method of EEE 18, wherein the request includes data indicating a time when the client computing system received the VIN from the electronic control unit within the first vehicle.

EEE 20 is the method as in any one of EEE 17-19, wherein the first vehicle data report includes a repair shop identifier and/or a repair technician identifier, and wherein the first authorization identifier includes (i) an identifier of the client computing system, and/or (ii) the repair shop identifier and/or the repair technician identifier.

EEE 21 is the method as in any one of EEE 17-20, further comprising: receiving, by a user interface of the client computing system, a vehicle data record password, wherein the first vehicle data record is associated with the vehicle data record password, and wherein the authorization identifier comprises the vehicle data record password received by the user interface.

EEE 22 is the method as in any one of EEE 17-21, further comprising: generating, by the at least one processor of the client computing system, a request for a second vehicle data report, wherein the request for the second vehicle data report includes the identifier of the first vehicle and the first authorization identifier; transmitting, by the client computing system, the request for the second vehicle data report; receiving, by the client computing system, a notice indicating the client computing system is not authorized to access the second vehicle data report; and displaying, by the display, the notice indicating the client computing system is not authorized to access the second vehicle data report.

EEE 23 is the method as in any one of EEE 17-22, wherein the first vehicle data report includes measurement data determined from a vehicle data message transmitted by an electronic control unit within the first vehicle.

EEE 24 is the method as in any one of EEE 17-23, wherein the selected measurement tool comprises a torque wrench, and wherein the tool measurement comprises a torque measurement.

EEE 25 is the method as in any one of EEE 17-23, wherein the selected measurement tool comprises a vehicle brake lathe, and wherein the tool measurement comprises a thickness of a vehicle brake rotor and/or a diameter of a vehicle brake drum.

EEE 26 is the method as in any one of EEE 17-23, wherein the selected measurement tool comprises a vehicle alignment machine, and wherein the tool measurement comprises at least one of a caster measurement, a camber measurement, a toe-in measurement, a toe-out measurement, and/or a steering axis inclination measurement.

EEE 27 is a client computing system comprising: at least one processor; a display; and at least one computer-readable memory storing computer-readable program instructions, wherein execution of the computer-readable program instructions cause the client computing system to perform functions including: receiving, by the at least one processor, an identifier of a first vehicle; generating, by the at least one processor, a request for a first vehicle data report including a tool measurement regarding the first vehicle, wherein the first vehicle data report is part of a first vehicle data record including an identifier of the first vehicle and a first authorization identifier, wherein the request includes the identifier of the first vehicle and the first authorization identifier; transmitting, to a server computing system, the request for the first vehicle data report, wherein the first vehicle data record is stored at the server computing system with one or more other vehicle data records that include both an identifier of a respective vehicle other than the first vehicle and at least one authorization identifier; receiving, in response to transmitting the request, the first vehicle data report; and displaying, by the display, the first vehicle data report.

EEE 28 is the client computing system of EEE 27, further comprising: wherein the identifier of the first vehicle includes a vehicle identification number (VIN) associated with the first vehicle, and wherein the request includes data indicating the client computing system received the VIN from an electronic control unit with the first vehicle.

EEE 29 is the client computing system of EEE 28, wherein the request includes data indicating a time when the client computing system received the VIN from the electronic control unit within the first vehicle.

EEE 30 is the client computing system as in any one of EEE 27-29, wherein the first vehicle data report includes a repair shop identifier and/or a repair technician identifier, and wherein the first authorization identifier includes (i) an identifier of the client computing system, and/or (ii) the a repair shop identifier and/or the repair technician identifier.

EEE 31 is the client computing system as in any one of EEE 27-30, further comprising: receiving, by a user interface of the client computing system, a vehicle data record password, wherein the first vehicle data record is associated with the vehicle data record password, and wherein the authorization identifier comprises the vehicle data record password received by the user interface.

EEE 32 is the client computing system as in any one of EEE 27-31, further comprising: generating, by the at least one processor of the client computing system, a request for a second vehicle data report, wherein the request for the second vehicle data report includes the identifier of the first vehicle and the first authorization identifier; transmitting, by the client computing system, the request for the second vehicle data report; receiving, by the client computing system, a notice indicating the client computing system is not authorized to access the second vehicle data report; and displaying, by the display, the notice indicating the client computing system is not authorized to access the second vehicle data report.

EEE 33 is the client computing system as in any one of EEE 27-32, wherein the first vehicle data report includes measurement data determined from a vehicle data message transmitted by an electronic control unit within the first vehicle.

EEE 34 is the client computing system as in any one of EEE 27-33, wherein the selected measurement tool comprises a torque wrench, and wherein the tool measurement comprises a torque measurement.

EEE 35 is the client computing system as in any one of EEE 27-33, wherein the selected measurement tool comprises a vehicle brake lathe, and wherein the tool measurement comprises a thickness of a vehicle brake rotor and/or a diameter of a vehicle brake drum.

EEE 36 is the client computing system as in any one of EEE 27-33, wherein the selected measurement tool comprises a vehicle alignment machine, and wherein the tool measurement comprises at least one of a caster measurement, a camber measurement, a toe-in measurement, a toe-out measurement, and/or a steering axis inclination measurement.

EEE 37 is a computer-readable medium having stored thereon instructions executable by at least one processor to cause a computing system to perform functions comprising: receiving a first vehicle data report including an identifier of a first vehicle and a tool measurement regarding the first vehicle; storing, at the computer-readable memory, multiple vehicle data records including an identifier of a respective vehicle, wherein the multiple vehicle data records include a first vehicle data recording including the identifier of the first vehicle; storing, at the computer-readable memory, the first vehicle data report as part of the first vehicle data record; receiving a request from a client computing system for a requested portion of the first vehicle data record, wherein the request includes the identifier of the first vehicle, and wherein the requested portion includes at least a portion of the first vehicle data report; determining the client computing system is authorized to receive the requested portion of the first vehicle data record; and transmitting a response to the request from the authorized client computing system, wherein the response includes the requested portion of the first vehicle data record.

EEE 38 is the computer-readable medium of EEE 37, wherein the functions further comprise: receiving a second vehicle data report including measurement data regarding the first vehicle, wherein the second vehicle data report includes measurement data determined from a vehicle data message transmitted by an electronic control unit within the first vehicle; and storing, at the computer-readable memory, the second vehicle data report as part of the first vehicle data record, wherein the requested portion of the first vehicle data record further includes at least a portion of the second vehicle data report.

EEE 39 is the computer-readable medium of EEE 37 or 38, wherein the first vehicle data record includes a vehicle data record password, wherein the request includes a request password, and wherein determining the client computing system is authorized to receive the requested portion of the first vehicle data record includes determining the request password matches the vehicle data record password.

EEE 40 is the computer-readable medium as in any one of EEE 37-39, wherein the first vehicle data record includes a second identifier, wherein the second identifier identifies at least one of the client computing system, a repair shop, and/or a repair technician, wherein the request includes a request identifier, and wherein determining the client computing system is authorized to receive the requested portion of the first vehicle data record includes determining the request identifier of the request matches the second identifier of the vehicle data record.

EEE 41 is the computer-readable medium as in any one of EEE 37-40, wherein the functions further comprise: transmitting, to the client computing system, a service procedure displayable at the client computing system, wherein the service procedure pertains to the first vehicle and includes a procedural step requiring use of a measurement tool configured for performing the tool measurement.

EEE 42 is the computer-readable medium as in any one of EEE 37-41, wherein the selected measurement tool comprises a torque wrench, and wherein the tool measurement comprises a torque measurement performed by the torque wrench.

EEE 43 is the computer-readable medium as in any one of EEE 37-42, wherein the selected measurement tool comprises a vehicle brake lathe, and wherein the tool measurement comprises at least one of a thickness of a vehicle brake rotor and/or a diameter of a vehicle brake drum.

EEE 44 is the computer-readable medium of EEE 43, wherein the functions further comprise: comparing the tool measurement to a threshold measurement for vehicle brake parts stored in parts specification data within the computer-readable medium; and transmitting a tool measurement conclusion message indicating whether further machining of at least one of the vehicle brake rotor and/or the vehicle brake drum by the brake lathe should be performed.

EEE 45 is a computer-readable medium having stored thereon instructions executable by at least one processor to cause a computing system to perform functions comprising: receiving an identifier of a first vehicle; generating a request for a first vehicle data report including a tool measurement regarding the first vehicle, wherein the first vehicle data report is part of a first vehicle data record including an identifier of the first vehicle and a first authorization identifier, wherein the request includes the identifier of the first vehicle and the first authorization identifier; transmitting, to a server computing system, the request for the first vehicle data report, wherein the first vehicle data record is stored at the server computing system with one or more other vehicle data records that include both an identifier of a respective vehicle other than the first vehicle and at least one authorization identifier; receiving, in response to transmitting the request, the first vehicle data report; and displaying, by a display of the client computing system, the first vehicle data report.

EEE 46 is the computer-readable medium of EEE 45, wherein the identifier of the first vehicle includes a vehicle identification number (VIN) associated with the first vehicle, and wherein the request includes data indicating the client computing system received the VIN from an electronic control unit with the first vehicle.

EEE 47 is the computer-readable medium of EEE 46, wherein the request includes data indicating a time when the client computing system received the VIN from the electronic control unit within the first vehicle.

EEE 48 is the computer-readable medium as in any one of EEE 45-47, wherein the first vehicle data report includes a repair shop identifier and/or a repair technician identifier, and wherein the first authorization identifier includes (i) an identifier of the client computing system, and/or (ii) the repair shop identifier and/or the repair technician identifier.

EEE 49 is the computer-readable medium as in any one of EEE 45-48, wherein the functions further comprise: receiving, by a user interface of the client computing system, a vehicle data record password, wherein the first vehicle data record is associated with the vehicle data record password, and wherein the authorization identifier comprises the vehicle data record password received by the user interface.

EEE 50 is the computer-readable medium as in any one of EEE 45-49, wherein the functions further comprise: generating a request for a second vehicle data report, wherein the request for the second vehicle data report includes the identifier of the first vehicle and the first authorization identifier; transmitting the request for the second vehicle data report; receiving a notice indicating the client computing system is not authorized to access the second vehicle data report; and displaying, by the display, the notice indicating the client computing system is not authorized to access the second vehicle data report.

EEE 51 is the computer-readable medium as in any one of EEE 45-50, wherein the first vehicle data report includes measurement data determined from a vehicle data message transmitted by an electronic control unit within the first vehicle.

EEE 52 is the computer-readable medium as in any one of EEE 45-51, wherein the selected measurement tool comprises a torque wrench, and wherein the tool measurement comprises a torque measurement.

EEE 53 is the computer-readable medium as in any one of EEE 45-51, wherein the selected measurement tool comprises a vehicle brake lathe, and wherein the tool measurement comprises a thickness of a vehicle brake rotor and/or a diameter of a vehicle brake drum.

EEE 54 is the computer-readable medium as in any one of EEE 45-51, wherein the selected measurement tool comprises a vehicle alignment machine, and wherein the tool measurement comprises at least one of a caster measurement, a camber measurement, a toe-in measurement, a toe-out measurement, and/or a steering axis inclination measurement.

We claim:

1. A method comprising:
   receiving, at one or more processors of a computing system that is separate from both a vehicle and a computerized measurement tool, an image from a capture device, wherein the image from the capture device shows a vehicle component of a vehicle;
   comparing, at the one or more processors, the image from the capture device with a registered image showing a vehicle component, wherein the registered image is contained within measurement setup data stored in a non-transitory computer readable medium;
   determining, at the one or more processors, an identifier of the vehicle and a component selection indicative of a vehicle component on the vehicle selected for a tool measurement, wherein the one or more processors determine the component selection at least in part by determining a vehicle component shown in the registered image matches the vehicle component shown in the image from the capture device;
   receiving, at the one or more processors, a tool measurement from the computerized measurement tool, wherein the tool measurement corresponds to the vehicle component on the vehicle;
   making, at the one or more processors, a determination whether the vehicle component on the vehicle is within a specification for the vehicle component on the vehicle by comparing the tool measurement regarding the vehicle component on the vehicle with a threshold measurement; and
   transmitting, by the computing system based on the determination, a measurement conclusion message.

2. The method of claim 1, wherein the threshold measurement includes a range of measurements regarding the vehicle component.

3. The method of claim 2, wherein the range of measurements indicate acceptable operating measurements defined by a manufacturer of the vehicle component.

4. The method of claim 1, wherein the measurement conclusion message indicates the vehicle component is not within the specification.

5. The method of claim 1, wherein the measurement conclusion message indicates the vehicle component is within the specification.

6. The method of claim 1, wherein the tool measurement is made using a thermistor of the computerized measurement tool, a transducer of the computerized measurement tool, a thermocouple of the computerized measurement tool, a potentiometer of the computerized measurement tool, an accelerometer of the computerized measurement tool, or a strain gauge of the computerized measurement tool.

7. The method of claim 1, wherein a unit of measurement associated with the tool measurement is a voltage, an amperage, a resistance, a capacitance, an inductance, a duty cycle, a pressure, a vacuum, a temperature, a distance, a diameter, or a thickness.

8. The method of claim 1, wherein receiving the identifier of a vehicle component on the vehicle includes determining a spatial location associated with a location of the vehicle component on the vehicle.

9. The method of claim 1,
   wherein the measurement setup data also includes one or more from among: a range of measurement data regarding the vehicle component, a dimension of the vehicle component, a normal operating temperature, a normal operating voltage, a normal operating current, a normal operating pressure, a torque requirement, a wheel alignment specification, an expected exhaust gas content, an expected electrical measurement, an expected fluid level, an expected fluid pressure, or an expected fluid temperature.

10. The method of claim 1, wherein receiving the tool measurement regarding the vehicle component on the vehicle includes receiving, at a transceiver of the computing system, a wireless transmission of a communicating carrying the tool measurement regarding the vehicle component on the vehicle.

11. The method of claim 1, wherein transmitting the measurement conclusion message includes transmitting the measurement conclusion message to a device including a display configured to display the measurement conclusion message.

12. The method of claim 1, wherein:
the computerized measurement tool includes a temperature gauge or thermal imager operable to obtain a temperature measurement,
the tool measurement regarding the vehicle component on the vehicle includes the temperature measurement, and
the measurement conclusion message indicates use of a torque wrench should be postponed until a temperature of the vehicle component is below a specified temperature.

13. The method of claim 1, wherein:
the vehicle component is a brake rotor or a brake drum, and
the measurement conclusion message indicates whether further machining of the brake rotor or the brake drum should occur.

14. The method of claim 1, further comprising:
transmitting a service procedure displayable at a device including a display, wherein the service procedure pertains to the vehicle and includes a procedural step requiring or recommending use of the computerized measurement tool configured for performing the tool measurement regarding the vehicle component on the vehicle.

15. The method of claim 14, further comprising:
determining, at the one or more processors, a status of the computerized measurement tool indicates the computerized measurement tool is available for use; and
modifying the service procedure before transmitting the service procedure, wherein modifying the service procedure includes specifying use of the computerized measurement tool during performance of the service procedure.

16. The method of claim 15, further comprising:
receiving, at the one or more processors, a data transmission indicating the status of the computerized measurement tool.

17. The method of claim 14,
wherein the service procedure indicates at least one computerized measurement tool selectable to make the tool measurement regarding the vehicle component on the vehicle, and
wherein the at least one computerized measurement tool includes the computerized measurement tool.

18. The method of claim 1, wherein the computerized measurement tool includes an air chuck, an air conditioning system manifold gauge, an ammeter, an anti-freeze hydrometer, a battery tester, a bore gauge, a brake lathe, an exhaust gas analyzer, a measurement caliper, a charging system tester, a compression gauge, a digital indicator, a dial indicator, a digital volt ohm meter, a feeler gauge, a fuel pressure gauge, an oil pressure gauge, an oscilloscope, a starter tester, a temperature gauge, a tire pressure gauge, a thermal imager, a tire tread measurement gauge, a torque wrench, a vacuum gauge, a vehicle inspector, a wheel balancer, or a wheel alignment machine.

19. A computing system that is separate from both a vehicle and a computerized measurement tool, the computing system comprising:
one or more processors;
a non-transitory computer readable medium; and
program instructions and measurement setup data stored on the non-transitory computer readable medium, wherein execution of the program instructions by the one or more processors causes the computing system to:
receive, at the one or more processors, an image from a capture device, wherein the image from the capture device shows a vehicle component of a vehicle;
compare, at the one or more processors, the image from the capture device with a registered image showing a vehicle component, wherein the registered image is contained within the measurement setup data;
determine, at the one or more processors, an identifier of the vehicle and a component selection indicative of a vehicle component on the vehicle selected for a tool measurement, wherein the one or more processors determine the component selection at least in part by determining a vehicle component shown in the registered image matches the vehicle component shown in the image from the capture device;
receive, at the one or more processors, a tool measurement from the computerized measurement tool, wherein the tool measurement corresponds to the vehicle component on the vehicle;
make, at the one or more processors, a determination whether the vehicle component on the vehicle is within a specification for the vehicle component on the vehicle by comparing the tool measurement regarding the vehicle component on the vehicle with a threshold measurement; and
transmit, by the computing system based on the determination, a measurement conclusion message.

20. A non-transitory computer readable medium having stored therein program instructions executable by one or more processors to cause a computing system to perform functions comprising:
receiving, at the one or more processors, an image from a capture device, wherein the image from the capture device shows a vehicle component of a vehicle;
comparing, at the one or more processors, the image from the capture device with a registered image showing a vehicle component, wherein the registered image is contained within measurement setup data stored on non-transitory computer readable medium;
determining, at the one or more processors, an identifier of the vehicle and a component selection indicative of a vehicle component on the vehicle selected for a tool measurement, wherein the one or more processors determine the component selection at least in part by determining a vehicle component shown in the registered image matches the vehicle component shown in the image from the capture device;
receiving, at the one or more processors, a tool measurement from a computerized measurement tool, wherein the tool measurement corresponds to the vehicle component on the vehicle;
making, at the one or more processors, a determination whether the vehicle component on the vehicle is within a specification for the vehicle component on the vehicle by comparing the tool measurement regarding the vehicle component on the vehicle with a threshold measurement; and transmitting, by the computing system based on the determination, a measurement conclusion message.

21. A computing system according to claim 19, wherein the computing system includes the capture device.

22. A computing system according to claim 19, wherein:
the computing system includes the computerized measurement tool, and optionally,
the computerized measurement tool includes a thermal imager with the capture device.

* * * * *